US010184034B2

(12) United States Patent
Nakayama et al.

(10) Patent No.: US 10,184,034 B2
(45) Date of Patent: Jan. 22, 2019

(54) CARBON FIBER FORMING RAW MATERIAL, FORMED MATERIAL, AND CARBON FIBER-REINFORCED COMPOSITE MATERIAL

(71) Applicant: TORAY INDUSTRIES, INC., Tokyo (JP)

(72) Inventors: Yoshifumi Nakayama, Iyo-gun (JP); Toshiya Kamae, Otsu (JP); Daigo Kobayashi, Iyo-gun (JP); Makoto Endo, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 167 days.

(21) Appl. No.: 14/362,533

(22) PCT Filed: Nov. 12, 2012

(86) PCT No.: PCT/JP2012/079279

§ 371 (c)(1),
(2) Date: Jun. 3, 2014

(87) PCT Pub. No.: WO2013/084669

PCT Pub. Date: Jun. 13, 2013

(65) Prior Publication Data

US 2014/0342144 A1 Nov. 20, 2014

(30) Foreign Application Priority Data

Dec. 5, 2011 (JP) ................................ 2011-266147
Dec. 5, 2011 (JP) ................................ 2011-266148

(51) Int. Cl.
*C03C 17/00* (2006.01)
*C08J 5/24* (2006.01)
(Continued)

(52) U.S. Cl.
CPC . *C08J 5/24* (2013.01); *C08J 5/06* (2013.01); *C08L 63/00* (2013.01); *C08L 63/04* (2013.01);
(Continued)

(58) Field of Classification Search
CPC ......................... C08J 2363/00; C08J 2363/02; C08J 2363/04; C08J 5/06; C08J 5/24;
(Continued)

(56) References Cited

U.S. PATENT DOCUMENTS 2,928,807 A * 3/1960 Belanger ................ C08G 59/42 525/530
3,738,862 A * 6/1973 Jones ................... C08G 59/066 427/386
(Continued)

FOREIGN PATENT DOCUMENTS

CN 1327457 A 12/2001
CN 101501114 A 8/2009
(Continued)

OTHER PUBLICATIONS

English Machine Translation: JP 2005225982.*
(Continued)

*Primary Examiner* — Holly C Rickman
*Assistant Examiner* — Linda N Chau
(74) *Attorney, Agent, or Firm* — Birch, Stewart, Kolasch & Birch LLP

(57) ABSTRACT

The carbon fiber forming raw material is a carbon fiber forming raw material (Z) as a prepreg including sizing agent-coated carbon fibers and a thermosetting resin or a carbon fiber forming raw material (Y) as a forming material that includes sizing agent-coated carbon fibers and has a woven fabric form or a braid form. The sizing agent includes components (A) and (B). The component (A) is an epoxy compound having two or more epoxy groups or two or more
(Continued)

types of functional groups. The component (B) is one or more compounds selected from the group consisting of a tertiary amine compound, a tertiary amine salt, a quaternary ammonium salt, a quaternary phosphonium salt, and a phosphine compound. The component (B) is contained in an amount of 0.1 to 25 parts by mass relative to 100 parts by mass of the component (A).

15 Claims, 1 Drawing Sheet

(51) Int. Cl.
*C08L 63/00* (2006.01)
*C08L 63/04* (2006.01)
*D06M 15/55* (2006.01)
*C08J 5/06* (2006.01)

(52) U.S. Cl.
CPC .......... *D06M 15/55* (2013.01); *C08J 2363/00* (2013.01); *C08J 2363/02* (2013.01); *C08J 2363/04* (2013.01); *D06M 2200/40* (2013.01); *Y10T 428/2918* (2015.01); *Y10T 442/2008* (2015.04)

(58) Field of Classification Search
CPC ........ C08L 63/00; C08L 63/04; D06M 15/55; D06M 2200/40; Y10T 428/2918; Y10T 442/2008
See application file for complete search history.

(56) References Cited

U.S. PATENT DOCUMENTS

| | | | | |
|---|---|---|---|---|
| 3,957,716 | A | 5/1976 | Weldy | |
| 4,409,288 | A | 10/1983 | Spain | |
| 4,496,671 | A | 1/1985 | Yoshinaga et al. | |
| 4,555,446 | A | 11/1985 | Sumida et al. | |
| 5,140,071 | A | 8/1992 | Kroker et al. | |
| 5,462,799 | A * | 10/1995 | Kobayashi | D01F 11/14 423/447.1 |
| 5,512,613 | A * | 4/1996 | Afzali-Ardakani | C07D 303/24 257/E23.119 |
| 5,691,055 | A | 11/1997 | Kobayashi et al. | |
| 6,503,967 | B1 * | 1/2003 | Kitajima | C08G 59/56 523/421 |
| 8,278,389 | B2 * | 10/2012 | Tomioka | B32B 27/38 428/36.4 |
| 2005/0196619 | A1 * | 9/2005 | Nakanishi | B32B 15/08 428/416 |
| 2006/0099425 | A1 * | 5/2006 | Murakami | C08G 59/686 428/413 |
| 2009/0098447 | A1 * | 4/2009 | Murakami | H01M 8/0221 429/129 |
| 2009/0162653 | A1 * | 6/2009 | Sakata | C08J 5/042 428/367 |
| 2010/0068518 | A1 * | 3/2010 | Honma | B29C 70/086 428/401 |
| 2010/0178487 | A1 * | 7/2010 | Arai | C08J 5/24 428/300.1 |
| 2012/0077903 | A1 * | 3/2012 | Yamagami | C08G 59/66 523/400 |
| 2012/0328811 | A1 * | 12/2012 | Patel | C09D 4/00 428/36.9 |
| 2013/0089736 | A1 | 4/2013 | Nakayama et al. | |

FOREIGN PATENT DOCUMENTS

| | | | | |
|---|---|---|---|---|
| CN | 102959154 | A | 3/2013 | |
| EP | 2589701 | A1 | 5/2013 | |
| JP | 52-45672 | A | 4/1977 | |
| JP | 52-45673 | A | 4/1977 | |
| JP | 52-59794 | A | 5/1977 | |
| JP | 57-128266 | A | 8/1982 | |
| JP | 57-171767 | A | 10/1982 | |
| JP | 60-139875 | A | 7/1985 | |
| JP | 61-28074 | A | 2/1986 | |
| JP | 62-33872 | A | 2/1987 | |
| JP | 1-272867 | A | 10/1989 | |
| JP | 4-361619 | A | 12/1992 | |
| JP | 7-9444 | A | 1/1995 | |
| JP | 9-217281 | A | 8/1997 | |
| JP | 2000-336577 | A | 12/2000 | |
| JP | 2000-355630 | A | 12/2000 | |
| JP | 2005-146429 | A | 6/2005 | |
| JP | 2005225982 | A * | 8/2005 | |
| JP | 2005-320641 | A | 11/2005 | |
| JP | 2010-31424 | A | 2/2010 | |
| JP | 2010-57462 | A | 3/2010 | |
| JP | 2010-126832 | A | 6/2010 | |
| JP | 2011157462 | A * | 8/2011 | C08G 59/226 |
| JP | 2011-214209 | A | 10/2011 | |
| KR | 10-2001-0080739 | A | 8/2001 | |
| WO | WO 2012/002266 | A1 | 1/2012 | |

OTHER PUBLICATIONS

English Machine Translation: Takenaka et al. (JP 2011-157462).*
Li et al. (WO 2012/104346).*
Extended European Search Report, dated Jul. 16, 2015, for European Application No. 12855468.0.
Chinese Office Action and Search Report for Chinese Application No. 201280059728.0, dated Nov. 5, 2015.
International Search Report, dated Feb. 19, 2013, for International Application No. PCT/JP2012/079279.
Chinese Office Action and Search Report, dated Dec. 6, 2016, for Chinese Application No. 201280059728.0.
Korean Office Action, dated Sep. 11, 2017, for Korean Application No. 10-2014-7012053, along with an English translation.

* cited by examiner

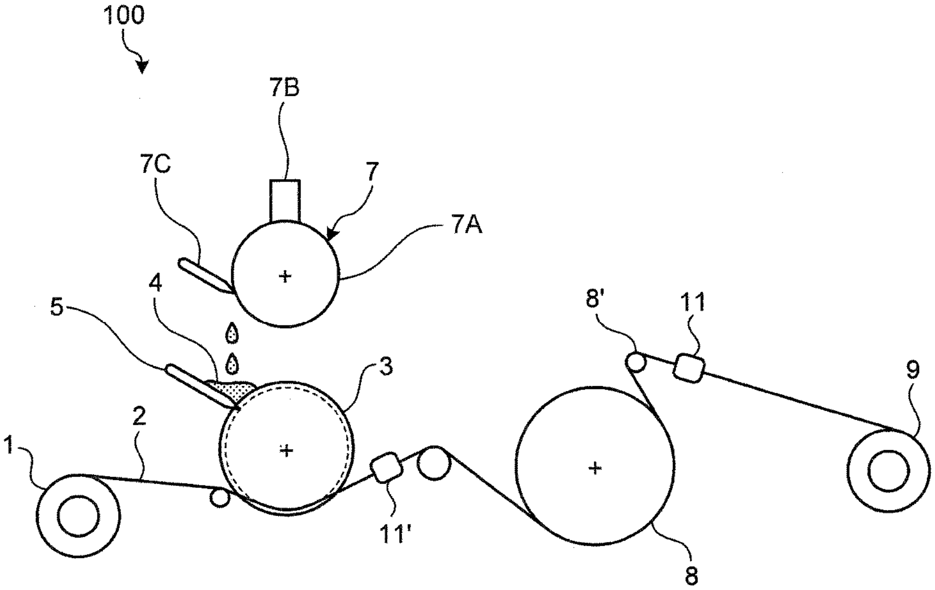
100
7B
7C
7
7A
5
4
3
2
1
11'
8'
11
9
8

CARBON FIBER FORMING RAW MATERIAL, FORMED MATERIAL, AND CARBON FIBER-REINFORCED COMPOSITE MATERIAL

FIELD

The present invention relates to a carbon fiber forming raw material, a formed material, and a carbon fiber-reinforced composite material suitably used for aircraft members, spacecraft members, automobile members, ship members, and other members.

BACKGROUND

Carbon fibers are lightweight and excellent in strength and elastic modulus, and thus are combined with various matrix resins to form a composite material, which is used in various fields such as aircraft members, spacecraft members, automobile members, ship members, constructional materials, and sporting goods. In order to impart the excellent characteristics of carbon fibers to a composite material including the carbon fibers, excellent adhesion between the carbon fibers and a matrix resin is important.

In order to improve the adhesion between carbon fibers and a matrix resin, the carbon fibers are typically subjected to oxidation treatment such as gas phase oxidation and liquid phase oxidation, and thus an oxygen-containing functional group is introduced to the surface of the carbon fibers. For example, a disclosed method includes subjecting carbon fibers to electrolysis to improve interlaminar shear strength as an index of the adhesion (see Patent Literature 1). However, as the level of characteristics required for a composite material has increased in recent years, the adhesion achieved by such an oxidation treatment alone is becoming insufficient.

Carbon fibers are brittle and poor in bindability and abrasion resistance and thus readily generate fluffs or broken thread in a high-order processing step. To address this problem, methods of coating carbon fibers are disclosed (see Patent Literatures 2 and 3).

For example, a disclosed method includes applying, as a sizing agent, a diglycidyl ether of bisphenol A onto carbon fibers (see Patent Literatures 2 and 3). Another disclosed method includes applying, as a sizing agent, a polyalkylene oxide adduct of bisphenol A onto carbon fibers (see Patent Literatures 4 and 5). Another disclosed method includes applying, onto carbon fibers, a sizing agent that is obtained by adding an epoxy group to a polyalkylene oxide adduct of bisphenol A (see Patent Literatures 6 and 7). Another disclosed method includes applying, as a sizing agent, an epoxy adduct of polyalkylene glycol onto carbon fibers (see Patent Literatures 8, 9 and 10).

In addition, another disclosed method includes applying, as a sizing agent, a urethane compound having an epoxy group and a quaternary ammonium salt onto carbon fibers (see Patent Literature 11). The disclosed method also improves the bindability and the abrasion resistance but has failed to improve the adhesion between carbon fibers and a matrix resin.

It is known that these methods improve the bindability and the abrasion resistance of carbon fibers.

However, these previously disclosed methods have no technical idea to positively improve the adhesion between carbon fibers and a matrix resin by means of the sizing agent and cannot greatly improve the adhesion between carbon fibers and a matrix resin in practice.

In order to improve impregnation properties of a matrix resin into carbon fibers, a method of coating carbon fibers with a particular sizing agent has been carried out.

For example, a disclosed method includes applying, as a sizing agent, a cationic surfactant having a surface tension of 40 mN/m or less and a viscosity at 80° C. of 200 mPa·s or less onto carbon fibers (see Patent Literature 12). Another disclosed method includes applying, as a sizing agent, an epoxy resin, a water-soluble polyurethane resin, and a polyether resin onto carbon fibers (see Patent Literature 13). These methods are proved to improve the bindability of carbon fibers and the impregnation properties of a matrix resin into carbon fibers. However, these previously disclosed methods also have no technical idea to positively improve the adhesion between carbon fibers and a matrix resin by means of a sizing agent and cannot greatly improve the adhesion between carbon fibers and a matrix resin in practice.

As described above, a sizing agent has been used as what is called an adhesive for improving high-order processability or for improving the impregnation properties of a matrix resin into carbon fibers, and little study has been made on the sizing agent to improve the adhesion between carbon fibers and a matrix resin. Even when studied, sizing agents achieve limited effects. In other words, the adhesion is insufficiently improved, or the effect is achieved only in the case of a combination with particular carbon fibers.

For example, a disclosed method includes applying, as a sizing agent, N,N,N',N'-tetraglycidyl metaxylylene diamine to carbon fibers (see Patent Literature 14). The disclosed method provides improvement in interlaminar shear strength as an index of the adhesion when compared with the case using glycidyl ether of bisphenol A, but the improvement effect of the adhesion is still insufficient. In addition, the N,N,N',N'-tetraglycidyl metaxylylene diamine used in the disclosed method contains a tertiary aliphatic amine in its structure and thus exhibits nucleophilicity, which unfortunately causes the diamine to undergo self-polymerization. This hardens carbon fiber bundles with time to deteriorate high-order processability.

Another disclosed method includes applying, as a sizing agent, a mixture of a vinyl compound monomer having a glycidyl group and an amine curing agent for an epoxy resin onto carbon fibers (see Patent Literature 15). The disclosed method provides improvement in interlaminar shear strength as an index of the adhesion when compared with the case without the amine curing agent, but the improvement effect of the adhesion is still insufficient. In addition, the glycidyl group reacts with the amine curing agent to increase the molecular weight during a process of drying the sizing agent, and this hardens carbon fiber bundles to deteriorate high-order processability. Moreover, the space among carbon fibers becomes small, and this reduces the impregnation properties of a resin.

Another method is also disclosed as the method using a sizing agent containing an epoxy compound and an amine curing agent in combination (see Patent Literature 16). The disclosed method improves the handleability and the impregnation properties of fiber bundles, but the sizing agent is polymerized to form a film on the surface of carbon fibers. This may interfere with the adhesion between the carbon fibers and an epoxy matrix resin.

Another disclosed method includes applying an amine compound onto carbon fibers (see Patent Literature 17). The disclosed method provides improvement in interlaminar shear strength as an index of the adhesion when compared with the case without coating, but the improvement effect of the adhesion is still insufficient. The disclosed method describes no detailed mechanism of improving the adhesion, but the mechanism is supposed as below. In the disclosed method, the amine compound used is diethylenetriamine or xylenediamine containing a primary amino group, or piperidine or imidazole containing a secondary amino group. Each amine compound contains an active hydrogen in the molecule, and the active hydrogen can cause an epoxy matrix resin to accelerate the curing reaction. For example, an epoxy matrix reacts with the amine compound to form a hydroxy group. The hydroxy group interacts with a carboxy group, a hydroxy group, and other groups on the surface of carbon fibers to form hydrogen-bonds, and this improves the adhesion. As described above, the disclosed method unfortunately still provides insufficient improvement result of the adhesion, which does not satisfy the requirements for recent composite materials.

Another disclosed example of using an amine compound as the sizing agent is a method using a cured product of a thermosetting resin and an amine compound (see Patent Literature 18). The disclosed method uses m-xylenediamine containing a primary amino group and piperazine containing a secondary amino group as the amine compounds. An object of the disclosed method is to improve the bindability and the handleability of carbon fiber bundles by actively reacting an active hydrogen contained in the amine compound with a thermosetting resin typified by an epoxy resin to form a cured product. The carbon fiber bundles are limited to be used for a chopped application and still have insufficient mechanical characteristics relating to the adhesion of a formed piece after melting and kneading with a thermoplastic resin.

Still another disclosed method includes using carbon fibers having a surface oxygen concentration O/C within a particular range, a surface concentration of hydroxy groups within a particular range, and a surface concentration of carboxylic groups within a particular range and applying, as a sizing agent, an aliphatic compound having a plurality of epoxy groups onto carbon fibers (see Patent Literature 19). Although the disclosed method provides improvement in EDS as an index of the adhesion, the method still achieves insufficient improvement effect of the adhesion between carbon fibers and a matrix resin, and the improvement effect of the adhesion is limited and is achieved only in the case of a combination with particular carbon fibers.

CITATION LIST

Patent Literature

Patent Literature 1: Japanese Patent Application Laid-open No. 4-361619

Patent Literature 2: U.S. Pat. No. 3,957,716

Patent Literature 3: Japanese Patent Application Laid-open No. 57-171767

Patent Literature 4: Japanese Patent Application Laid-open No. 7-009444

Patent Literature 5: Japanese Patent Application Laid-open No. 2000-336577

Patent Literature 6: Japanese Patent Application Laid-open No. 61-028074

Patent Literature 7: Japanese Patent Application Laid-open No. 01-272867

Patent Literature 8: Japanese Patent Application Laid-open No. 57-128266

Patent Literature 9: U.S. Pat. No. 4,555,446

Patent Literature 10: Japanese Patent Application Laid-open No. 62-033872

Patent Literature 11: U.S. Pat. No. 4,496,671

Patent Literature 12: Japanese Patent Application Laid-open No. 2010-31424

Patent Literature 13: Japanese Patent Application Laid-open No. 2005-320641

Patent Literature 14: Japanese Patent Application Laid-open No. 52-059794

Patent Literature 15: Japanese Patent Application Laid-open No. 52-045673

Patent Literature 16: Japanese Patent Application Laid-open No. 2005-146429

Patent Literature 17: Japanese Patent Application Laid-open No. 52-045672

Patent Literature 18: Japanese Patent Application Laid-open No. 9-217281

Patent Literature 19: U.S. Pat. No. 5,691,055

SUMMARY

Technical Problem

In view of the problems in the related art, an object of the present invention is to provide a carbon fiber forming raw material, a formed material, and a carbon fiber-reinforced composite material having excellent interfacial adhesion between carbon fibers and a matrix resin and having high mechanical characteristics.

Solution to Problem

The inventors of the present invention have found that the adhesion between carbon fibers and a matrix resin can be increased by applying a sizing agent containing a particular epoxy compound (A) and a particular tertiary amine compound and/or tertiary amine salt, a particular quaternary ammonium salt, and a particular quaternary phosphonium salt and/or phosphine compound (B) at a particular ratio onto the carbon fibers and annealing the coated carbon fibers at a particular temperature, and this can increase the mechanical characteristics of a carbon fiber-reinforced composite material, and have completed the present invention.

That is, the present invention is a carbon fiber forming raw material (Z) as a prepreg including sizing agent-coated carbon fibers coated with a sizing agent and a thermosetting resin, or a carbon fiber forming raw material (Y) as a forming material including sizing agent-coated carbon fibers coated with a sizing agent, the forming material having a woven fabric form or a braid form, wherein the sizing agent including:

a component (A) including an epoxy compound (A1) having two or more epoxy groups and/or an epoxy compound (A2) having one or more epoxy groups and at least one or more functional groups selected from a hydroxy group, an amido group, an imido group, a urethane group, a urea group, a sulfonyl group, and a sulfo group; and a component (B) being contained in an amount of 0.1 to 25 parts by mass relative to 100 parts by mass of the component (A) and including at least one reaction accelerator selected from the group consisting of:

a component [a] being a tertiary amine compound and/or a tertiary amine salt (B1) having a molecular weight of 100 g/mol or more, a component [b] being a quaternary ammonium salt (B2) having a cation site represented by General Formula (I):

(I)

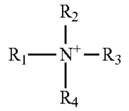

(where each of $R_1$ to $R_4$ is a C1-22 hydrocarbon group, the hydrocarbon group optionally has a hydroxy group, a $CH_2$ group in the hydrocarbon group is optionally substituted by —O—, —O—CO—, or —CO—O—) or General Formula (II):

(II)

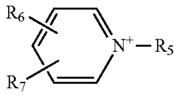

(where $R_5$ is a C1-22 hydrocarbon group, the hydrocarbon group optionally has a hydroxy group, and a $CH_2$ group in the hydrocarbon group is optionally substituted by —O—, —O—CO—, or —CO—O—; each of $R_6$ and $R_7$ is hydrogen or a C1-8 hydrocarbon group, and a $CH_2$ group in the hydrocarbon group is optionally substituted by —O—, —O—CO—, or —CO—O—), and a component [c] being a quaternary phosphonium salt and/or a phosphine compound (B3).

Moreover, in the carbon fiber forming raw material according to the above-described invention, the tertiary amine compound and/or the tertiary amine salt (B1) having a molecular weight of 100 g/mol or more is represented by General Formula (III):

(III)

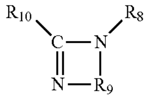

(where $R_8$ is a C1-22 hydrocarbon group, the hydrocarbon group optionally has a hydroxy group, and a $CH_2$ group in the hydrocarbon group is optionally substituted by —O—, —O—CO—, or —CO—O—; $R_9$ is a C2-22 alkylene group, a C2-22 alkenylene group, or a C2-22 alkynylene group; $R_{10}$ is hydrogen or a C1-22 hydrocarbon group, the hydrocarbon group optionally has a hydroxy group, and a $CH_2$ group in the hydrocarbon group is optionally substituted by —O—, —O—CO—, or —CO—O—; or $R_8$ and $R_{10}$ are optionally bonded to form a C2-11 alkylene group); General Formula (IV):

(IV)

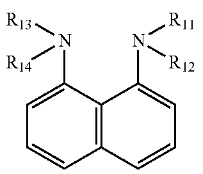

(where each of $R_{11}$ to $R_{14}$ is a C1-22 hydrocarbon group, the hydrocarbon group optionally has a hydroxy group, and a $CH_2$ group in the hydrocarbon group is optionally substituted by —O—, —O—CO—, or —CO—O—); General Formula (V):

(V)

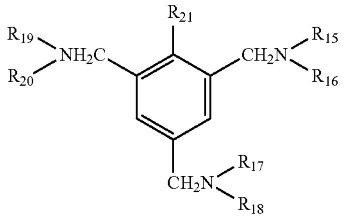

(where each of $R_{15}$ to $R_{20}$ is a C1-22 hydrocarbon group, the hydrocarbon group optionally has a hydroxy group, and a $CH_2$ group in the hydrocarbon group is optionally substituted by —O—, —O—CO—, or —CO—O—; $R_{21}$ is a hydroxy group or a C1-22 hydrocarbon group, the hydrocarbon group optionally has a hydroxy group, and a $CH_2$ group in the hydrocarbon group is optionally substituted by —O—, —O—CO—, or —CO—O—); General Formula (VI):

(VI)

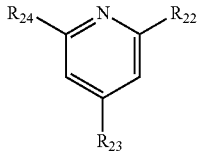

(where each of $R_{22}$ to $R_{24}$ is a C1-8 hydrocarbon group, and the hydrocarbon group optionally has a hydroxy group); General Formula (VII):

(VII)

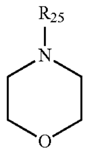

(where $R_{25}$ is a C1-8 hydrocarbon group, and the hydrocarbon group optionally has a hydroxy group); or General Formula (VIII):

(VIII)

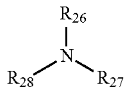

(where each of $R_{26}$ to $R_{28}$ is a C1-22 hydrocarbon group, the hydrocarbon group optionally has a hydroxy group, and a $CH_2$ group in the hydrocarbon group is optionally substituted by —O—, —O—CO—, or —CO—O—; and any of $R_{26}$ to $R_{28}$ contains at least one or more hydroxy groups has one or more branched structures represented by General Formula (IX):

(IX)

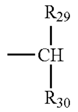

(where each of $R_{29}$ and $R_{30}$ is a C1-20 hydrocarbon group, the hydrocarbon group optionally has a hydroxy group, and a $CH_2$ group in the hydrocarbon group is optionally substituted by —O—, —O—CO—, or —CO—O—; where the total carbon number of $R_{29}$ and $R_{30}$ is 21 or less), or General Formula (X):

(X)

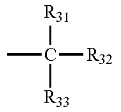

(where each of $R_{31}$ to $R_{33}$ is a hydroxy group or a C1-19 hydrocarbon group, the hydrocarbon group optionally has a hydroxy group, and a $CH_2$ group in the hydrocarbon group is optionally substituted by —O—, —O—CO—, or —CO—O—; where the total carbon number of $R_{31}$, $R_{32}$, and $R_{33}$ is 21 or less)).

Moreover, in the carbon fiber forming raw material according to the above-described invention, the compound represented by General Formula (III) is 1,5-diazabicyclo[4,3,0]-5-nonene, a salt thereof, 1,8-diazabicyclo[5,4,0]-7-undecene, or a salt thereof.

Moreover, in the carbon fiber forming raw material according to the above-described invention, the compound represented by General Formula (VIII) has at least two or more branched structures.

Moreover, in the carbon fiber forming raw material according to the above-described invention, the compound represented by General Formula (VIII) is triisopropanolamine or a salt thereof.

Moreover, in the carbon fiber forming raw material according to the above-described invention, in the compound represented by General Formula (I), each of $R_3$ and $R_4$ is a C2-22 hydrocarbon group, the hydrocarbon group optionally has a hydroxy group, and a $CH_2$ group in the hydrocarbon group is optionally substituted by —O—, —O—CO—, or —CO—O—.

Moreover, in the carbon fiber forming raw material according to the above-described invention, an anion site of the quaternary ammonium salt (B2) having the cation site is a halogen ion.

Moreover, in the carbon fiber forming raw material according to the above-described invention, the quaternary phosphonium salt and/or the phosphine compound (B3) is one or more compounds selected from a quaternary phosphonium salt including a cation site represented by General Formula (XI):

(XI)

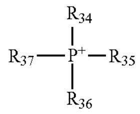

(where each of $R_{34}$ to $R_{37}$ is a C1-22 hydrocarbon group, the hydrocarbon group optionally has a hydroxy group, and a $CH_2$ group in the hydrocarbon group is optionally substituted by —O—, —O—CO—, or —CO—O—) and a phosphine compound represented by General Formula (XII):

(XII)

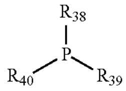

(where each of $R_{38}$ to $R_{40}$ is a C1-22 hydrocarbon group, the hydrocarbon group optionally has a hydroxy group, and a $CH_2$ group in the hydrocarbon group is optionally substituted by —O—, —O—CO—, or —CO—O—).

Moreover, in the carbon fiber forming raw material according to the above-described invention, the component (A) has an epoxy equivalent of less than 360 g/mol.

Moreover, in the carbon fiber forming raw material according to the above-described invention, the component (A) is an epoxy compound having three or more epoxy groups.

Moreover, in the carbon fiber forming raw material according to the above-described invention, the component (A) contains an aromatic ring in the molecule.

Moreover, in the carbon fiber forming raw material according to the above-described invention, the component (A1) is a phenol novolac epoxy resin, a cresol novolac epoxy resin, or a tetraglycidyldiaminodiphenylmethane.

Moreover, in the carbon fiber forming raw material according to the above-described invention, the carbon fibers have a surface oxygen concentration O/C of 0.05 to 0.5 determined by X-ray photoelectron spectroscopy.

Moreover, in the carbon fiber forming raw material according to the above-described invention, the carbon fibers are obtained by liquid phase electrolytic oxidation in an alkaline electrolytic solution or liquid phase electrolytic oxidation in an acid electrolytic solution and then washing the resulting fibers with an alkaline aqueous solution.

Moreover, in the carbon fiber forming raw material according to the above-described invention, the thermosetting resin in (Z) is an epoxy resin.

Moreover, in the carbon fiber forming raw material according to the above-described invention, the thermosetting resin in (Z) contains a multifunctional glycidylamine epoxy resin and an aromatic diamine curing agent.

Moreover, in the carbon fiber forming raw material according to the above-described invention, the thermosetting resin in (Z) contains a dicyclopentadiene epoxy resin (D), an epoxy resin (E) having an average epoxy equivalent of 1,000 or more and 10,000 or less, and a curing agent (F).

Moreover, in the carbon fiber forming raw material according to the above-described invention, the thermosetting resin in (Z) contains 10 to 60 parts by mass of an amine epoxy resin, 40 to 90 parts by mass of a bisphenol epoxy resin, 1 to 10 parts by mass of dicyandiamide or a derivative thereof, and 1 to 10 parts by mass of at least one block copolymer (G) selected from the group consisting of S—B-M, B-M, and M-B-M.

Moreover, in the carbon fiber forming raw material according to the above-described invention, the thermosetting resin in (Z) is an epoxy matrix resin containing a bisphenol epoxy resin (H) having a softening point of 90° C. or more, an amine epoxy resin (I) having three or more functional groups, a bisphenol F epoxy resin (J) having a number average molecular weight of 450 or less, and a curing agent (K) and contains 20 to 50 parts by mass of the component (H), 30 to 50 parts by mass of the component (I), and 10 to 40 parts by mass of the component (J) relative to 100 parts by mass of the total amount of the components (H) to (J).

Moreover, in the carbon fiber forming raw material according to the above-described invention, the prepreg in (Z) satisfies at least one requirement of:

(1) thermoplastic resin particles or fibers (L) and electrically conductive particles or fibers (M) are further contained, and the mass ratio represented by [amount (parts by mass) of (L)]/[amount (parts by mass) of (M)] is 1 to 1,000; and (2) electrically conductive particles or fibers (N) in which a thermoplastic resin nucleus or core is coated with an electrically conductive substance are further contained.

Moreover, in the carbon fiber forming raw material according to the above-described invention, the prepreg in (Z) has a width of 1 to 50 mm.

Moreover, a formed material according to the present invention is obtained by combining any one of the above-described forming base materials in (Y) with a thermosetting resin or a thermoplastic resin.

Moreover, a carbon fiber-reinforced composite material according to the present invention is obtained by forming any one of the above-described carbon fiber forming raw materials.

Moreover, a carbon fiber-reinforced composite material according to the present invention is obtained by forming the above-described formed material in (Y).

Advantageous Effects of Invention

In the present invention, the sizing agent mainly containing a particular epoxy compound (A) contains a particular tertiary amine compound and/or tertiary amine salt, a particular quaternary ammonium salt, and a particular quaternary phosphonium salt and/or phosphine compound (B) in particular amounts. Anneal treatment of the sizing agent under particular conditions accelerates the formation of a covalent bond between the epoxy compound and an oxygen-containing functional group originally present on the surface of carbon fibers or between the epoxy compound and an oxygen-containing functional group such as a carboxy group and a hydroxy group introduced by oxidation treatment. As a result, the present invention can produce a carbon fiber forming raw material, a formed material, and a carbon fiber-reinforced composite material that are significantly excellent in the adhesion to a matrix resin.

BRIEF DESCRIPTION OF DRAWINGS

FIG. 1 is a schematic view illustrating an example of an apparatus for producing a yarn prepreg pertaining to the present invention.

DESCRIPTION OF EMBODIMENTS

Hereinafter, embodiments for achieving a carbon fiber forming raw material, a formed material including a forming base material, and a carbon fiber-reinforced composite material obtained by forming the formed material or the carbon fiber forming raw material of the present invention will be described in more detail. The present invention is a carbon fiber forming raw material (Z) as a prepreg including sizing agent-coated carbon fibers coated with a sizing agent and a thermosetting resin or a carbon fiber forming raw material (Y) as a forming material that includes sizing agent-coated carbon fibers coated with a sizing agent and has a woven fabric form or a braid form, and the sizing agent is characterized by including the following components (A) and (B). First, the carbon fibers coated with the sizing agent including the components (A) and (B) will be described.

The component (A) used in the present invention is a compound (A1) having two or more epoxy groups in the molecule and/or an epoxy compound (A2) having one or more epoxy groups and at least one or more functional groups selected from a hydroxy group, an amido group, an imido group, a urethane group, a urea group, a sulfonyl group, and a sulfo group in the molecule.

The component (B) used in the present invention is at least one compound selected from a tertiary amine compound and/or a tertiary amine salt (B1) having a molecular weight of 100 g/mol or more, a quaternary ammonium salt (B2) having a cation site represented by General Formula (I):

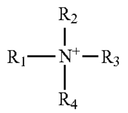

(I)

(where each of $R_1$ to $R_4$ is a C1-22 hydrocarbon group, the hydrocarbon group optionally has a hydroxy group, and a $CH_2$ group in the hydrocarbon group is optionally substituted by —O—, —O—CO—, or —CO—O—) or General Formula (II):

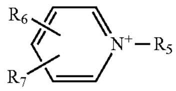

(II)

(where $R_5$ is a C1-22 hydrocarbon group, the hydrocarbon group optionally has a hydroxy group, and a $CH_2$ group in the hydrocarbon group is optionally substituted by —O—, —O—CO—, or —CO—O—; each of $R_6$ and $R_7$ is hydrogen or a C1-8 hydrocarbon group, and a $CH_2$ group in the hydrocarbon group is optionally substituted by —O—, —O—CO—, or —CO—O—), and a quaternary phosphonium salt and/or a phosphine compound (B3).

In the present invention, the sizing agent to be used preferably includes at least one component (B) selected from (B1), (B2), and (B3) in an amount of 0.1 to 25 parts by mass relative to 100 parts by mass of the component (A).

Although not certain, the mechanism of improving the adhesion by applying the sizing agent containing particular amounts of the component (A) and the component (B) onto carbon fibers and annealing the carbon fibers coated at a temperature ranging from 160 to 260° C. for 30 seconds to 600 seconds is supposed as follows: first, the component (B) reacts with an oxygen-containing functional group such as a carboxy group and a hydroxy group of carbon fibers used in the present invention and abstracts a hydrogen ion contained in the functional group to form an anionic functional group; and then the anionic functional group undergoes a nucleophilic reaction with an epoxy group contained in the component (A). This generates a strong bonding between the carbon fibers used in the present invention and the epoxy group in the sizing agent. The relation of each of (A1) and (A2) with a matrix resin will be explained as below.

In the case of (A1), a remaining epoxy group that does not contribute to the covalent bond to carbon fibers used in the present invention reacts with a functional group contained in a matrix resin to form a covalent bond or to form a hydrogen bond. In particular, when the matrix resin is an epoxy resin, it is supposed that the reaction of an epoxy group in (A1) with an epoxy group in the matrix resin and the reaction through an amine curing agent contained in the epoxy resin form a strong interface. The structure of (A1) preferably contains one or more unsaturated groups. In such a case, when a matrix resin is a radical-polymerizable resin such as an unsaturated polyester resin and a vinyl ester resin, the unsaturated group in (A1) can undergo radical reaction with the unsaturated group in the matrix resin to form a strong interface.

In the case of (A2), the epoxy group in (A2) forms a covalent bond with an oxygen-containing functional group such as a carboxy group and a hydroxy group of carbon fibers used in the present invention. A remaining functional group, which is a hydroxy group, an amido group, an imido group, a urethane group, a urea group, a sulfonyl group, or a sulfo group, is supposed to form an interaction such as a covalent bond and a hydrogen bond depending on a matrix resin. When the matrix resin is an epoxy resin, it is supposed that a strong interface can be formed by the interaction of a hydroxy group, an amido group, an imido group, a urethane group, a urea group, a sulfonyl group, or a sulfo group in (A2) with an epoxy group in the matrix resin or with a hydroxy group formed by the reaction of an amine curing agent with an epoxy group. When the matrix resin is a thermoplastic resin typified by polyamide, polyester, and acid-modified polyolefin, it is supposed that a strong interface can be formed by the interaction of a hydroxy group, an amido group, an imido group, a urethane group, a urea group, a sulfonyl group, or a sulfo group in (A2) with an amido group, an ester group, an acid anhydride group, a carboxy group such as a terminal carboxy group, a hydroxy group, or an amino group contained in such a matrix resin.

In other words, the remaining epoxy group that does not contribute to the covalent bond to carbon fibers in (A1) is supposed to have a function corresponding to that of a hydroxy group, an amido group, an imido group, a urethane group, a urea group, a sulfonyl group, or a sulfo group in (A2).

In the present invention, the epoxy compound (A) preferably has an epoxy equivalent of less than 360 g/mol, more preferably less than 270 g/mol, and even more preferably less than 180 g/mol. An epoxy compound having an epoxy equivalent of less than 360 g/mol forms a covalent bond at high density and further improves the adhesion between carbon fibers and a matrix resin. Although the lower limit of the epoxy equivalent is not particularly limited, an epoxy compound having an epoxy equivalent of less than 90 g/mol may not further improve the adhesion.

In the present invention, the epoxy compound (A) is preferably an epoxy resin having three or more epoxy groups and more preferably an epoxy resin having four or more epoxy groups. In the epoxy compound (A) that is an epoxy resin having three or more epoxy groups in the molecule, even when one epoxy group forms a covalent bond with an oxygen-containing functional group on the surface of carbon fibers, two or more remaining epoxy groups can form a covalent bond or a hydrogen bond with a matrix resin. This further improves the adhesion. Although the upper limit of the number of epoxy groups is not particular limited, an epoxy compound having ten or more epoxy groups may not further improve the adhesion.

In the present invention, the epoxy compound (A) is preferably an epoxy resin having two or more types of functional groups, where the number of the functional groups is three or more. The epoxy compound (A) is more preferably an epoxy resin having two or more types of functional groups, where the number of the functional groups is four or more. The functional group contained in the epoxy compound is, in addition to the epoxy group, preferably selected from a hydroxy group, an amido group, an imido group, a urethane group, a urea group, a sulfonyl group, or a sulfo group. In the epoxy compound (A) that is an epoxy resin having three or more epoxy groups or other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion. Although the upper limit of the number of epoxy groups is not particular limited, an epoxy compound having ten or more epoxy groups may not further improve the adhesion.

In the present invention, the epoxy compound (A) preferably has one or more aromatic rings in the molecule and more preferably two or more aromatic rings. In a carbon fiber-reinforced composite material including carbon fibers and a matrix resin, what is called an interface layer near the carbon fibers is affected by the carbon fibers or a sizing agent and thus may have different characteristics from those of the matrix resin. When the epoxy compound (A) has one or more aromatic rings, a rigid interface layer is formed to improve the stress transmission capacity between carbon fibers and a matrix resin, and this improves mechanical characteristics such as 0° tensile strength of a carbon fiber-reinforced composite material. Although the upper limit of the number of aromatic rings is not particular limited, an epoxy compound having ten or more aromatic rings may not further improve the mechanical characteristics.

In the present invention, the epoxy compound (A1) is preferably any of a phenol novolac epoxy resin, a cresol novolac epoxy resin, and tetraglycidyldiaminodiphenylmethane. These epoxy resins have a large number of epoxy groups, a small epoxy equivalent, and two or more aromatic rings and thus improve the adhesion between carbon fibers and a matrix resin and the mechanical characteristics such as 0° tensile strength of a carbon fiber-reinforced composite material. The epoxy resin having two or more functional groups is more preferably a phenol novolac epoxy resin or a cresol novolac epoxy resin.

In the present invention, specific examples of the epoxy compound (A1) having two or more epoxy groups include glycidyl ether epoxy resins derived from polyols, glycidylamine epoxy resins derived from amines having a plurality of active hydrogens, glycidyl ester epoxy resins derived from polycarboxylic acids, and epoxy resins obtained by oxidation of compounds having a plurality of double bonds in the molecule.

Examples of the glycidyl ether epoxy resin include glycidyl ether epoxy resins obtained by reaction of epichlorohydrin with bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. Examples of the glycidyl ether epoxy resin also include glycidyl ether epoxy resins obtained by reaction of epichlorohydrin with ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. Additional examples of the glycidyl ether epoxy resin include glycidyl ether epoxy resins having a dicyclopentadiene structure and glycidyl ether epoxy resins having a biphenylaralkyl structure.

Examples of the glycidylamine epoxy resin include N,N-diglycidylaniline, N,N-diglycidyl-o-toluidine, 1,3-bis(aminomethyl)cyclohexane, m-xylylenediamine, m-phenylenediamine, 4,4'-diaminodiphenylmethane, and 9,9-bis(4-aminophenyl)fluorene.

Examples of the glycidylamine epoxy resin also include epoxy resins obtained by reaction of epichlorohydrin with both a hydroxy group and an amino group of an aminophenol such as m-aminophenol, p-aminophenol, and 4-amino-3-methylphenol.

Examples of the glycidyl ester epoxy resin include glycidyl ester epoxy resins obtained by reaction of epichlorohydrin with phthalic acid, terephthalic acid, hexahydrophthalic acid, and a dimer acid.

Examples of the epoxy resin obtained by oxidation of a compound having a plurality of double bonds in the molecule include epoxy resins having an epoxycyclohexane ring in the molecule. Examples of the epoxy resin further include epoxidized soybean oil.

In addition to these epoxy resins, the epoxy compound (A1) used in the present invention is exemplified by epoxy resins such as triglycidyl isocyanurate. Examples of the epoxy compound (A1) further include epoxy resins synthesized from the epoxy resins exemplified above as a raw material, including epoxy resins synthesized by an oxazolidone ring formation reaction of bisphenol A diglycidyl ether and tolylene diisocyanate.

In the present invention, specific examples of the epoxy compound (A2) having one or more epoxy groups and at least one or more functional groups selected from a hydroxy group, an amido group, an imido group, a urethane group, a urea group, a sulfonyl group, and a sulfo group include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the compound having an epoxy group and a hydroxy group include sorbitol polyglycidyl ethers and glycerol polyglycidyl ethers and specifically include Denacol (trademark registration) EX-611, EX-612, EX-614, EX-614B, EX-622, EX-512, EX-521, EX-421, EX-313, EX-314, and EX-321 (manufactured by Nagase ChemteX Corporation).

Examples of the compound having an epoxy group and an amido group include glycidylbenzamide and amide-modified epoxy resins. The amide-modified epoxy resin can be prepared by reaction of a carboxy group of a dicarboxylic amide with an epoxy group of an epoxy resin having two or more epoxy groups.

Examples of the compound having an epoxy group and an imido group include glycidylphthalimide. Specific examples of the compound include Denacol (trademark registration) EX-731 (manufactured by Nagase ChemteX Corporation).

Examples of the compound having an epoxy group and a urethane group include urethane-modified epoxy resins and specifically include Adeka Resin (trademark registration) EPU-78-13S, EPU-6, EPU-11, EPU-15, EPU-16A, EPU-16N, EPU-17T-6, EPU-1348, and EPU-1395 (manufactured by ADEKA). In addition, the compound can be prepared by reacting the terminal hydroxy group of a polyethylene oxide monoalkyl ether with a polyvalent isocyanate in an amount equivalent to that of the terminal hydroxy group and then reacting the isocyanate residue of the obtained reaction product with a hydroxy group of a polyvalent epoxy resin. Examples of the polyvalent isocyanate used here include 2,4-tolylene diisocyanate, meta-phenylene diisocyanate, para-phenylene diisocyanate, diphenylmethane diisocyanate, hexamethylene diisocyanate, isophorone diisocyanate, norbornane diisocyanate, triphenylmethane triisocyanate, and biphenyl-2,4,4'-triisocyanate.

Examples of the compound having an epoxy group and a urea group include urea-modified epoxy resins. The urea-modified epoxy can be prepared by reaction of a carboxy group of a dicarboxylic acid urea with an epoxy group of an epoxy resin having two or more epoxy groups.

Examples of the compound having an epoxy group and a sulfonyl group include bisphenol S epoxies.

Examples of the compound having an epoxy group and a sulfo group include glycidyl p-toluenesulfonate and glycidyl 3-nitrobenzenesulfonate.

(B1) to (B3) included in the component (B) will be described in sequence hereinafter.

The tertiary amine compound and/or the tertiary amine salt (B1) having a molecular weight of 100 g/mol or more used in the present invention is required to be contained in an amount of 0.1 to 25 parts by mass and is preferably contained in an amount of 0.5 to 20 parts by mass, more preferably 2 to 15 parts by mass, and even more preferably 2 to 8 parts by mass, relative to 100 parts by mass of the epoxy compound (A). If containing the tertiary amine compound and/or the tertiary amine salt in an amount of less than 0.1 part by mass, the sizing agent fails to accelerate the formation of a covalent bond between the epoxy compound (A) and an oxygen-containing functional group on the surface of carbon fibers, resulting in insufficient adhesion between the carbon fibers and a matrix resin. If contained in an amount of more than 25 parts by mass, the tertiary amine compound and/or the tertiary amine salt (B1) covers the surface of carbon fibers to interfere with the formation of a covalent bond, resulting in insufficient adhesion between the carbon fibers and a matrix resin.

The tertiary amine compound and/or the tertiary amine salt (B1) having a molecular weight of 100 g/mol or more used in the present invention is required to have a molecular weight of 100 g/mol or more and preferably has a molecular weight ranging from 100 to 400 g/mol, more preferably from 100 to 300 g/mol, and even more preferably from 100 to 200 g/mol. When having a molecular weight of 100 g/mol or more, the tertiary amine compound and/or the tertiary amine salt is suppressed to volatilize even during anneal treatment and thus can provide large adhesion improvement effect even in a small amount. When having a molecular weight of 400 g/mol or less, the tertiary amine compound and/or the tertiary amine salt has an active site at a high ratio in the molecule and thus can also provide large adhesion improvement effect even in a small amount.

The tertiary amine compound used in the present invention is a compound having a tertiary amino group in the molecule. The tertiary amine salt used in the present invention is a salt obtained by neutralizing a compound having a tertiary amino group with a proton donor. Here, the proton donor is a compound having an active hydrogen and capable of donating the active hydrogen as a proton to the compound having a tertiary amino group. The active hydrogen is a hydrogen atom to be donated as a proton to a basic compound.

Examples of the proton donor include inorganic acids, organic acids such as a carboxylic acid, a sulfonic acid, and a phenol, alcohols, mercaptans, and 1,3-dicarbonyl compounds.

Specific examples of the inorganic acid include sulfuric acid, sulfurous acid, persulfuric acid, hydrochloric acid, perchloric acid, nitric acid, phosphoric acid, phosphorous acid, hypophosphorous acid, phosphonic acid, phosphinic acid, pyrophosphoric acid, tripolyphosphoric acid, and amidosulfuric acid. Among them, sulfuric acid, hydrochloric acid, nitric acid, and phosphoric acid are preferably used.

The carboxylic acids are classified into aliphatic polycarboxylic acids, aromatic polycarboxylic acids, S-containing polycarboxylic acids, aliphatic hydroxycarboxylic acids, aromatic hydroxycarboxylic acids, aliphatic monocarboxylic acids, and aromatic monocarboxylic acids, which are exemplified by the compounds below.

Specific examples of the aliphatic polycarboxylic acid include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, 3,3-dimethylglutaric acid, 3-methyladipic acid, maleic acid, fumaric acid, itaconic acid, and citraconic acid.

Specific examples of the aromatic polycarboxylic acid include phthalic acid, isophthalic acid, terephthalic acid, trimellitic acid, and pyromellitic acid.

Specific examples of the S-containing polycarboxylic acid include thiodipropionic acid.

Specific examples of the aliphatic hydroxycarboxylic acid include glycolic acid, lactic acid, tartaric acid, and castor fatty acid.

Specific examples of the aromatic hydroxycarboxylic acid include salicylic acid, mandelic acid, 4-hydroxybenzoic acid, 1-hydroxy-2-naphthoic acid, 3-hydroxy-2-naphthoic acid, and 6-hydroxy-2-naphthoic acid.

Specific examples of the aliphatic monocarboxylic acid include formic acid, acetic acid, propionic acid, butyric acid, isobutyric acid, valeric acid, caproic acid, enanthic acid, caprylic acid, octanoic acid, pelargonic acid, lauric acid, myristic acid, stearic acid, behenic acid, undecanoic acid, acrylic acid, methacrylic acid, crotonic acid, and oleic acid.

Specific examples of the aromatic monocarboxylic acid include benzoic acid, cinnamic acid, naphthoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, methoxybenzoic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, n-butylaminobenzoic acid, N-isobutylaminobenzoic acid, N-sec-butylaminobenzoic acid, N-tert-butylaminobenzoic acid, N,N-dimethylaminobenzoic acid, N,N-diethylaminobenzoic acid, nitrobenzoic acid, and fluorobenzoic acid.

Among the carboxylic acids above, the aromatic polycarboxylic acids, the aliphatic monocarboxylic acids, and the aromatic carboxylic acids are preferably used, and phthalic acid, formic acid, and octanoic acid are specifically preferably used.

The sulfonic acids can be classified into aliphatic sulfonic acids and aromatic sulfonic acids, which are exemplified by compounds below.

Of the aliphatic sulfonic acids, specific examples of the monovalent saturated aliphatic sulfonic acid include methanesulfonic acid, ethanesulfonic acid, propanesulfonic acid, isopropylsulfonic acid, butanesulfonic acid, isobutylsulfonic acid, tert-butylsulfonic acid, pentanesulfonic acid, isopentylsulfonic acid, hexanesulfonic acid, nonanesulfonic acid, decanesulfonic acid, undecanesulfonic acid, dodecanesulfonic acid, tridecanesulfonic acid, tetradecanesulfonic acid, n-octylsulfonic acid, dodecylsulfonic acid, and cetylsulfonic acid.

The aliphatic sulfonic acid may be an unsaturated aliphatic sulfonic acid, and specific examples of the unsaturated aliphatic sulfonic acid include ethylenesulfonic acid and 1-propene-1-sulfonic acid.

Of the aliphatic sulfonic acids, specific examples of the divalent or polyvalent aliphatic sulfonic acid include methionic acid, 1,1-ethanedisulfonic acid, 1,2-ethanedisulfonic acid, 1,1-propanedisulfonic acid, 1,3-propanedisulfonic acid, and polyvinylsulfonic acid.

The aliphatic sulfonic acid may be an oxyaliphatic sulfonic acid having a hydroxy group, and specific examples of the oxyaliphatic sulfonic acid include isethionic acid and 3-oxy-propanesulfonic acid.

The aliphatic sulfonic acid may be a sulfoaliphatic carboxylic acid, and specific examples of the sulfoaliphatic carboxylic acid include sulfoacetic acid and sulfosuccinic acid.

The aliphatic sulfonic acid may be a sulfoaliphatic carboxylic acid ester, and specific examples of the sulfoaliphatic carboxylic acid ester include di(2-ethylhexyl)sulfosuccinate.

The aliphatic sulfonic acid may be a fluorosulfonic acid, and specific example of the fluorosulfonic acid include trifluoromethanesulfonic acid, perfluoroethanesulfonic acid, perfluoropropanesulfonic acid, perfluoroisopropylsulfonic acid, perfluorobutanesulfonic acid, perfluoroisobutylsulfonic acid, perfluoro-tert-butylsulfonic acid, perfluoropentanesulfonic acid, perfluoroisopentylsulfonic acid, perfluorohexanesulfonic acid, perfluorononanesulfonic acid, perfluorodecanesulfonic acid, perfluoroundecanesulfonic acid, perfluorododecanesulfonic acid, perfluorotridecanesulfonic acid, perfluorotetradecanesulfonic acid, perfluoro-n-octylsulfonic acid, perfluorododecylsulfonic acid, and perfluorocetylsulfonic acid.

Of the aromatic sulfonic acids, specific examples of the monovalent aromatic sulfonic acid include benzenesulfonic acid, p-toluenesulfonic acid, o-toluenesulfonic acid, m-toluenesulfonic acid, o-xylene-4-sulfonic acid, m-xylene-4-sulfonic acid, 4-ethylbenzenesulfonic acid, 4-propylbenzenesulfonic acid, 4-butylbenzenesulfonic acid, 4-dodecylbenzenesulfonic acid, 4-octylbenzenesulfonic acid, 2-methyl-5-isopropylbenzenesulfonic acid, 2-naphthalenesulfonic acid, butylnaphthalenesulfonic acid, t-butylnaphthalenesulfonic acid, 2,4,5-trichlorobenzenesulfonic acid, benzylsulfonic acid, and phenylethanesulfonic acid.

Of the aromatic sulfonic acids, specific examples of the divalent or polyvalent aromatic sulfonic acid include m-benzenedisulfonic acid, 1,4-naphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, and sulfonated polystyrene.

The aromatic sulfonic acid may be an oxyaromatic sulfonic acid, and specific examples of the oxyaromatic sulfonic acid include phenol-2-sulfonic acid, phenol-3-sulfonic acid, phenol-4-sulfonic acid, anisole-o-sulfonic acid, anisole-m-sulfonic acid, phenetole-o-sulfonic acid, phenetole-m-sulfonic acid, phenol-2,4-disulfonic acid, phenol-2,4,6-trisulfonic acid, anisole-2,4-disulfonic acid, phenetole-2,5-disulfonic acid, 2-oxytoluene-4-sulfonic acid, pyrocatechin-4-sulfonic acid, veratrole-4-sulfonic acid, resorcin-4-sulfonic acid, 2-oxy-1-methoxybenzene-4-sulfonic acid, 1,2-dioxybenzene-3,5-disulfonic acid, resorcin-4,6-disulfonic acid, hydroquinonesulfonic acid, hydroquinone-2,5-disulfonic acid, and 1,2,3-trioxybenzene-4-sulfonic acid.

The aromatic sulfonic acid may be a sulfoaromatic carboxylic acid, and specific examples of the sulfoaromatic carboxylic acid include o-sulfobenzoic acid, m-sulfobenzoic acid, p-sulfobenzoic acid, 2,4-disulfobenzoic acid, 3-sulfophthalic acid, 3,5-disulfophthalic acid, 4-sulfoisophthalic acid, 2-sulfoterephthalic acid, 2-methyl-4-sulfobenzoic acid, 2-methyl-3,5-disulfobenzoic acid, 4-propyl-3-sulfobenzoic acid, 2,4,6-trimethyl-3-sulfobenzoic acid, 2-methyl-5-sulfoterephthalic acid, 5-sulfosalicylic acid, and 3-oxy-4-sulfobenzoic acid.

The aromatic sulfonic acid may be a thioaromatic sulfonic acid, and specific examples of the thioaromatic sulfonic acid include thiophenolsulfonic acid, thioanisole-4-sulfonic acid, and thiophenetole-4-sulfonic acid.

Of the aromatic sulfonic acids, specific examples of the aromatic sulfonic acid having other functional groups include benzaldehyde-o-sulfonic acid, benzaldehyde-2,4-disulfonic acid, acetophenone-o-sulfonic acid, acetophenone-2,4-disulfonic acid, benzophenone-o-sulfonic acid, benzophenone-3,3'-disulfonic acid, 4-aminophenol-3-sulfonic acid, anthraquinone-1-sulfonic acid, anthraquinone-2-sulfonic acid, anthraquinone-1,5-disulfonic acid, anthraquinone-1,8-disulfonic acid, anthraquinone-2,6-disulfonic acid, and 2-methylanthraquinone-1-sulfonic acid.

Among the sulfonic acids above, the monovalent aromatic sulfonic acids are preferably used, and benzenesulfonic acid, p-toluenesulfonic acid, o-toluenesulfonic acid, and m-toluenesulfonic acid are specifically preferably used.

Of the phenols, specific examples of the phenol having one active hydrogen in the molecule include phenol, cresol, ethylphenol, n-propylphenol, isopropylphenol, n-butylphenol, sec-butylphenol, tert-butylphenol, cyclohexylphenol, dimethylphenol, methyl-tert-butylphenol, di-tert-butylphenol, chlorophenol, bromophenol, nitrophenol, methoxyphenol, and methyl salicylate.

Specific examples of the phenol having two active hydrogens in the molecule include hydroquinone, resorcinol, catechol, methylhydroquinone, tert-butylhydroquinone, benzylhydroquinone, phenylhydroquinone, dimethylhydroquinone, methyl-tert-butylhydroquinone, di-tert-butylhydroquinone, trimethylhydroquinone, methoxyhydroquinone, methylresorcinol, tert-butylresorcinol, benzylresorcinol, phenylresorcinol, dimethylresorcinol, methyl-tert-butylresorcinol, di-tert-butylresorcinol, trimethylresorcinol, methoxyresorcinol, methylcatechol, tert-butylcatechol, benzylcatechol, phenylcatechol, dimethylcatechol, methyl-tert-butylcatechol, di-tert-butylcatechol, trimethylcatechol, methoxycatechol, biphenols such as biphenol, 4,4'-dihydroxy-3,3',5,5'-tetramethylbiphenyl, and 4,4'-dihydroxy-3,3',5,5'-tetra-tert-butylbiphenyl, bisphenol A, 4,4'-dihydroxy-3,3',5,5'-tetramethyl bisphenol A, 4,4'-dihydroxy-3,3',5,5'-tetra-tert-butyl bisphenol A, bisphenol F, 4,4'-dihydroxy-3,3',5,5'-tetramethyl bisphenol F, 4,4'-dihydroxy-3,3°,5,5'-tetra-tert-butyl bisphenol F, bisphenol AD, 4,4'-dihydroxy-3,3',5,5'-tetramethyl bisphenol AD, and 4,4'-dihydroxy-3,3',5,5'-tetra-tert-butyl bisphenol AD.

Examples of the phenol having two active hydrogens in the molecule also include bisphenols represented by Structural Formula (XIII):

(XIII)

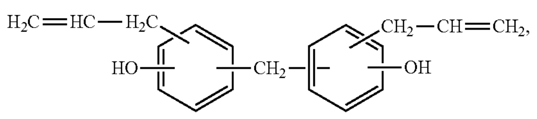

Structural Formula (XIV):

(XIV)

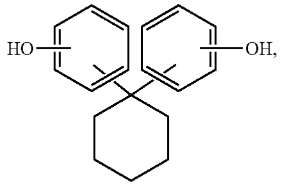

Structural Formula (XV):

(XV)

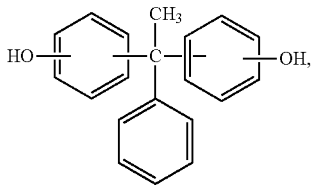

Structural Formula (XVI):

(XVI)

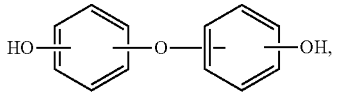

Structural Formula (XVII):

(XVII)

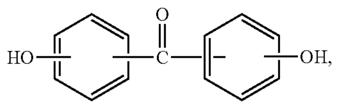

Structural Formula (XVIII):

(XVIII)

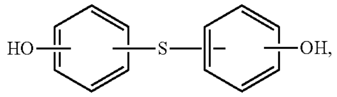

-continued

Structural Formula (XIX):

(XIX)

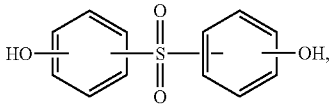

a terpene phenol, and a compound represented by

Structural Formula (XX):

(XX)

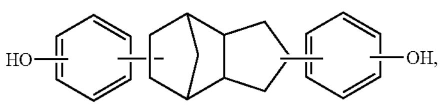

or

Structural Formula (XXI):

(XXI)

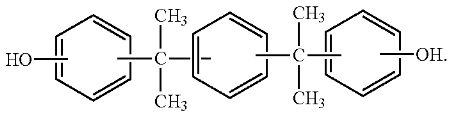

Specific examples of the phenol having three active hydrogens in the molecule include trihydroxybenzene and tris(p-hydroxyphenyl)methane. Specific examples of the phenol having four active hydrogens in the molecule include tetrakis(p-hydroxyphenyl)ethane. Specific examples of other phenols include phenol novolacs obtained by reaction of phenol, an alkylphenol, and a halogenated phenol with formaldehyde.

Among the phenols, phenol and the phenol novolac are preferably used.

The alcohols is exemplified by alcohols having two hydroxy groups in the molecule, and examples of the alcohol include 1,2-ethanediol, 1,2-propanediol, 1,3-propanediol, 1,3-butanediol, 1,4-butanediol, 1,5-pentanediol, 1,1-dimethyl-1,3-propanediol, 2,2-dimethyl-1,3-propanediol, 2-methyl-2,4-pentanediol, 1,4-cyclohexanediol, 1,4-cyclohexanedimethanol, diethylene glycol, triethylene glycol, dodecahydrobisphenol A, an ethylene oxide adduct of bisphenol A represented by Structural Formula (XXII):

(XXII)

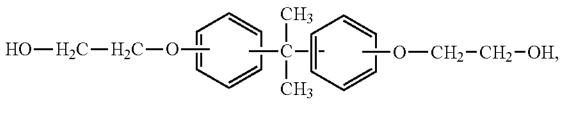

a propylene oxide adduct of bisphenol A represented by Structural Formula (XXIII):

(XXIII)

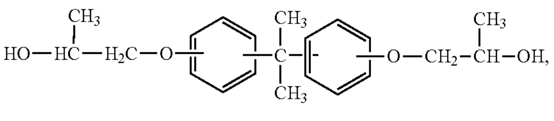

an ethylene oxide adduct of dodecahydrobisphenol A represented by Structural Formula (XXIV):

(XXIV)

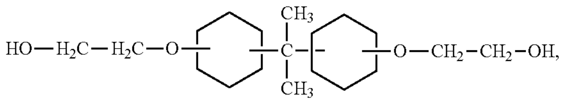

a propylene oxide adduct of dodecahydrobisphenol A represented by Structural Formula (XXV):

(XXV)

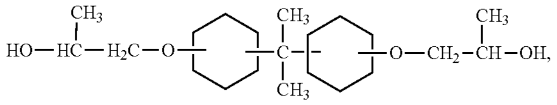

glycerin, trimethylolethane, and trimethylolpropane. Specific examples of the alcohol having four hydroxy groups in the molecule include pentaerythritol.

The mercaptans are exemplified by mercaptans having an active hydrogen in the molecule, and examples of the mercaptan include methanethiol, ethanethiol, 1-propanethiol, 2-propanethiol, 1-butanethiol, 2-methyl-1-propanethiol, 2-butanethiol, 2-methyl-2-propanethiol, 1-pentanethiol, 1-hexanethiol, 1-heptanethiol, 1-octanethiol, cyclopentanethiol, cyclohexanethiol, benzylmercaptan, benzenethiol, toluenethiol, chlorobenzenethiol, bromobenzenethiol, nitrobenzenethiol, and methoxybenzenethiol.

Specific examples of the mercaptan having two active hydrogens in the molecule include 1,2-ethanedithiol, 1,3-propanedithiol, 1,4-butanedithiol, 1,5-pentanedithiol, 2,2'-oxydiethanethiol, 1,6-hexanedithiol, 1,2-cyclohexanedithiol, 1,3-cyclohexanedithiol, 1,4-cyclohexanedithiol, 1,2-benzenedithiol, 1,3-benzenedithiol, and 1,4-benzenethiol.

Examples of the 1,3-dicarbonyl compound include 2,4-pentanedione, 3-methyl-2,4-pentanedione, 3-ethyl-2,4-pentanedione, 3,5-heptanedione, 4,6-nonanedione, 2,6-dimethyl-3,5-heptanedione, 2,2,6,6-tetramethyl-3,5-heptanedione, 1-phenyl-1,3-butanedione, 1,3-diphenyl-1,3-propanedione, 1,3-cyclopentanedione, 2-methyl-1,3-cyclopentanedione, 2-ethyl-1,3-cyclopentanedione, 1,3-cyclohexanedione, 2-methyl-1,3-cyclohexanedione, 2-ethyl-cyclohexanedione, 1,3-indanedione, ethyl acetoacetate, and diethyl malonate.

The tertiary amine compound and/or the tertiary amine salt (B1) having a molecular weight of 100 g/mol or more used in the present invention is characterized by having General Formula (III):

(III)

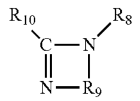

(where $R_8$ is a C1-22 hydrocarbon group, the hydrocarbon group optionally has a hydroxy group, and a $CH_2$ group in the hydrocarbon group is optionally substituted by —O—, —O—CO—, or —CO—O—; $R_9$ is a C2-22 alkylene group, a C2-22 alkenylene group, or a C2-22 alkynylene group; and $R_{10}$ is hydrogen or a C1-22 hydrocarbon group, the hydrocarbon group optionally has a hydroxy group, and a $CH_2$ group in the hydrocarbon group is optionally substituted by —O—, —O—CO—, or —CO—O—; or $R_8$ and $R_{10}$ may be bonded to form a C2-11 alkylene group), General Formula (IV):

(IV)

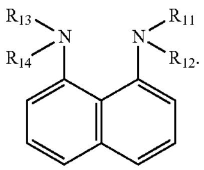

(where each of $R_{11}$ to $R_{14}$ is a C1-22 hydrocarbon group, the hydrocarbon group optionally has a hydroxy group, and a $CH_2$ group in the hydrocarbon group is optionally substituted by —O—, —O—CO—, or —CO—O—), General Formula (V):

(V)

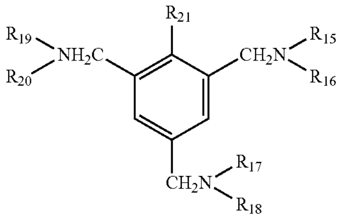

(where each of $R_{15}$ to $R_{20}$ is a C1-22 hydrocarbon group, the hydrocarbon group optionally has a hydroxy group, and a $CH_2$ group in the hydrocarbon group is optionally substituted by —O—, —O—CO—, or —CO—O—; $R_{21}$ is a hydroxy group or a C1-22 hydrocarbon group, the hydrocarbon group optionally has a hydroxy group, and a $CH_2$ group in the hydrocarbon group is optionally substituted by —O—, —O—CO—, or —CO—O—), General Formula (VI):

(VI)

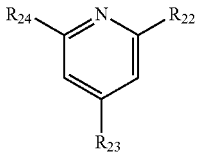

(where each of $R_{22}$ to $R_{24}$ is a C1-8 hydrocarbon group, and the hydrocarbon group optionally has a hydroxy group), General Formula (VII):

(VII)

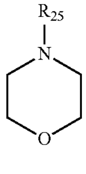

(where $R_{25}$ is a C1-8 hydrocarbon group, and the hydrocarbon group optionally has a hydroxy group), or General Formula (VIII):

(VIII)

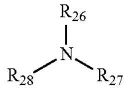

(where each of $R_{26}$ to $R_{28}$ is a C1-22 hydrocarbon group, the hydrocarbon group optionally has a hydroxy group, and a $CH_2$ group in the hydrocarbon group is optionally substituted by —O—, —O—CO—, or —CO—O—; and any of $R_{26}$ to $R_{28}$ has one or more branched structures represented by General Formula (IX) or (X):

(IX)

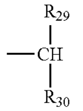

(where each of $R_{29}$ and $R_{30}$ is a C1-20 hydrocarbon group, the hydrocarbon group optionally has a hydroxy group, and a $CH_2$ group in the hydrocarbon group is optionally substituted by —O—, —O—CO—, or —CO—O—; where the total carbon number of $R_{29}$ and $R_{30}$ is 21 or less)

(X)

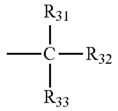

(where each of $R_{31}$ to $R_{33}$ is a hydroxy group or a C1-19 hydrocarbon group, the hydrocarbon group optionally has a hydroxy group, and a $CH_2$ group in the hydrocarbon group is optionally substituted by —O—, —O—CO—, or —CO—O—; where the total carbon number of $R_{31}$, $R_{32}$, and $R_{33}$ is 21 or less) and has at least one or more hydroxy groups).

In General Formulae (III) to (V) and (VIII) of the present invention, each of $R_8$, $R_{11}$ to $R_{20}$, and $R_{26}$ to $R_{28}$ is a C1-22 hydrocarbon group, the hydrocarbon group optionally has a hydroxy group, and a $CH_2$ group in the hydrocarbon group is optionally substituted by —O—, —O—CO—, or —CO—O—. When having the substituent with a carbon number ranging from 1 to 22, the molecular structure has an adequately small steric hindrance and thus increases the reaction acceleration effect to improve the adhesion. The carbon number is more preferably in a range from 1 to 14 and even more preferably from 1 to 8. When having the substituent with a carbon number of more than 22, the molecular structure has a slightly large steric hindrance and thus may reduce the reaction acceleration effect.

In General Formula (V) of the present invention, $R_{21}$ is a hydroxy group or a C1-22 hydrocarbon group, the hydrocarbon group optionally has a hydroxy group, and a $CH_2$ group in the hydrocarbon group is optionally substituted by —O—, —O—CO—, or —CO—O—. When having the substituent with a carbon number ranging from 1 to 22, the molecular structure has an adequately small steric hindrance and thus increases the reaction acceleration effect to improve the adhesion. The carbon number is more preferably in a range from 1 to 14 and even more preferably from 1 to 8. When having the substituent with a carbon number of more than 22, the molecular structure has a slightly large steric hindrance and thus may reduce the reaction acceleration effect.

In General Formula (III) of the present invention, $R_9$ is a C2-22 alkylene group, a C2-22 alkenylene group, or a C2-22 alkynylene group. When having the substituent with a carbon number ranging from 2 to 22, the molecular structure has an adequately small steric hindrance and thus increases the reaction acceleration effect to improve the adhesion. The carbon number is preferably in a range from 3 to 22, more preferably from 3 to 14, and even more preferably from 3 to 8. When having the substituent with a carbon number of more than 22, the molecular structure has a slightly large steric hindrance and thus may reduce the reaction acceleration effect.

In General Formula (III) of the present invention, $R_{10}$ is hydrogen or a C1-22 hydrocarbon group, the hydrocarbon group optionally has a hydroxy group, and a $CH_2$ group in the hydrocarbon group is optionally substituted by —O—, —O—CO—, or —CO—O—. When having the substituent with a carbon number ranging from 1 to 22, the molecular structure has an adequately small steric hindrance and thus increases the reaction acceleration effect to improve the adhesion. The carbon number is more preferably in a range from 1 to 14 and even more preferably from 1 to 8. When having the substituent with a carbon number of more than 22, the molecular structure has a slightly large steric hindrance and thus may reduce the reaction acceleration effect.

Here, the C1-22 hydrocarbon group is a group consisting of carbon atoms and hydrogen atoms alone, may be either a saturated hydrocarbon group or an unsaturated hydrocarbon group, and optionally contains a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a benzyl group, and a phenyl group.

The C1-22 hydrocarbon group may have —O— in place of a $CH_2$ group. Examples of the C1-22 linear hydrocarbon group having —O— in place of a $CH_2$ group include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, and polyether groups such as a methoxyethoxymethyl group, a methoxyethoxyethyl group, a polyethylene glycol group, and a polypropylene glycol group. Examples of the cyclic hydrocarbon group include ethylene oxide, tetrahydrofuran, oxepane, and 1,3-dioxolane.

The C1-22 hydrocarbon group may have O—CO— or —CO—O— in place of a $CH_2$ group. Examples of the C1-22 hydrocarbon group having —O—CO— or —CO—O— in place of a $CH_2$ group include an acetoxymethyl group, an acetoxyethyl group, an acetoxypropyl group, an acetoxybutyl group, a methacryloyloxyethyl group, a benzoyloxyethyl group, a methoxycarbonyl group, and an ethoxycarbonyl group.

The C1-22 hydrocarbon group may have a hydroxy group, and examples of the C1-22 hydrocarbon group having the hydroxy group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group, and a hydroxydocosyl group.

In the present invention, a conjugate acid of the tertiary amine compound (B1) preferably has an acid dissociation constant pKa of 9 or more and more preferably 11 or more. A component (B1) that forms a conjugate acid having an acid dissociation constant pKa of 9 or more readily abstracts a hydrogen ion from an oxygen-containing functional group such as a carboxy group and a hydroxy group of carbon fibers. This accelerates a reaction between the functional group on the surface of carbon fibers and an epoxy group of the component (A) to increase the adhesion improvement effect. Specific examples of such a tertiary amine compound include DBU (pKa 12.5), DBN (pKa 12.7), and 1,8-bis(dimethylamino)naphthalene (pKa 12.3).

In the present invention, the tertiary amine compound and/or the tertiary amine salt (B1) preferably has a boiling point of 160° C. or more and more preferably has a boiling point ranging from 160 to 350° C. and even more preferably ranging from 160 to 260° C. A tertiary amine compound and/or a tertiary amine salt having a boiling point of less than 160° C. may vigorously volatilize in a anneal treatment process at a temperature ranging from 160 to 260° C. for 30 to 600 seconds, thus reducing the reaction acceleration effect.

Examples of the tertiary amine compound and/or the tertiary amine salt (B1) used in the present invention include aliphatic tertiary amines, aromatic-containing aliphatic tertiary amines, aromatic tertiary amines, heterocyclic tertiary amines, and salts thereof. Specific examples will be described below.

Specific examples of the aliphatic tertiary amines include triethylamine, tripropylamine, triisopropylamine, tributylamine, tripentylamine, trihexylamine, tricyclohexylamine, trioctylamine, dimethylpropylamine, dimethylbutylamine, dimethylpentylamine, dimethylhexylamine, dimethylcyclohexylamine, dimethyloctylamine, dimethyldecylamine, dimethyldodecylamine, dimethyltetradecylamine, dimethylhexadecylamine, dimethyloctadecylamine, dimethyloleylamine, dimethyldocosylamine, diethylpropylamine, diethylbutylamine, diethylpentylamine, diethylhexylamine, diethylcyclohexylamine, diethyloctylamine, diethyldecylamine, diethyldodecylamine, diethyltetradecylamine, diethylhexadecylamine, diethyloctadecylamine, diethyloleylamine, diethyldocosylamine, dipropylmethylamine, diisopropylethylamine, dipropylethylamine, dipropylbutylamine, dibutylmethylamine, dibutylethylamine, dibutylpropylamine, dihexylmethylamine, dihexylmethylamine, dihexylpropylamine, dihexylbutylamine, dicyclohexylmethylamine, dicyclohexylethylamine, dicyclohexylpropylamine, dicyclohexylbutylamine, dioctylmethylamine, dioctylethylamine, dioctylpropylamine, didecylmethylamine, didecylethylamine, didecylpropylamine, didecylbutylamine, didodecylmethylamine, didodecylethylamine, didodecylpropylamine, didodecylbutylamine, ditetradecylmethylamine, ditetradecylethylamine, ditetradecylpropylamine, ditetradecylbutylamine, dihexadecylmethylamine, dihexadecylethylamine, dihexadecylpropylamine, dihexadecylbutylamine, trimethanolamine, triethanolamine, triisopropanolamine, tributanolamine, trihexanolamine, diethylmethanolamine, dipropylmethanolamine, diisopropylmethanolamine, dibutylmethanolamine, diisobutylmethanolamine, di-tert-butylmethanolamine, di(2-ethylhexyl)methanolamine, dimethylethanolamine, diethylethanolamine, dipropylethanolamine, diisopropylethanolamine, dibutylethanolamine, diisobutylethanolamine, di-tert-butylethanolamine, di(2-ethylhexyl) ethanolamine, dimethylpropanolamine, diethylpropanolamine, dipropylpropanolamine, diisopropylpropanolamine, dibutylpropanolamine, diisobutylpropanolamine, di-tert-butylpropanolamine, di(2-ethylhexyl)propanolamine, methyldimethanolamine, ethyldimethanolamine, propyldimethanolamine, isopropyldimethanolamine, butyldimethanolamine, isobutyldimethanolamine, tert-butyldimethanolamine, (2-ethylhexyl)dimethanolamine, methyldiethanolamine, ethyldiethanolamine, propyldiethanolamine, isopropyldiethanolamine, butyldiethanolamine, isobutyldiethanolamine, tert-butyldiethanolamine, (2-ethylhexyl)diethanolamine, and dimethylaminoethoxyethanol.

The aliphatic tertiary amines may be a compound having two or more tertiary amino groups in the molecule. Examples of the compound having two or more tertiary amino groups in the molecule include N,N,N',N'-tetramethyl-1,3-propanediamine, N,N,N',N'-tetraethyl-1,3-propanediamine, N,N-diethyl-N',N'-dimethyl-1,3-propanediamine, tetramethyl-1,6-hexamethylenediamine, pentamethyldiethylenetriamine, bis(2-dimethylaminoethyl) ether, and trimethylaminoethylethanolamine.

Specific examples of the aromatic-containing aliphatic tertiary amines include N,N-dimethylbenzylamine, N,N-diethylbenzylamine, N,N-dipropylbenzylamine, N,N'-dibutylbenzylamine, N,N-dihexylbenzylamine, N,N-dicyclohexylbenzylamine, N,N-dioctylbenzylamine, N,N-didodecylbenzylamine, N,N-dioleylbenzylamine, N,N-dibenzymethylamine, N,N-dibenzyethylamine, N,N-dibenzypropylamine, N,N-dibenzybutylamine, N,N-dibenzyhexylamine, N,N-dibenzycyclohexylamine, N,N-dibenzyoctylamine, N,N-dibenzydodecylamine, N,N-dibenzyoleylamine, tribenzylamine, N,N-methylethylbenzylamine, N,N-methylpropylbenzylamine, N,N-methylbutylbenzylamine, N,N-methylhexylbenzylamine, N,N-methylcyclohexylbenzylamine, N,N-methyloctylbenzylamine, N,N-methyldodecylbenzylamine, N,N-methyloleylbenzylamine, N,N-methylhexadecylbenzylamine, N,N-methyloctadecylbenzylamine, 2-(dimethylaminomethyl)phenol, 2,4,6-tris(dimethylaminomethyl)phenol, 2,4,6-tris(diethylaminomethyl)phenol, 2,4,6-tris(dipropylaminomethyl)phenol, 2,4,6-tris(dibutylaminomethyl)phenol, 2,4,6-tris(dipentylaminomethyl)phenol, and 2,4,6-tris(dihexylaminomethyl)phenol.

Specific examples of the aromatic tertiary amines include triphenylamine, tri(methylphenyl)amine, tri(ethylphenyl)amine, tri(propylphenyl)amine, tri(butylphenyl)amine, tri(phenoxyphenyl)amine, tri(benzylphenyl)amine, diphenylmethylamine, diphenylethylamine, diphenylpropylamine, diphenylbutylamine, diphenylhexylamine, diphenylcyclohexylamine, N,N-dimethylaniline, N,N-diethylaniline, N,N-dipropylaniline, N,N-dibutylaniline, N,N-dihexylaniline, N,N-dicyclohexylaniline, (methylphenyl)dimethylamine, (ethylphenyl)dimethylamine, (propylphenyl)dimethylamine, (butylphenyl)dimethylamine, bis(methylphenyl)methylamine, bis(ethylphenyl)methylamine, bis(propylphenyl)methylamine, bis(butylphenyl)methylamine, N,N-di(hydroxyethyl)aniline, N,N-di(hydroxypropyl)aniline, N,N-di(hydroxybutyl)aniline, and diisopropanol-p-toluidine.

Specific examples of the heterocyclic tertiary amines include pyridine compounds such as picoline, isoquinoline, and quinoline, imidazole compounds, pyrazole compounds, morpholine compounds, piperazine compounds, piperidine compounds, pyrrolidine compounds, cycloamidine compounds, proton sponge derivatives, and hindered amine compounds.

Examples of the pyridine compound include N,N-dimethyl-4-aminopyridine, bipyridine, and 2,6-lutidine. Examples of the imidazole compound include 1-benzyl-2-methylimidazole, 1-cyanoethyl-2-methylimidazole, 1-cyanoethyl-2-phenylimidazole, 1-cyanoethyl-2-ethyl-4-imidazole, 1-cyanoethyl-2-undecylimidazole, 1-cyanoethyl-2-methylimidazolium trimellitate, 1-cyanoethyl-2-undecylimidazolium trimellitate, 1-benzyl-2-phenylimidazole, 1-(2-hydroxyethyl)imidazole, 1-benzyl-2-formylimidazole, 1-benzyl-imidazole, and 1-allylimidazole.

Examples of the pyrazole compound include pyrazole and 1,4-dimethylpyrazole. Examples of the morpholine compound include 4-(2-hydroxyethyl)morpholine, N-ethylmorpholine, N-methylmorpholine, and 2,2'-dimorpholine diethyl ether. Examples of the piperazine compound include 1-(2-hydroxyethyl)piperazine and N,N-dimethylpiperazine. Examples of the piperidine compound include N-(2-hydroxyethyl)piperidine, N-ethylpiperidine, n-propylpiperidine, n-butylpiperidine, n-hexylpiperidine, N-cyclohexylpiperidine, and N-octylpiperidine. Examples of the pyrrolidine compound include n-butylpyrrolidine and N-octylpyrrolidine. Examples of the cycloamidine compound include 1,8-diazabicyclo[5,4,0]-7-undecene (DBU), 1,5-diazabicyclo[4,3,0]-5-nonene (DBN), 1,4-diazabicyclo[2,2,2]octane, and 5,6-dibutylamino-1,8-diazabicyclo[5,4,0]undecene-7 (DBA). Examples of other heterocyclic amines include hexamethylenetetramine, hexaethylenetetramine, and hexapropyltetramine.

Specific examples of the DBU salt include a phenol salt of DBU (U-CAT SA1, manufactured by San-Apro Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

Specific examples of the proton sponge derivative include 1,8-bis(dimethylamino)naphthalene, 1,8-bis(diethylamino)naphthalene, 1,8-bis(dipropylamino)naphthalene, 1,8-bis(dibutylamino)naphthalene, 1,8-bis(dipentylamino)naphthalene, 1,8-bis(dihexylamino)naphthalene, 1-dimethylamino-8-methylamino-quinolizine, 1-dimethylamino-7-methyl-8-methylamino-quinolizine, 1-dimethylamino-7-methyl-8-methylamino-isoquinoline, 7-methyl-1,8-methylamino-2,7-naphthyridine, and 2,7-dimethyl-1,8-methylamino-2,7-naphthyridine.

Examples of the hindered amine compound include tetrakis(1,2,2,6,6-pentamethyl-4-piperidinyl)butane-1,2,3,4-tetracarboxylate (for example, LA-52 (manufactured by ADEKA Corporation)), bis(1,2,2,6,6-pentamethyl-4-piperidyl)sebacate (for example, LA-72 (manufactured by ADEKA Corporation) and TINUVIN765 (manufactured by BASF)), bis(2,2,6,6-tetramethyl-1-undecyloxypiperidine-4-yl) carbonate (for example, LA-81 (manufactured by ADEKA Corporation)), 1,2,2,6,6-pentamethyl-4-piperidyl methacrylate (for example, LA-82 (manufactured by ADEKA Corporation)), 2-((4-methoxyphenyl)methylene) malonate, 1,3-bis(1,2,2,6,6-pentamethyl-4-piperidinyl) ester, Chimassorb 119, 2-dodecyl-N-(1,2,2,6,6-pentamethyl-4-piperidinyl)succinimide, 1-hexadecyl-2,3,4-tris(1,2,2,6,6-pentamethyl-4-piperidinyl) 1,2,3,4-butanetetracarboxylate, 1,2,3-tris(1,2,2,6,6-pentamethyl-4-piperidinyl)-4-tridecyl 1,2,3,4-butanetetracarboxylate, 1-methyl-10-(1,2,2,6,6-pentamethyl-4-piperidinyl) decanedioate, 4-(ethenyloxy)-1,2,2,6,6-pentamethylpiperidine, bis(1,2,2,6,6-pentamethyl-4-piperidinyl) 2-((3,5-bis(1,1-dimethylethyl)-4-hydroxyphenyl)methyl)-2-butylpropanedioate, 4-hydroxy-1,2,2,6,6-pentamethylpiperidine, 1,2,2,6,6-pentamethylpiperidine, LA-63P (manufactured by ADEKA Corporation), LA-68 (manufactured by ADEKA Corporation), TINUVIN622 LD (manufactured by BASF), and TINUVIN144 (manufactured by BASF).

These tertiary amine compounds and tertiary amine salts may be used singly or in combination of a plurality of them.

At least one substituent of $R_{26}$ to $R_{28}$ in General Formula (VIII) of the present invention preferably has a carbon number of 2 or more, more preferably 3 or more, and even more preferably 4 or more. When having at least one substituent of $R_{26}$ to $R_{28}$ with a carbon number of 2 or more, the tertiary amine compound and/or the tertiary amine salt is suppressed to work as an initiator, that is a side reaction such as the homopolymerization of an epoxy resin, and this further improves the adhesion. The compound represented by General Formula (VIII) of the present invention preferably has at least one or more hydroxy groups. A compound having one or more hydroxy groups causes a higher interaction with a functional group on the surface of carbon fibers and efficiently abstracts a proton of the functional group on the surface of carbon fibers, thus increasing the reactivity with an epoxy group.

In the present invention, the compound represented by General Formula (III) is preferably N-benzylimidazole, 1,8-diazabicyclo[5,4,0]-7-undecene (DBU) and salts thereof, or 1,5-diazabicyclo[4,3,0]-5-nonene (DBN) and salts thereof and particularly preferably 1,8-diazabicyclo[5,4,0]-7-undecene (DBU) and salts thereof or 1,5-diazabicyclo[4,3,0]-5-nonene (DBN) and salts thereof.

In the present invention, the compound represented by General Formula (IV) is preferably 1,8-bis(dimethylamino) naphthalene.

In the present invention, the compound represented by General Formula (V) is preferably 2,4,6-tris(dimethylaminomethyl)phenol.

In the present invention, the compound represented by General Formula (VI) is preferably 2,6-lutidine or 4-pyridinemethanol.

In the present invention, the compound represented by General Formula (VII) is preferably N-ethylmorpholine.

In the present invention, the compound represented by General Formula (VIII) is preferably tributylamine, N,N-dimethylbenzylamine, diisopropylethylamine, triisopropylamine, dibutylethanolamine, diethylethanolamine, triisopropanolamine, triethanolamine, or N,N-diisopropylethylamine.

The compound represented by General Formula (VIII) of the present invention preferably has at least one or more hydroxy groups. A compound having one or more hydroxy groups causes a higher interaction with a functional group on the surface of carbon fibers and efficiently abstracts a proton of the functional group on the surface of carbon fibers, thus increasing the reactivity with an epoxy group. At least two, preferably three substituents of $R_{26}$ to $R_{28}$ in General Formula (VIII) of the present invention preferably have the branched structure represented by General Formula (IX) or General Formula (X). A compound having the branched structure has a higher steric hindrance to prevent epoxy rings from reacting with each other and thus can increase the reaction acceleration effect between a functional group on the surface of carbon fibers and epoxy. In General Formula (VIII) of the present invention, at least two, preferably three substituents of $R_{26}$ to $R_{28}$ preferably have a hydroxy group. A compound having the hydroxy group causes a higher interaction with a functional group on the surface of carbon fibers and efficiently abstracts a proton of the functional group on the surface of carbon fibers, thus increasing the reactivity with an epoxy group.

Among these tertiary amine compounds and tertiary amine salts, triisopropylamine, dibutylethanolamine, diethylethanolamine, triisopropanolamine, diisopropylethylamine, 2,4,6-tris(dimethylaminomethyl)phenol, 2,6-lutidine, DBU, DBU salts, DBN, DBN salts, and 1,8-bis(dimethylamino) naphthalene are preferably used because such a compound has a higher reaction acceleration effect between a functional group on the surface of carbon fibers and an epoxy resin and can prevent epoxy rings from reacting with each other.

The component (B2) will be described next.

The quaternary ammonium salt (B2) having a cation site represented by General Formula (I) or (II) and used in the present invention is required to be contained in an amount of 0.1 to 25 parts by mass and is preferably contained in an amount of 0.1 to 10 parts by mass and more preferably 0.1 to 8 parts by mass, relative to 100 parts by mass of the epoxy compound (A). If containing the quaternary ammonium salt in an amount of less than 0.1 part by mass, the sizing agent fails to accelerate the covalent bond formation between the epoxy compound (A) and an oxygen-containing functional group on the surface of carbon fibers, resulting in insufficient adhesion between the carbon fibers and a matrix resin. If contained in an amount of more than 25 parts by mass, the quaternary ammonium salt (B2) covers the surface of carbon fibers to interfere with the formation of a covalent bond, resulting in insufficient adhesion between the carbon fibers and a matrix resin.

Although the mechanism of accelerating the formation of a covalent bond by adding the quaternary ammonium salt (B2) having a cation site represented by General Formula (I) or (II) and used in the present invention is not clear, such an effect can be achieved by a quaternary ammonium salt having a particular structure alone. On this account, each of $R_1$ to $R_5$ in General Formula (I) or (II) is required to be a C1-22 hydrocarbon group, the hydrocarbon group optionally has a hydroxy group, and a $CH_2$ group in the hydrocarbon group is optionally substituted by —O—, —O—CO—, or —CO—O—. Although the reason is unclear, a substituent having a carbon number of 23 or more results in insufficient adhesion. Here, the C1-22 hydrocarbon group is a group consisting of carbon atoms and hydrogen atoms alone, may be either a saturated hydrocarbon group or an unsaturated hydrocarbon group, and optionally contains a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a benzyl group, and a phenyl group.

Examples of the C1-22 hydrocarbon group having —O— in place of a $CH_2$ group include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, and polyether groups such as a methoxyethoxymethyl group, a methoxyethoxyethyl group, a polyethylene glycol group, and a polypropylene glycol group.

Examples of the C1-22 hydrocarbon group having —O—CO— or —CO—O— in place of a $CH_2$ group and having an ester structure with the C1-22 hydrocarbon include an acetoxymethyl group, an acetoxyethyl group, an acetoxypropyl group, an acetoxybutyl group, a methacryloyloxyethyl group, a benzoyloxyethyl group, a methoxycarbonyl group, and an ethoxycarbonyl group.

Examples of the C1-22 hydrocarbon group having a hydroxy group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group, and a hydroxydocosyl group.

Specifically, $R_1$ to $R_5$ of the quaternary ammonium salt (B2) having a cation site preferably have a carbon number ranging from 1 to 14 and more preferably ranging from 1 to 8. When having the substituent with a carbon number of less than 14, the quaternary ammonium salt has an adequately small steric hindrance when working as a reaction accelerator and thus increases the reaction acceleration effect to further improve the adhesion.

In the present invention, $R_3$ and $R_4$ of the quaternary ammonium salt (B2) having the cation site represented by General Formula (I) preferably have a carbon number of 2 or more, more preferably 3 or more, and even more preferably 4 or more. When having the substituent with a carbon number of 2 or more, the quaternary ammonium salt is suppressed to work as an initiator and interferes with the homopolymerization of an epoxy resin, and this further improves the adhesion.

In the present invention, each of $R_6$ and $R_7$ of the quaternary ammonium salt (B2) having the cation site represented by General Formula (II) is preferably hydrogen or a C1-8 hydrocarbon group, and a $CH_2$ group in the hydrocarbon group is optionally substituted by —O—, —O—CO—, or —CO—O—. If the substituent is hydrogen or has a carbon number of less than 8, the quaternary ammonium salt has an active site at a high ratio in the molecule and thus can provide large adhesion improvement effect even in a small amount.

In the present invention, the cation site of the quaternary ammonium salt (B2) having a cation site preferably has a molecular weight ranging from 100 to 400 g/mol, more preferably ranging from 100 to 300 g/mol, and even more preferably ranging from 100 to 200 g/mol. When having the cation site with a molecular weight of 100 g/mol or more, the quaternary ammonium salt is suppressed to volatilize even during anneal treatment and thus can provide large adhesion improvement effect even in a small amount. When having the cation site with a molecular weight of 400 g/mol or less, the quaternary ammonium salt has an active site at a high ratio in the molecule and thus can also provide large adhesion improvement effect even in a small amount.

In the present invention, examples of the cation site of the quaternary ammonium salt represented by General Formula (I) include tetramethylammonium, ethyltrimethylammonium, trimethylpropylammonium, butyltrimethylammonium, trimethylpentylammonium, hexyltrimethylammonium, cyclohexyltrimethylammonium, trimethyloctylammonium, decyltrimethylammonium, dodecyltrimethylammonium, tetradecyltrimethylammonium, hexadecyltrimethylammonium, trimethyloctadecylammonium, trimethyloleylammonium, docosyltrimethylammonium, benzyltrimethylammonium, trimethylphenylammonium, diethyldimethylammonium, dimethyldipropylammonium, dibutyldimethylammonium, dimethyldipentylammonium, dihexyldimethylammonium, dicyclohexyldimethylammonium, dimethyldioctylammonium, didecyldimethylammonium, ethyldecyldimethylammonium, didodecyldimethylammonium, ethyldodecyldimethylammonium, ditetradecyldimethylammonium, ethyltetradecyldimethylammonium, dihexadecyldimethylammonium, ethylhexadecyldimethylammonium, dimethyldioctadecylammonium, ethyloctadecyldimethylammonium, dimethyldioleylammonium, ethyldimethyloleylammonium, didocosyldimethylammonium, docosylethyldimethylammonium, dibenzydimethylammonium, benzylethyldimethylammonium, benzyldimethylpropylammonium, benzylbutyldimethylammonium, benzyldecyldimethylammonium, benzyldodecyldimethylammonium, benzyltetradecyldimethylammonium, benzylhexadecyldimethylammonium, benzyloctadecyldimethylammonium, benzyldimethyloleylammonium, dimethyldiphenylammonium, ethyldimethylphenylammonium, dimethylpropylphenylammonium, butyldimethylphenylammonium, decyldimethylphenylammonium, dodecyldimethylphenylammonium, tetradecyldimethylphenylammonium, hexadecyldimethylphenylammonium, dimethyloctadecylphenylammonium, dimethyloleylphenylammonium, tetraethylammonium, triethylmethylammonium, triethylpropylammonium, butyltriethylammonium, triethylpentylammonium, triethylhexylammonium, triethylcyclohexylammonium, triethyloctylammonium, decyltriethylammonium, dodecyltriethylammonium, tetradecyltriethylammonium, hexadecyltriethylammonium, triethyloctadecylammonium, triethyloleylammonium, benzyltriethylammonium, triethylphenylammonium, diethyldipropylammonium, dibutyldiethylammonium, diethyldipentylammonium, diethyldihexylammonium, diethyldicyclohexylammonium, diethyldioctylammonium, didecyldiethylammonium, didodecyldiethylammonium, ditetradecyldiethylammonium, diethyldihexadecylammonium, diethyldioctadecylammonium, diethyldioleylammonium, dibenzydiethylammonium, diethyldiphenylammonium, tetrapropylammonium, methyltripropylammonium, ethyltripropylammonium, butyltripropylammonium, benzyltripropylammonium, phenyltripropylammonium, tetrabutylammonium, tributylmethylammonium, tributylethylammonium, tributylpropylammonium, benzyltributylammonium, tributylphenylammonium, tetrapentylammonium, tetrahexylammonium, tetraheptylammonium, tetraoctylammonium, methyltrioctylammonium, ethyltrioctylammonium, trioctylpropylammonium, butyltrioctylammonium, dimethyldioctylammonium, diethyldioctylammonium, dioctyldipropylammonium, dibutyldioctylammonium, tetradecylammonium, tetradodecylammonium, 2-hydroxyethyltrimethylammonium, 2-hydroxyethyltriethylammonium, 2-hydroxyethyltripropylammonium, 2-hydroxyethyltributylammonium, polyoxyethylenetrimethylammonium, polyoxyethylenetriethylammonium, polyoxyethylenetripropylammonium, polyoxyethylenetributylammonium, bis(2-hydroxyethyl)dimethylammonium, bis(2-hydroxyethyl)diethylammonium, bis(2-hydroxyethyl)dipropylammonium, bis(2-hydroxyethyl)dibutylammonium, bis(polyoxyethylene)dimethylammonium, bis(polyoxyethylene)diethylammonium, bis(polyoxyethylene)dipropylammonium, bis(polyoxyethylene) dibutylammonium, tris(2-hydroxyethyl)methylammonium, tris(2-hydroxyethyl)ethylammonium, tris(2-hydroxyethyl) propylammonium, tris(2-hydroxyethyl)butylammonium, tris(polyoxyethylene)methylammonium, tris(polyoxyethylene)ethylammonium, tris(polyoxyethylene)propylammonium, and tris(polyoxyethylene)butylammonium.

Examples of the cation site of the quaternary ammonium salt represented by General Formula (II) include 1-methylpyridinium, 1-ethylpyridinium, 1-ethyl-2-methylpyridinium, 1-ethyl-4-methylpyridinium, 1-ethyl-2,4-dimethylpyridinium, 1-ethyl-2,4,6-trimethylpyridinium, 1-propylpyridinium, 1-butylpyridinium, 1-butyl-2-methylpyridinium, 1-butyl-4-methylpyridinium, 1-butyl-2,4-dimethylpyridinium, 1-butyl-2,4,6-trimethylpyridinium, 1-pentylpyridinium, 1-hexylpyridinium, 1-cyclohexylpyridinium, 1-octylpyridinium, 1-decylpyridinium, 1-dodecylpyridinium, 1-tetradecylpyridinium, 1-hexadecylpyridinium, 1-octadecylpyridinium, 1-oleylpyridinium, 1-docosylpyridinium, and 1-benzylpyridinium.

In the present invention, examples of the anion site of the quaternary ammonium salt (B2) having a cation site include halogen ions such as a fluoride anion, a chloride anion, a bromide anion, and an iodide anion. Additional examples include a hydroxide anion, an acetate anion, an oxalate anion, a sulfate anion, a benzoate anion, an iodate anion, a methylsulfate anion, a benzenesulfonate anion, and a toluenesulfonate anion.

Among them, the counter ion is preferably the halogen ion because it has a small size and does not interfere with the reaction acceleration effect of a quaternary ammonium salt.

In the present invention, these quaternary ammonium salts may be used singly or in combination of a plurality of them.

In the present invention, examples of the quaternary ammonium salt (B2) having a cation site include trimethyloctadecylammonium chloride, trimethyloctadecylammonium bromide, trimethyloctadecylammonium hydroxide, trimethyloctadecylammonium acetate, trimethyloctadecylammonium benzoate, trimethyloctadecylammonium p-toluenesulfonate, trimethyloctadecylammonium hydrochloride, trimethyloctadecylammonium tetrachloroiodide, trimethyloctadecylammonium hydrogen sulfate, trimethyloctadecylammonium methylsulfate, benzyltrimethylammonium chloride, benzyltrimethylammonium bromide, benzyltrimethylammonium hydroxide, benzyltrimethylammonium acetate, benzyltrimethylammonium benzoate, benzyltrimethylammonium p-toluenesulfonate, tetrabutylammonium chloride, tetrabutylammonium bromide, tetrabutylammonium hydroxide, tetrabutylammonium acetate, tetrabutylammonium benzoate, tetrabutylammonium p-toluenesulfonate, (2-methoxyethoxymethyl)triethylammonium chloride, (2-methoxyethoxymethyl)triethylammonium bromide, (2-methoxyethoxymethyl)triethylammonium hydroxide, (2-methoxyethoxymethyl)triethylammonium p-toluenesulfonate, (2-acetoxyethyl)trimethylammonium chloride, (2-acetoxyethyl)trimethylammonium bromide, (2-acetoxyethyl)trimethylammonium hydroxide, (2-acetoxyethyl)trimethylammonium p-toluenesulfonate, (2-hydroxyethyl)trimethylammonium chloride, (2-hydroxyethyl) trimethylammonium bromide, (2-hydroxyethyl) trimethylammonium hydroxide, (2-hydroxyethyl) trimethylammonium p-toluenesulfonate, bis (polyoxyethylene)dimethylammonium chloride, bis (polyoxyethylene)dimethylammonium bromide, bis (polyoxyethylene)dimethylammonium hydroxide, bis (polyoxyethylene)dimethylammonium p-toluenesulfonate, 1-hexadecylpyridinium chloride, 1-hexadecylpyridinium bromide, 1-hexadecylpyridinium hydroxide, and 1-hexadecylpyridinium p-toluenesulfonate.

In the present invention, the compound represented by General Formula (I) is preferably benzyltrimethylammonium bromide, tetrabutylammonium bromide, trimethyloctadecylammonium bromide, (2-methoxyethoxymethyl)triethylammonium chloride, (2-acetoxyethyl) trimethylammonium chloride, and (2-hydroxyethyl) trimethylammonium bromide and particularly preferably tetrabutylammonium bromide and (2-methoxyethoxymethyl)triethylammonium chloride.

In the present invention, the compound represented by General Formula (II) is preferably 1-hexadecylpyridinium chloride.

The component (B3) will be described next.

The quaternary phosphonium salt and/or the phosphine compound (B3) used in the present invention is required to be contained in an amount of 0.1 to 25 parts by mass and is preferably contained in an amount of 0.1 to 10 parts by mass and more preferably 0.1 to 8 parts by mass, relative to 100 parts by mass of the epoxy compound (A). If containing the quaternary phosphonium salt and/or the phosphine compound in an amount of less than 0.1 part by mass, the sizing agent fails to accelerate the covalent bond formation between the epoxy compound (A) and an oxygen-containing functional group on the surface of carbon fibers, resulting in insufficient adhesion between the carbon fibers and a thermosetting resin. If contained in an amount of more than 25 parts by mass, the quaternary phosphonium salt and/or the phosphine compound (B3) covers the surface of carbon fibers to interfere with the formation of a covalent bond, resulting in insufficient adhesion between the carbon fibers and a thermosetting resin.

The quaternary phosphonium salt or the phosphine compound (B3) used in the present invention is preferably a quaternary phosphonium salt having a cation site or a phosphine compound represented by General Formula (XI) or (XII):

(XI)

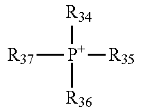

(XII)

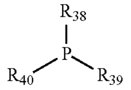

(in chemical formulae, each of $R_{34}$ to $R_{40}$ is a C1-22 hydrocarbon group, the hydrocarbon group optionally has a hydroxy group, and a $CH_2$ group in the hydrocarbon group is optionally substituted by —O—, —O—CO—, or —CO—O—).

The inventors of the present invention have found that only in the case of using a sizing agent containing the quaternary phosphonium salt and/or the phosphine compound (B3), preferably the quaternary phosphonium salt and/or the phosphine compound (B3) represented by General Formula (XI) or (XII), in an amount of 0.1 to 25 parts by mass relative to 100 parts by mass of the component (A), applying the sizing agent onto carbon fibers, and anneal-treating the coated carbon fibers under particular conditions, the formation of a covalent bond between an epoxy resin having two or more functional groups and an oxygen-containing functional group such as a carboxy group and a hydroxy group that is originally present on the surface of carbon fibers or is introduced by oxidation treatment is accelerated, and as a result, the adhesion to a thermosetting resin is greatly improved.

In the present invention, although the mechanism of accelerating the formation of a covalent bond by adding the quaternary phosphonium salt or the phosphine compound is unclear, by using the quaternary phosphonium salt or the phosphine compound having a particular structure, the effect of the present invention can be suitably achieved. In other words, in the quaternary phosphonium salt and/or the phosphine compound (B3) used in the present invention, each of $R_{34}$ to $R_{40}$ in General Formula (XI) or (XII) is preferably a C1-22 hydrocarbon group, the hydrocarbon group optionally has a hydroxy group, and a $CH_2$ group in the hydrocarbon group is optionally substituted by —O—, —O—CO—, or —CO—O—. Although the reason is unclear, a substituent having a carbon number of 23 or more may result in insufficient adhesion. Here, the C1-22 hydrocarbon group is a group consisting of carbon atoms and hydrogen atoms alone, may be either a saturated hydrocarbon group or an unsaturated hydrocarbon group, and optionally contains a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a vinyl group, a 2-propynyl group, a benzyl group, a phenyl group, a cinnamyl group, and a naphthylmethyl group.

Examples of the C1-22 linear hydrocarbon group having —O— in place of a $CH_2$ group include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, and polyether groups such as a methoxyethoxymethyl group, a methoxyethoxyethyl group, a polyethylene glycol group, and a polypropylene glycol group. Examples of the cyclic hydrocarbon group include ethylene oxide, tetrahydrofuran, oxepane, and 1,3-dioxolane.

Examples of the C1-22 hydrocarbon group having —O—CO— or —CO—O— in place of a $CH_2$ group include an acetoxymethyl group, an acetoxyethyl group, an acetoxypropyl group, an acetoxybutyl group, a methacryloyloxyethyl group, a benzoyloxyethyl group, a methoxycarbonyl group, and an ethoxycarbonyl group.

Examples of the C1-22 hydrocarbon group having a hydroxy group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group, and a hydroxydocosyl group.

Specifically, $R_{34}$ to $R_{40}$ of the quaternary phosphonium salt or the phosphine compound (B3) preferably have a carbon number ranging from 1 to 14. When having the substituent with a carbon number of less than 14, the quaternary ammonium salt has an adequately small steric hindrance when working as a reaction accelerator and thus increases a reaction acceleration effect to further improve the adhesion.

In the present invention, $R_{34}$ to $R_{37}$ of the quaternary phosphonium salt (B3) represented by General Formula (XI) preferably has a carbon number of 2 or more, more preferably 3 or more, and even more preferably 4 or more. When having the substituent with a carbon number of 2 or more, the quaternary phosphonium salt is suppressed to work as an initiator and prevents the homopolymerization of an epoxy resin, thus further improving the adhesion.

In the present invention, each of $R_{39}$ and $R_{40}$ of the phosphine compound (B3) represented by General Formula (XII) is preferably a C1-8 hydrocarbon group, the hydrocarbon group optionally has a hydroxy group, and a $CH_2$ group in the hydrocarbon group is optionally substituted by —O—, —O—CO—, or —CO—O—. When having the substituent with a carbon number of less than 8, the phosphine compound has an active site at a high ratio in the molecule and thus can provide large adhesion improvement effect even in a small amount.

In the present invention, the cation site of the quaternary phosphonium salt (B3) preferably has a molecular weight ranging from 100 to 400 g/mol, more preferably ranging from 100 to 300 g/mol, and even more preferably ranging from 100 to 200 g/mol. When having the cation site with a molecular weight of 100 g/mol or more, the quaternary phosphonium salt is suppressed to volatilize even during anneal treatment and thus can provide large adhesion improvement effect even in a small amount. When having the cation site with a molecular weight of 400 g/mol or less, the quaternary phosphonium salt has an active site at a high ratio in the molecule and thus can also provide large adhesion improvement effect even in a small amount.

In the present invention, examples of the cation site of the aliphatic quaternary phosphonium salt represented by General Formula (VII) include tetramethylphosphonium, tetraethylphosphonium, tetrapropylphosphonium, tetrabutylphosphonium, methyltriethylphosphonium, methyltripropylphosphonium, methyltributylphosphonium, dimethyldiethylphosphonium, dimethyldipropylphosphonium, dimethyldibutylphosphonium, trimethylethylphosphonium, trimethylpropylphosphonium, trimethylbutylphosphonium, (2-methoxyethoxymethyl)triethylphosphonium, (2-acetoxyethyl)trimethylphosphonium chloride, (2-acetoxyethyl)trimethylphosphonium, (2-hydroxyethyl)trimethylphosphonium, tributyl-n-octylphosphonium, tributyldodecylphosphonium, tributylhexadecylphosphonium, tributyl(1,3-dioxolan-2-ylmethyl)phosphonium, di-t-butyldimethylphosphonium, trihexyltetradecylphosphonium, and bis(polyoxyethylene)dimethylphosphonium.

Examples of the cation site of the aromatic quaternary phosphonium salt represented by General Formula (VII) include tetraphenylphosphonium, triphenylmethylphosphonium, diphenyldimethylphosphonium, ethyltriphenylphosphonium, n-butyltriphenylphosphonium, benzyltriphenylphosphonium, isopropyltriphenylphosphonium, vinyltriphenylphosphonium, allyltriphenylphosphonium, triphenylpropargylphosphonium, t-butyltriphenylphosphonium, heptyltriphenylphosphonium, triphenyltetradecylphosphonium, hexyltriphenylphosphonium, (methoxymethyl)triphenylphosphonium, 2-hydroxybenzyltriphenylphosphonium, (4-carboxybutyl)triphenylphosphonium, (3-carboxypropyl)triphenylphosphonium, cinnamylriphenylphosphonium, cyclopropyltriphenylphosphonium, 2-(1,3-dioxan-2-yl)ethyltriphenylphosphonium, 1-(1,3-dioxolan-2-yl)ethyltriphenylphosphonium, (1,3-dioxolan-2-yl)methyltriphenylphosphonium, 4-ethoxybenzyltriphenylphosphonium, and ethoxycarbonylmethyl(triphenyl)phosphonium.

In the present invention, examples of the anion site of the quaternary phosphonium salt (B3) include halogen ions of a fluoride anion, a chloride anion, a bromide anion, and an iodide anion. Additional examples include a hydroxide anion, an acetate anion, an oxalate anion, a hydrogensulfate anion, a benzoate anion, an iodate anion, a methylsulfate anion, a benzenesulfonate anion, a tetraphenylborate ion, a tetrafluoroborate ion, a hexafluorophosphate ion, a bis(trifluoromethylsulfonyl)imide ion, and a toluenesulfonate anion.

In the present invention, these quaternary phosphonium salts may be used singly or in combination of a plurality of them.

In the present invention, examples of the quaternary phosphonium salt (B3) include trimethyloctadecylphosphonium chloride, trimethyloctadecylphosphonium bromide, trimethyloctadecylphosphonium hydroxide, trimethyloctadecylphosphonium acetate, trimethyloctadecylphosphonium benzoate, trimethyloctadecylphosphonium p-toluenesulfonate, trimethyloctadecylphosphonium hydrochloride, trimethyloctadecylphosphonium tetrachloroiodide, trimethyloctadecylphosphonium hydrogen sulfate, trimethyloctadecylphosphonium methyl sulfate, benzyltrimethylphosphonium chloride, benzyltrimethylphosphonium bromide, benzyltrimethylphosphonium hydroxide, benzyltrimethylphosphonium acetate, benzyltrimethylphosphonium benzoate, benzyltrimethylphosphonium p-toluenesulfonate, tetrabutylphosphonium chloride, tetrabutylphosphonium bromide, tetrabutylphosphonium hydroxide, tetrabutylphosphonium acetate, tetrabutylphosphonium benzoate, tetrabutylphosphonium p-toluenesulfonate, (2-methoxyethoxymethyl)triethylphosphonium chloride, (2-methoxyethoxymethyl)triethylphosphonium bromide, (2-methoxyethoxymethyl)triethylphosphonium hydroxide, (2-methoxyethoxymethyl)triethylphosphonium p-toluenesulfonate, (2-acetoxyethyl)trimethylphosphonium chloride, (2-acetoxyethyl)trimethylphosphonium bromide, (2-acetoxyethyl)trimethylphosphonium hydroxide, (2-acetoxyethyl)trimethylphosphonium p-toluenesulfonate, (2-hydroxyethyl)trimethylphosphonium chloride, (2-hydroxyethyl)trimethylphosphonium bromide, (2-hydroxyethyl)trimethylphosphonium hydroxide, (2-hydroxyethyl)trimethylphosphonium p-toluenesulfonate, bis(polyoxyethylene)dimethylphosphonium chloride, bis (polyoxyethylene)dimethylphosphonium bromide, bis (polyoxyethylene)dimethylphosphonium hydroxide, bis (polyoxyethylene)dimethylphosphonium p-toluenesulfonate, tetraphenylphosphonium bromide, and tetraphenylphosphonium tetraphenylborate.

Exampled of a quaternary phosphonium salt (B3) not represented by General Formula (XI) include acetonitrile triphenylphosphonium chloride, 1H-benzotriazol-1-yloxytripyrrolidinophosphonium hexafluorophosphate, 1H-benzotriazol-1-yloxytris(dimethylamino)phosphonium hexafluorophosphate, trans-2-butene-1,4-bis(triphenylphosphonium chloride), (4-carboxybutyl)triphenylphosphonium bromide, (3-carboxypropyl)triphenylphosphonium bromide, (2,4-dichlorobenzyl)triphenylphosphonium chloride, 2-dimethylaminoethyltriphenylphosphonium bromide, ethoxycarbonylmethyl(triphenyl)phosphonium bromide, (formylmethyl)triphenylphosphonium chloride, N-methylanilinotriphenylphosphonium iodide, and phenacyltriphenylphosphonium bromide. These quaternary phosphonium salts are also usable as the quaternary phosphonium salt (B3) of the present invention.

Examples of the phosphine compound represented by General Formula (XII) include triethylphosphine, tripropylphosphine, tributylphosphine, tri-t-butylphosphine, tripentylphosphine, trihexylphosphine, tricyclopentylphosphine, tricyclohexylphosphine, trioctylphosphine, triphenylphosphine, tri(2-furyl)phosphine, dimethylpropylphosphine, dimethylbutylphosphine, dimethylpentylphosphine, dimethylhexylphosphine, dimethylcyclohexylphosphine, dimethyloctylphosphine, dimethyldecylphosphine, dimethyldodecylphosphine, dimethyltetradecylphosphine, dimethylhexadecylphosphine, dimethyloctadecylphosphine, dimethyloleylphosphine, dimethyldocosylphosphine, diethylpropylphosphine, diethylbutylphosphine, diethylpentylphosphine, diethylhexylphosphine, diethylcyclohexylphosphine, diethyloctylphosphine, diethyldecylphosphine, diethyldodecylphosphine, diethyltetradecylphosphine, diethylhexadecylphosphine, diethyloctadecylphosphine, diethyloleylphosphine, diethyldocosylphosphine, diethylphenylphosphine, ethyldiphenylphosphine, dipropylmethylphosphine, dipropylethylphosphine, dipropylbutylphosphine, dibutylmethylphosphine, dibutylethylphosphine, dibutylpropylphosphine, dihexylmethylphosphine, dihexylethylphosphine, dihexylpropylphosphine, dihexylbutylphosphine, dicyclohexylmethylphosphine, dicyclohexylethylphosphine, dicyclohexylpropylphosphine, dicyclohexylbutylphosphine, dicyclohexylphenylphosphine, dioctylmethylphosphine, dioctylethylphosphine, dioctylpropylphosphine, didecylmethylphosphine, didecylethylphosphine, didecylpropylphosphine, didecylbutylphosphine, didodecylmethylphosphine, didodecylethylphosphine, didodecylpropylphosphine, didodecylbutylphosphine, ditetradecylmethylphosphine, ditetradecylethylphosphine, ditetradecylpropylphosphine, ditetradecylbutylphosphine, dihexadecylmethylphosphine, dihexadecylethylphosphine, dihexadecylpropylphosphine, dihexadecylbutylphosphine, trimethanolphosphine, triethanolphosphine, tripropanolphosphine, tributanolphosphine, trihexanolphosphine, diethylmethanolphosphine, dipropylmethanolphosphine, diisopropylmethanolphosphine, dibutylmethanolphosphine, diisobutylmethanolphosphine, di-t-butylmethanolphosphine, di(2-ethylhexyl) methanolphosphine, dimethylethanolphosphine, diethylethanolphosphine, dipropylethanolphosphine, diisopropylethanolphosphine, dibutylethanolphosphine, diisobutylethanolphosphine, di-t-butylethanolphosphine, di-t-butylphenylphosphine, di(2-ethylhexyl)ethanolphosphine, dimethylpropanolphosphine, diethylpropanolphosphine, dipropylpropanolphosphine, diisopropylpropanolphosphine, dibutylpropanolphosphine, diisobutylpropanolphosphine, di-t-butylpropanolphosphine, di(2-ethylhexyl)propanolphosphine, methyldimethanolphosphine, ethyldimethanolphosphine, propyldimethanolphosphine, isopropyldimethanolphosphine, butyldimethanolphosphine, isobutyldimethanolphosphine, t-butyldimethanolphosphine, (2-ethylhexyl)dimethanolphosphine, methyldiethanolphosphine, ethyldiethanolphosphine, propyldiethanolphosphine, isopropyldiethanolphosphine, butyldiethanolphosphine, isobutyldiethanolphosphine, t-butyldiethanolphosphine, (2-ethylhexyl)diethanolphosphine, isopropylphenylphosphine, methoxydiphenylphosphine, ethoxydiphenylphosphine, triphenylphosphine, diphenylmethylphosphine, diphenylethylphosphine, diphenylcyclohexylphosphine, diphenylpropylphosphine, diphenylbutylphosphine, diphenyl-t-butylphosphine, diphenylpentylphosphine, diphenylhexylphosphine, diphenyloctylphosphine, diphenylbenzylphosphine, phenoxydiphenylphosphine, diphenyl-1-pyrenylphosphine, phenyldimethylphosphine, trimethylphosphine, tri-n-octylphosphine, tri-o-tolylphosphine, tri-m-tolylphosphine, and tris-2,6-dimethoxyphenylphosphine.

Examples of the phosphine (B3) not represented by General Formula (XII) include phenyl-2-pyridylphosphine, triphenylphosphine oxide, 1,2-bis(diphenylphosphino)ethane, 1,3-bis(diphenylphosphino)propane, and 1,4-bis(diphenylphosphino)butane.

In the present invention, the compound represented by General Formula (XI) is preferably tetrabutylphosphonium bromide and tetraphenylphosphonium bromide.

In the present invention, the compound represented by General Formula (XII) is preferably tributylphosphine and triphenylphosphine.

In the present invention, the sizing agent may contain one or more components in addition to the component (A) and the component (B). Preferred examples of the additional component include nonionic surfactants including polyalkylene oxides such as polyethylene oxide and polypropylene oxide; adducts of a higher alcohol, a polyhydric alcohol, an alkylphenol, a styrenated phenol, and other compounds with a polyalkylene oxide such as polyethylene oxide and polypropylene oxide; and a block copolymer of ethylene oxide and propylene oxide. A polyester resin, an unsaturated polyester compound, and the like may be appropriately added to an extent not impairing the effect of the present invention.

In the present invention, the sizing agent to be used may be diluted with a solvent. Examples of such a solvent include water, methanol, ethanol, isopropanol, acetone, methyl ethyl ketone, dimethylformamide, and dimethylacetamide. Among them, water is preferably used from the viewpoint of handleability and safety.

In the present invention, the amount of a sizing agent coated is preferably in a range from 0.1 to 10 parts by mass and more preferably from 0.2 to 3 parts by mass relative to 100 parts by mass of carbon fibers. If coated with a sizing agent in an amount of 0.1 part by mass or more, carbon fibers can withstand friction with metal guides or the like through which the carbon fibers pass during weaving of the carbon fibers, and this prevents fluffs from generating, thus producing a carbon fiber sheet having excellent quality such as smoothness. If the amount of a sizing agent coated is 10 parts by mass or less, a matrix resin such as an epoxy resin can infiltrate carbon fiber bundles without interference by a sizing agent coating around carbon fiber bundles. This prevents voids from generating in an intended composite material, and thus the composite material has excellent quality and excellent mechanical characteristics.

In the present invention, the sizing agent layer applied on carbon fibers and dried preferably has a thickness ranging from 2 to 20 nm and a maximum thickness of less than twice a minimum thickness. A sizing agent layer having such a uniform thickness can stably achieve a large adhesion improvement effect and can stably achieve excellent high-order processability.

In the present invention, carbon fibers to which the sizing agent is applied are exemplified by polyacrylonitrile (PAN) carbon fibers, rayon carbon fibers, and pitch carbon fibers. Among them, the PAN carbon fibers are preferably used due to excellent balance between strength and elastic modulus.

A method for producing the PAN carbon fibers will next be described.

Usable examples of the spinning method for preparing precursor fibers of carbon fibers include dry spinning, wet spinning, and dry-wet spinning. Among them, the wet spinning or the dry-wet spinning is preferably employed because high-strength carbon fibers are readily obtained. A spinning solution to be used may be a solution, a suspension, and the like of a homopolymer or copolymer of polyacrylonitrile.

The spinning solution is passed through a spinneret for spinning, then subjected to solidification, water-washing, and drawing to yield precursor fibers. The obtained precursor fibers are subjected to flame resistant treatment and carbonization treatment and, if desired, further subjected to graphite treatment to yield carbon fibers. The carbonization treatment and the graphite treatment are preferably carried out under conditions of a maximum anneal treatment temperature of 1,100° C. or more and more preferably 1,400 to 3,000° C.

In the present invention, fine carbon fibers are preferably used because carbon fibers having high strength and high elastic modulus can be obtained. Specifically, the carbon fibers preferably have a single fiber size of 7.5 μm or less, more preferably 6 μm or less, and even more preferably 5.5 μm or less. Although the lower limit of the single fiber size is not particularly limited, carbon fibers having a single fiber size of 4.5 μm or less readily cause single fiber breakage, and this may reduce the productivity.

To improve the adhesion to a matrix resin, the obtained carbon fibers are typically subjected to oxidation treatment, and thus an oxygen-containing functional group is introduced. The oxidation treatment method may be gas phase oxidation, liquid phase oxidation, and liquid phase electrolytic oxidation, and the liquid phase electrolytic oxidation is preferably employed from the viewpoint of high productivity and uniform treatment.

In the present invention, the electrolytic solution used for the liquid phase electrolytic oxidation is exemplified by an acid electrolytic solution and an alkaline electrolytic solution.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid exhibiting strong acidity are preferably used.

Examples of the alkaline electrolytic solution specifically include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used electrolytic solutions are aqueous solutions of ammonium carbonate and ammonium hydrogen carbonate because such a solution is free from an alkali metal that interferes with the curing of a matrix resin, or an aqueous solution of tetraalkylammonium hydroxide exhibiting strong alkalinity.

In the present invention, to accelerate the formation of a covalent bond between the epoxy compound (A) and an oxygen-containing functional group on the surface of carbon fibers to further improve the adhesion, carbon fibers are preferably subjected to electrolytic treatment with an alkaline electrolytic solution or to electrolytic treatment in an acidic aqueous solution, followed by washing with an alkaline aqueous solution, and then coated with a sizing agent. When carbon fibers are subjected to electrolytic treatment, an area on the surface of carbon fibers suffering from excess oxidation may become a weak layer. The weak layer, which is present in an interface, may become a starting point of breaking when the carbon fibers form a composite material. It is supposed that dissolution and removal of the excessively oxidized area with an alkaline aqueous solution accelerate the formation of a covalent bond. If the residue of an acid electrolytic solution is present on the surface of carbon fibers, protons in the residue are captured by the component (B). This may reduce the primary effect of the component (B) that abstracts a hydrogen ion of an oxygen-containing functional group on the surface of carbon fibers. On this account, carbon fibers are preferably subjected to electrolytic treatment in an acidic aqueous solution and then washed with an alkaline aqueous solution to neutralize the acid electrolytic solution. For the reasons above, a combination of the carbon fibers subjected to a particular treatment with the sizing agent can further improve the adhesion.

The electrolytic solution used in the present invention preferably has a concentration ranging from 0.01 to 5 mol/liter and more preferably ranging from 0.1 to 1 mol/liter. If the electrolytic solution has a concentration of 0.01 mol/liter or more, the electrolytic treatment can be performed at a lower electrical voltage, which is advantageous in operating cost. An electrolytic solution having a concentration of 5 mol/liter or less is advantageous in terms of safety.

The electrolytic solution used in the present invention preferably has a temperature ranging from 10 to 100° C. and more preferably ranging from 10 to 40° C. An electrolytic solution having a temperature of 10° C. or more improves the efficiency of electrolytic treatment, and this is advantageous in operating cost. An electrolytic solution having a temperature of 100° C. or less is advantageous in terms of safety.

In the present invention, the quantity of electricity during liquid phase electrolytic oxidation is preferably optimized depending on the carbonization degree of carbon fibers, and the treatment of carbon fibers having a high elastic modulus necessitates a larger quantity of electricity.

In the present invention, the current density during liquid phase electrolytic oxidation is preferably in a range from 1.5 to 1,000 $A/m^2$ and more preferably from 3 to 500 $A/m^2$ relative to 1 $m^2$ of the surface area of carbon fibers in an electrolytic treatment solution. If the current density is 1.5 $A/m^2$ or more, the efficiency of electrolytic treatment is improved, and this is advantageous in operating cost. A current density of 1,000 $A/m^2$ or less is advantageous in terms of safety.

In the present invention, to accelerate the formation of a covalent bond between the epoxy compound (A) and an oxygen-containing functional group on the surface of carbon fibers to further improve the adhesion, the carbon fibers after oxidation treatment are preferably washed with an alkaline aqueous solution. Specifically, carbon fibers are preferably subjected to liquid phase electrolytic treatment in an acid electrolytic solution and subsequently washed with an alkaline aqueous solution.

In the present invention, the alkaline aqueous solution used for washing preferably has a pH ranging from 7 to 14 and more preferably ranging from 10 to 14. Specific examples of the alkaline aqueous solution include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used alkaline solutions are aqueous solutions of ammonium carbonate and ammonium hydrogen carbonate because such a solution is free from an alkali metal that interferes with the curing of a matrix resin, or an aqueous solution of tetraalkylammonium hydroxide exhibiting strong alkalinity.

In the present invention, the method for washing carbon fibers with an alkaline aqueous solution may be dipping or spraying, for example. Among them, the dipping is preferably employed from the viewpoint of easy washing, and specifically the dipping is preferably performed while carbon fibers are vibrated by ultrasonic waves.

In the present invention, the carbon fibers after electrolytic treatment or washing with an alkaline aqueous solution are preferably washed with water and dried. In this case, drying at an excessively high temperature causes thermal decomposition of a functional group on the outermost surface of carbon fibers, and thus the functional group is readily removed. The drying is thus preferably at a temperature as low as possible. Specifically, the drying temperature is preferably 250° C. or less and more preferably 210° C. or less.

Examples of the method of applying a sizing agent onto carbon fibers (the method of coating carbon fibers with a sizing agent) include a method of immersing carbon fibers in a sizing solution through a roller, a method of bringing carbon fibers into contact with a sizing solution adhering on a roller, and a method of spraying a sizing solution onto carbon fibers. The method of applying a sizing agent may be either a batch-wise manner or a continuous manner, and the continuous manner is preferably employed due to good productivity and small variation. During the application, in order to uniformly apply an active component in the sizing agent onto carbon fibers within an appropriate amount, the concentration and temperature of a sizing solution, thread tension, and other conditions are preferably controlled. During the application of a sizing agent, carbon fibers are preferably vibrated by ultrasonic waves.

In the present invention, the carbon fibers coated with a sizing agent are required to be annealed at a temperature ranging from 160 to 260° C. for 30 to 600 seconds. The anneal treatment conditions are preferably at a temperature ranging from 170 to 250° C. for 30 to 500 seconds and more preferably at a temperature ranging from 180 to 240° C. for 30 to 300 seconds. Anneal treatment under conditions at lower than 160° C. and/or for less than 30 seconds fails to accelerate the formation of a covalent bond between an epoxy resin in the sizing agent and an oxygen-containing functional group on the surface of carbon fibers, resulting in insufficient adhesion between the carbon fibers and a matrix resin. Anneal treatment under conditions at higher than 260° C. and/or for more than 600 seconds causes a tertiary amine compound and/or a tertiary amine salt to volatilize and thus fails to accelerate the formation of a covalent bond, resulting in insufficient adhesion between the carbon fibers and a matrix resin.

The anneal treatment can be performed by microwave irradiation and/or infrared irradiation. When carbon fibers are treated with anneal by microwave irradiation and/or infrared irradiation, microwaves enter the carbon fibers and are absorbed by the carbon fibers, and this anneals the carbon fibers as an object to be annealed to an intended temperature in a short period of time. The microwave irradiation and/or the infrared irradiation can rapidly anneal the inside of the carbon fibers. This can reduce the difference in temperature between the inner side and the outer side of carbon fiber bundles, thus reducing the uneven adhesion of a sizing agent.

In the present invention, the obtained carbon fiber bundles preferably have a strand strength of 3.5 GPa or more, more preferably 4 GPa or more, and even more preferably 5 GPa or more. The obtained carbon fiber bundles preferably have a strand elastic modulus of 220 GPa or more, more preferably 240 GPa or more, and even more preferably 280 GPa or more.

In the present invention, the strand tensile strength and elastic modulus of carbon fiber bundles can be determined by the test method of resin-impregnated strand described in JIS-R-7608 (2004) in accordance with the procedure below. The resin formulation is "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the curing conditions are at normal pressure at 130° C. for 30 minutes. Ten strands of carbon fiber bundles were tested, and mean values were calculated as the strand tensile strength and the strand elastic modulus.

In the present invention, the carbon fibers preferably have a surface oxygen concentration (O/C) ranging from 0.05 to 0.50, more preferably ranging from 0.06 to 0.30, and even more preferably ranging from 0.07 to 0.20, where the surface oxygen concentration (O/C) is the ratio of the number of oxygen (O) atoms and that of carbon (C) atoms on the surface of the fibers and is determined by X-ray photoelectron spectroscopy. When having a surface oxygen concentration (O/C) of 0.05 or more, the carbon fibers maintain an oxygen-containing functional group on the surface of the carbon fibers and thus can achieve a strong adhesion to a matrix resin. When having a surface oxygen concentration (O/C) of 0.5 or less, the carbon fibers can suppress the reduction in strength of the carbon fiber itself by oxidation.

The surface oxygen concentration of carbon fibers is determined by X-ray photoelectron spectroscopy in accordance with the procedure below. First, a solvent is used to remove dust and the like adhering to the surface of carbon fibers, then the carbon fibers are cut into 20-mm pieces, and the pieces are spread and arranged on a copper sample holder. $AlK\alpha_{1,2}$ is used as an X-ray source, and the inside of a chamber is maintained at $1\times10^{-8}$ Torr. As the correction value for the peak associated with electrification during measurement, the kinetic energy value (K.E.) of the main peak of $C_{1s}$ is set to 1,202 eV. The $C_{1s}$ peak area is determined by drawing a straight base line in a range from 1,191 to 1,205 eV as K.E. The $O_{1s}$ peak area is determined by drawing a straight base line in a range from 947 to 959 eV as K.E.

Here, the surface oxygen concentration is determined as an atom number ratio using a sensitivity correction value inherent in an apparatus on the basis of the ratio of the $O_{1s}$ peak area and the $C_{1s}$ peak area. The X-ray photoelectron spectrometer used was ESCA-1600 manufactured by Ulvac-Phi, Inc., and the sensitivity correction value inherent in the apparatus was 2.33.

A carbon fiber forming raw material, a formed material, and a carbon fiber-reinforced composite material obtained by forming the carbon fiber forming raw material and the formed material of the present invention will be described next. The carbon fiber forming raw material of the present invention is a prepreg (Z) including sizing agent-coated carbon fibers coated with a sizing agent and a thermosetting resin or a forming base material (Y) including sizing agent-coated carbon fibers coated with a sizing agent and having a woven fabric form or a braid form.

First, the carbon fiber forming raw material (Z) as a prepreg including sizing agent-coated carbon fibers coated with a sizing agent and a thermosetting resin will be described.

The thermosetting resin used in the carbon fiber forming raw material (Z) may be any resin that undergoes cross-linking reaction by heat and at least partially forms a three-dimensional cross-linked structure. Examples of such a thermosetting resin include epoxy resins, unsaturated polyester resins, vinyl ester resins, benzoxazine resins, phenol resins, urea resins, melamine resins, and thermosetting polyimide resins and also include modified resins thereof and blending resins of two or more of them. These thermosetting resins may be self-curable by heat and may contain a curing agent, a curing accelerator, and other additives.

The epoxy resin is not particular limited and may be one or more resins selected from a bisphenol epoxy resin, an amine epoxy resin, a phenol novolac epoxy resin, a cresol novolac epoxy resin, a resorcinol epoxy resin, a phenol aralkyl epoxy resin, a naphthol aralkyl epoxy resin, a dicyclopentadiene epoxy resin, an epoxy resin having a biphenyl structure, an isocyanate-modified epoxy resin, a tetraphenylethane epoxy resin, a triphenyl methane epoxy resin, and other epoxy resins.

Here, in the bisphenol epoxy resin, two phenolic hydroxy groups on a bisphenol compound are glycidylated, and examples of the bisphenol epoxy resin include a bisphenol A epoxy resin, a bisphenol F epoxy resin, a bisphenol AD epoxy resin, a bisphenol S epoxy resin, and halogenated, alkyl-substituted, and hydrogenated products of these bisphenol epoxy resins. The bisphenol epoxy resin is not limited to monomers, and a polymer having a plurality of repeating units can also be preferably used.

Examples of the commercially available bisphenol A epoxy resin include "jER (registered trademark)" 825, 828, 834, 1001, 1002, 1003, 1003F, 1004, 1004AF, 1005F, 1006FS, 1007, 1009, and 1010 (manufactured by Mitsubishi Chemical Corporation). Examples of the brominated bisphenol A epoxy resin include "jER (registered trademark)" 505, 5050, 5051, 5054, and 5057 (manufactured by Mitsubishi Chemical Corporation). Examples of the commercially available hydrogenated bisphenol A epoxy resin include ST5080, ST4000D, ST4100D, and ST5100 (manufactured by Nippon Steel Chemical Co., Ltd.).

Examples of the commercially available bisphenol F epoxy resin include "jER (registered trademark)" 806, 807, 4002P, 4004P, 4007P, 4009P, and 4010P (manufactured by Mitsubishi Chemical Corporation) and "EPOTOHTO (registered trademark)" YDF2001 and YDF2004 (manufactured by Nippon Steel Chemical Co., Ltd.). Examples of the tetramethylbisphenol F epoxy resin include YSLV-80XY (manufactured by Nippon Steel Chemical Co., Ltd.).

Examples of the bisphenol S epoxy resin include "EPICLON (registered trademark)" EXA-154 (manufactured by DIC Corporation).

Examples of the amine epoxy resin include tetraglycidyldiaminodiphenylmethane, triglycidylaminophenol, triglycidylaminocresol, tetraglycidylxylylenediamine, halogen substituted products thereof, alkynol substituted products thereof, and hydrogenated products thereof.

Examples of the commercially available tetraglycidyldiaminodiphenylmethane include "SUMI-EPDXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720 and MY721

(manufactured by Huntsman Advanced Materials). Examples of the commercially available triglycidylaminophenol and triglycidylaminocresol include "SUMI-EPDXY (registered trademark)" ELM100 and ELM120 (manufactured by Sumitomo Chemical Co., Ltd.), "Araldite (registered trademark)" MY0500, MY0510, and MY0600 (manufactured by Huntsman Advanced Materials), and "jER (registered trademark)" 630 (manufactured by Mitsubishi Chemical Corporation). Examples of the commercially available tetraglycidylxylylenediamine and hydrogenated products thereof include TETRAD-X and TETRAD-C (manufactured by Mitsubishi Gas Chemical Company).

Examples of the commercially available phenol novolac epoxy resin include "jER (registered trademark)" 152 and 154 (manufactured by Mitsubishi Chemical Corporation) and "EPICLON (registered trademark)" N-740, N-770, and N-775 (manufactured by DIC Corporation).

Examples of the commercially available cresol novolac epoxy resin include "EPICLON (registered trademark)" N-660, N-665, N-670, N-673, and N-695 (manufactured by DIC Corporation), EOCN-1020, EOCN-102S, and EOCN-104S (manufactured by Nippon Kayaku Co., Ltd.).

Examples of the commercially available resorcinol epoxy resin include "Denacol (registered trademark)" EX-201 (manufactured by Nagase ChemteX Corporation).

Examples of the commercially available epoxy resin having a biphenyl structure include "jER (registered trademark)" YX4000H, YX4000, and YL6616 (manufactured by Mitsubishi Chemical Corporation), and NC-3000 (manufactured by Nippon Kayaku Co., Ltd.).

Examples of the commercially available dicyclopentadiene epoxy resin include "EPICLON (registered trademark)" HP7200L (an epoxy equivalent of 245 to 250, a softening point of 54 to 58), "EPICLON (registered trademark)" HP7200 (an epoxy equivalent of 255 to 260, a softening point of 59 to 63), "EPICLON (registered trademark)" HP7200H (an epoxy equivalent of 275 to 280, a softening point of 80 to 85), "EPICLON (registered trademark)" HP7200HH (an epoxy equivalent of 275 to 280, a softening point of 87 to 92) (manufactured by Dainippon Ink and Chemicals, Inc.), XD-1000-L (an epoxy equivalent of 240 to 255, a softening point of 60 to 70), XD-1000-2L (an epoxy equivalent of 235 to 250, a softening point of 53 to 63) (manufactured by Nippon Kayaku Co., Ltd.), and "Tactix (registered trademark)" 556 (an epoxy equivalent of 215 to 235, softening point 79° C.) (manufactured by Vantico Inc.).

Examples of the commercially available isocyanate-modified epoxy resin include XAC4151 and AER4152 (manufactured by Asahi Kasei Epoxy Co., Ltd.) and ACR1348 (manufactured by ADEKA), which have an oxazolidone ring.

Examples of the commercially available tetraphenylethane epoxy resin include "jER (registered trademark)" 1031 (manufactured by Mitsubishi Chemical Corporation) as a tetrakis(glycidyloxyphenyl)ethane epoxy resin.

Examples of the commercially available triphenylmethane epoxy resin include "Tactix (registered trademark)" 742 (manufactured by Huntsman Advanced Materials).

The unsaturated polyester resin is exemplified by a solution of an unsaturated polyester obtained by reaction of an alcohol with an acid component containing an α,β-unsaturated dicarboxylic acid, in a polymerizable unsaturated monomer. Examples of the α,β-unsaturated dicarboxylic acid include maleic acid, fumaric acid, itaconic acid, and derivatives of them, such as acid anhydrides of them, and these acids may be used in combination of two or more of them. As necessary, the α,β-unsaturated dicarboxylic acid may be used in combination with an additional acid component except the α,β-unsaturated dicarboxylic acid, such as saturated dicarboxylic acids including phthalic acid, isophthalic acid, terephthalic acid, tetrahydrophthalic acid, adipic acid, sebacic acid, and derivatives, for example, acid anhydrides of them.

Examples of the alcohol include aliphatic glycols such as ethylene glycol, diethylene glycol, propylene glycol, dipropylene glycol, 1,2-propanediol, 1,2-butanediol, 1,3-butanediol, and 1,4-butanediol; alicyclic diols such as cyclopentanediol and cyclohexanediol; aromatic diols such as hydrogenated bisphenol A, a bisphenol A-propylene oxide (1 to 100 mol) adduct, and xylene glycol; and polyhydric alcohols such as trimethylolpropane and pentaerythritol. These alcohols may be used in combination of two or more of them.

Specific examples of the unsaturated polyester resin include a condensate of fumaric acid or maleic acid with a bisphenol A-ethylene oxide (hereinafter abbreviated as EO) adduct, a condensate of fumaric acid or maleic acid with a bisphenol A-propylene oxide (hereinafter abbreviated as PO) adduct, and a condensate of fumaric acid or maleic acid with a bisphenol A-EO or —PO adduct (the adducts with EO and PO may be either a random adduct or a block adduct). These condensates may be dissolved in a monomer such as styrene, as necessary. Examples of the commercially available unsaturated polyester resin include "U-PiCA (registered trademark)" (manufactured by Japan U-PiCA Company, Ltd.), "Rigolac (registered trademark)" (manufactured by Showa Denko K.K.), and "Polyset (registered trademark)" (manufactured by Hitachi Chemical Co., Ltd.).

Examples of the vinyl ester resin include an epoxy (meth)acrylate obtained by esterification of the epoxy resin with an α,β-unsaturated monocarboxylic acid. Examples of the α,β-unsaturated monocarboxylic acid include acrylic acid, methacrylic acid, crotonic acid, tiglic acid, and cinnamic acid, and these unsaturated monocarboxylic acids may be used in combination of two or more of them. Specific examples of the vinyl ester resin include a bisphenol epoxy resin-(meth)acrylate modified product (for example, a terminal (meth)acrylate-modified resin obtained by reaction of an epoxy group of a bisphenol A epoxy resin with a carboxy group of (meth)acrylic acid), and these modified products may be dissolved in a monomer such as styrene, as necessary. Examples of the commercially available vinyl ester resin include "Diclite (registered trademark)" (manufactured by DIC Corporation), "Neopor (registered trademark)" (manufactured by Japan U-PiCA Company, Ltd.), and "Ripoxy (registered trademark)" (manufactured by Showa Highpolymer Co., Ltd.).

Examples of the benzoxazine resin include an o-cresol-aniline benzoxazine resin, a m-cresol-aniline benzoxazine resin, a p-cresol-aniline benzoxazine resin, a phenol-aniline benzoxazine resin, a phenol-methylamine benzoxazine resin, a phenol-cyclohexylamine benzoxazine resin, a phenol-m-toluidine benzoxazine resin, a phenol-3,5-dimethylaniline benzoxazine resin, a bisphenol A-aniline benzoxazine resin, a bisphenol A-amine benzoxazine resin, a bisphenol F-aniline benzoxazine resin, a bisphenol S-aniline benzoxazine resin, a dihydroxydiphenylsulfone-aniline benzoxazine resin, a dihydroxydiphenyl ether-aniline benzoxazine resin, a benzophenone benzoxazine resin, a biphenyl benzoxazine resin, a bisphenol AF-aniline benzoxazine resin, a bisphenol A-methylaniline benzoxazine resin, a phenol-diaminodiphenylmethane benzoxazine resin, a triphenylmethane benzoxazine resin, and a phenolphthalein benzoxazine resin. Examples of the commercially available benzoxazine resin include BF-BXZ, BS-BXZ, and BA-BXZ (manufactured by Konishi Chemical Ind. Co., Ltd.).

The phenol resin is exemplified by resins obtained by condensation of phenols such as phenol, cresol, xylenol, t-butylphenol, nonylphenol, cashew oil, lignin, resorcin, and catechol with aldehydes such as formaldehyde, acetaldehyde, and furfural, and examples include a novolak resin and a resol resin. The novolak resin can be obtained by reaction of phenol with formaldehyde in the same amount or in an excess amount of the phenol in the presence of an acid catalyst such as oxalic acid. The resol resin can be obtained by reaction of phenol with formaldehyde in the same amount or in an excess amount of the formaldehyde in the presence of a base catalyst such as sodium hydroxide, ammonia, or an organic amine. Examples of the commercially available phenol resin include "SUMILITERESIN (registered trademark)" (manufactured by Sumitomo Bakelite Co., Ltd.), Resitop (manufactured by Gunei Chemical Industry Co., Ltd.), and "AV Light (registered trademark)" (manufactured by Asahi Organic Chemicals Industry).

The urea resin is exemplified by a resin obtained by condensation of urea and formaldehyde. Examples of the commercially available urea resin include UA-144 (manufactured by Sunbake Co., Ltd.).

The melamine resin is exemplified by a resin obtained by polycondensation of melamine and formaldehyde. Examples of the commercially available melamine resin include "Nikalac (registered trademark)" (manufactured by SANWA Chemical Co., Ltd.).

The thermosetting polyimide resin is exemplified by a resin in which at least a main structure contains an imide ring, and a terminal or a main chain has one or more groups selected from a phenylethynyl group, a nadimide group, a maleimide group, an acetylene group, and the like. Examples of the commercially available polyimide resin include PETI-330 (manufactured by Ube Industries, Ltd.).

Among these thermosetting resins, the epoxy resin is preferably used because the resin advantageously has excellent balance of mechanical characteristics and causes small cure shrinkage. In particular, an epoxy resin containing a multifunctional glycidylamine epoxy resin and an aromatic diamine curing agent is preferred. The epoxy resin containing a multifunctional glycidylamine epoxy resin and an aromatic diamine curing agent has a high cross-linking density and can improve the heat resistance and the compressive strength of a carbon fiber-reinforced composite material.

Examples of the multifunctional glycidylamine epoxy resin include tetraglycidyldiaminodiphenylmethane, triglycidylaminophenol, triglycidylaminocresol, N,N-diglycidylaniline, N,N-diglycidyl-o-toluidine, N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. These resins can be typically obtained by addition of epichlorohydrin to a phenoxyaniline derivative and cyclization of the adduct with an alkali compound. A resin having a higher molecular weight has a higher viscosity, and thus N,N-diglycidyl-4-phenoxyaniline is particularly preferably used from the viewpoint of handling properties.

Examples of the phenoxyaniline derivative specifically include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphtyloxyphenoxy)aniline, 4-(1-naphtyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy)aniline.

Examples of the commercially available tetraglycidyldiaminodiphenylmethane include "SUMI-EPDXY (registered trademark)" ELM434 (manufactured by Sumitomo Chemical Co., Ltd.), YH434L (manufactured by Tohto Kasei Co., Ltd.), "Araldite (registered trademark)" MY720 (manufactured by Huntsman Advanced Materials), and "jER (registered trademark) 604" (manufactured by Mitsubishi Chemical Corporation). Examples of the triglycidylaminophenol and the triglycidylaminocresol include "SUMI-EPDXY (registered trademark)" ELM100 (manufactured by Sumitomo Chemical Co., Ltd.), "Araldite (registered trademark)" MY0510, "Araldite (registered trademark)" MY0600 (manufactured by Huntsman Advanced Materials), and "jER (registered trademark)" 630 (manufactured by Mitsubishi Chemical Corporation).

The aromatic diamine curing agent may be any aromatic diamines that are used as an epoxy resin curing agent, and specific examples include 3,3'-diaminodiphenylsulfone, 4,4'-diaminodiphenylsulfone, diaminodiphenylmethane, 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, diaminodiphenyl ether, bisaniline, benzyldimethylaniline, 2-(dimethylaminomethyl)phenol, 2,4,6-tris(dimethylaminomethyl)phenol, and 2,4,6-tris(dimethylaminomethyl)phenol 2-ethylhexanoate. These aromatic diamines may be used singly or as a mixture of two or more of them.

As a curing agent other than the aromatic diamine curing agent, amines such as an alicyclic amine, a phenol resin, dicyandiamide or derivatives thereof, an acid anhydride, polyaminoamide, an organic acid hydrazide, and an isocyanate may be used.

The phenol resin used as the curing agent may be any of the phenol resins exemplified above as the matrix resin.

The curing agents are preferably contained in a total amount so as to give an amount of an active hydrogen group ranging from 0.6 to 1.2 equivalent weight and more preferably ranging from 0.7 to 0.9 equivalent weight relative to 1 equivalent of epoxy group in all epoxy resin components. Here, the active hydrogen group is a functional group that can react with the epoxy group of a curing agent component. If the amount of an active hydrogen group is less than 0.6 equivalent weight, a cured product may have insufficient reaction rate, heat resistance, and elastic modulus, and a carbon fiber-reinforced composite material to be obtained may have insufficient glass transition temperature and strength. If the amount of an active hydrogen group is more than 1.2 equivalent weight, a cured product has sufficient reaction rate, glass transition temperature, and elastic modulus but has insufficient plastic deformability, and thus a carbon fiber-reinforced composite material to be obtained may have insufficient impact resistance.

An epoxy resin as the thermosetting resin may contain an curing accelerator in order to further accelerate the curing.

Examples of the curing accelerator include urea compounds, tertiary amines and salts thereof, imidazole and salts thereof, triphenylphosphine and derivatives thereof, metal carboxylates, and Lewis acids, Bronsted acids, and salts thereof. Among them, the urea compound is preferably used from the viewpoint of the balance between storage stability and catalytic ability.

Examples of the urea compound include N,N-dimethyl-N'-(3,4-dichlorophenyl)urea, toluene bis(dimethylurea), 4,4'-methylene bis(phenyldimethylurea), and 3-phenyl-1,1-dimethylurea. Examples of the commercially available urea compound include DCMU99 (manufactured by Hodogaya Chemical Co., Ltd.) and "Omicure (registered trademark)" 24, 52, and 94 (manufactured by Emerald Performance Materials, LLC).

The urea compound is preferably contained in an amount of 1 to 4 parts by mass relative to 100 parts by mass of all epoxy resin components. If the urea compound is contained in an amount of less than 1 part by mass, a reaction may insufficiently proceed to give a cured product having insufficient elastic modulus and heat resistance. If the urea compound is contained in an amount of more than 4 parts by mass, the self-polymerization of an epoxy resin interferes with the reaction between the epoxy resin and a curing agent, and thus the cured product may have insufficient toughness or a lower elastic modulus.

The prepreg of the present invention preferably contains a thermoplastic resin in order to control toughness or flowability. From the viewpoint of heat resistance, the prepreg more preferably contains at least one thermoplastic resin selected from polysulfone, polyether sulfone, polyether imide, polyimide, polyamide, polyamide imide, polyphenylene ether, a phenoxy resin, and polyolefin. The prepreg may contain an oligomer of a thermoplastic resin. The prepreg may contain an elastomer, a filler, and other additives. The thermoplastic resin is preferably contained in the thermosetting resin constituting a prepreg. For an epoxy resin as the thermosetting resin, the thermoplastic resin may contain, for example, a thermoplastic resin soluble in the epoxy resin or organic particles such as rubber particles and thermoplastic resin particles. The thermoplastic resin soluble in the epoxy resin is preferably a thermoplastic resin having a functional group that can form a hydrogen bond and should provide an effect of improving the adhesion between the resin and a carbon fiber.

As the thermoplastic resin soluble in an epoxy resin and having a functional group capable of forming a hydrogen bond, a thermoplastic resin having an alcoholic hydroxy group, a thermoplastic resin having an amide bond, and a thermoplastic resin having a sulfonyl group can be used.

Examples of the thermoplastic resin having an alcoholic hydroxy group include polyvinyl acetal resins such as polyvinyl formal and polyvinyl butyral, polyvinyl alcohol, and phenoxy resins. Examples of the thermoplastic resin having an amide bond include polyamide, polyimide, and polyvinylpyrrolidone. Examples of the thermoplastic resin having a sulfonyl group include polysulfone. The polyamide, the polyimide, and the polysulfone may have a functional group such as an ether bond and a carbonyl group on the main chain. The polyamide may have a substituent on the nitrogen atom of an amido group.

Examples of the commercially available thermoplastic resin soluble in an epoxy resin and having a functional group capable of forming a hydrogen bond include Denka Butyral (manufactured by Denki Kagaku Kogyo K.K.) and "Vinylec (registered trademark)" (manufactured by Chisso Corporation) as a polyvinyl acetal resin, "UCAR (registered trademark)" PKHP (manufactured by Union Carbide Corp.) as a phenoxy resin, "Macromelt (registered trademark)" (manufactured by Henkel Hakusui Corporation) and "Alanine (registered trademark)" (manufactured by Toray Industries Inc.) as a polyamide resin, "Ultem (registered trademark)" (manufactured by General Electric Company) and "Matrimid (registered trademark)" 5218 (manufactured by Ciba) as polyimide, "SUMIKAEXCEL (registered trademark)" (manufactured by Sumitomo Chemical Co., Ltd.), "UDEL (registered trademark)", and "RADEL (registered trademark)" (manufactured by Solvay Advanced Polymers) as polysulfone, and "Luviskol (registered trademark)" (manufactured by BASF Japan) as polyvinylpyrrolidone.

An acrylic resin, which has high compatibility with an epoxy resin, is suitably used in order to control flowability, for example, to increase viscosity. Examples of the commercially available acrylic resin include "Dianal (registered trademark)" BR series (manufactured by Mitsubishi Rayon Co., Ltd.), "Matsumoto Microsphere (registered trademark)" M, M100, and M500 (manufactured by Matsumoto Yushi-Seiyaku Co., Ltd.), and "Nanostrength (registered trademark)" E40F, M22N, and M52N (manufactured by Arkema Inc.).

The epoxy resin preferably used in the carbon fiber forming raw material (Z) may contain rubber particles. The rubber particles are preferably cross-linked rubber particles and core-shell rubber particles obtained by graft polymerization of the surface of cross-linked rubber particles with a different polymer from the viewpoint of handling properties and the like.

Examples of the commercially available cross-linked rubber particles include FX501P (manufactured by JSR Corporation) containing a cross-linked product of a carboxyl-modified butadiene-acrylonitrile copolymer, CX-MN series (manufactured by Nippon Shokubai Co., Ltd.) containing acrylic rubber microparticles, and YR-500 series (manufactured by Nippon Steel Chemical Co., Ltd.).

Examples of the commercially available core-shell rubber particles include "PARALOID (registered trademark)" EXL-2655 (manufactured by Kureha Chemical Industry Co., Ltd.) containing a butadiene-alkyl methacrylate-styrene copolymer, "STAPHYLOID (registered trademark)" AC-3355 and TR-2122 (manufactured by Takeda Pharmaceutical Company Limited) containing an acrylate-methacrylate copolymer, and "PARALOID (registered trademark)" EXL-2611 and EXL-3387 (manufactured by Rohm & Haas) and "Kane Ace (registered trademark)" MX (manufactured by Kaneka Corporation) containing a butyl acrylate-methyl methacrylate copolymer.

The thermoplastic resin particles are preferably polyamide particles and polyimide particles, and examples of the commercially available polyamide particles include SP-500 (manufactured by Toray Industries Inc.) and "Orgasol (registered trademark)" (manufactured by Arkema Inc.).

In the carbon fiber forming raw material (Z), the epoxy resin composition may contain particles of inorganic substances such as silica, alumina, smectite, and synthetic mica to an extent not impairing the effect of the present invention in order to control flowability, for example, to increase the flowability of the epoxy resin composition.

The thermosetting resin used in the carbon fiber forming raw material (Z) is preferably a thermosetting resin containing a dicyclopentadiene epoxy resin (D), an epoxy resin (E) having an average epoxy equivalent of 1,000 g/mol or more and 10,000 g/mol or less, and a curing agent (F) in order to improve the heat resistance and the torsional strength of a carbon fiber-reinforced composite material to be obtained.

The dicyclopentadiene epoxy resin as the component (D) constituting the thermosetting resin used in the carbon fiber forming raw material (Z) is those exemplified above as the thermosetting resin that can be used singly. The component (D) is preferably contained in an amount of 5 to 55 parts by mass and more preferably 10 to 50 parts by mass relative to 100 parts by mass of all epoxy resins. A component (D) contained in an amount of less than 5 parts by mass may have a small effect of improving thermal stability to deteriorate heat resistance and may reduce an initial tack value. A component (D) contained in an amount of more than 55 parts by mass may increase residual thermal stress to thus reduce the physical properties of a carbon fiber-reinforced composite material.

The component (E) constituting the thermosetting resin used in the carbon fiber forming raw material (Z) preferably has an average epoxy equivalent of 1,000 g/mol or more and 10,000 g/mol or less, more preferably 1,200 g/mol or more and 8,000 g/mol or less, and even more preferably 1,500 g/mol or more and 5,000 g/mol or less. A component (E) having an average epoxy equivalent of less than 1,000 g/mol may have a small effect of improving thermal stability and may reduce a tack holding ratio. If containing a component (E) having an average epoxy equivalent of more than 10,000 g/mol, the resin has insufficient impregnation properties in a prepreg production process, and this may deteriorate the physical properties of a carbon fiber-reinforced composite material.

Examples of the commercially available epoxy resin (E) having an average epoxy equivalent of 1,000 g/mol or more and 10,000 g/mol or less include "jER (registered trademark)" 1005F (manufactured by Mitsubishi Chemical Corporation, an average epoxy equivalent of 1,000), ST-5100 (manufactured by Tohto Kasei Co., Ltd., an average epoxy equivalent of 1,000), ST-4100D (manufactured by Tohto Kasei Co., Ltd., an epoxy equivalent of 1,000), "jER (registered trademark)" 1005H (manufactured by Mitsubishi Chemical Corporation, an average epoxy equivalent of 1,290), "jER (registered trademark)" 5354 (manufactured by Mitsubishi Chemical Corporation, an average epoxy equivalent of 1,650), DER-667 (manufactured by Dow Chemical Japan Ltd., an average epoxy equivalent of 1,775), EP-5700 (manufactured by Asahi Denka Kogyo, an average epoxy equivalent of 1,925), "EPICLON (registered trademark)" 7050 (manufactured by Dainippon Ink and Chemicals, Inc., an average epoxy equivalent of 1,925), YD-017 (manufactured by Tohto Kasei Co., Ltd., an average epoxy equivalent of 1,925), "jER (registered trademark)" 1007 (manufactured by Mitsubishi Chemical Corporation, an average epoxy equivalent of 1,950), "jER (registered trademark)" 5057 (manufactured by Mitsubishi Chemical Corporation, an average epoxy equivalent of 2,250), "jER (registered trademark)" 4007P (manufactured by Mitsubishi Chemical Corporation, an average epoxy equivalent of 2,270), DER-668 (manufactured by Dow Chemical Japan Ltd., an average epoxy equivalent of 2,750), YD-019 (manufactured by Tohto Kasei Co., Ltd., an average epoxy equivalent of 2,850), EP-5900 (manufactured by Asahi Denka Kogyo, an average epoxy equivalent of 2,850), "jER (registered trademark)" 1009 (manufactured by Mitsubishi Chemical Corporation, an average epoxy equivalent of 3,300), "jER (registered trademark)" 4110P (manufactured by Mitsubishi Chemical Corporation, an average epoxy equivalent of 3,800), YD-020N (manufactured by Tohto Kasei Co., Ltd., an average epoxy equivalent of 3,900), "jER (registered trademark)" 1010 (manufactured by Japan Epoxy Resin Co., Ltd., an average epoxy equivalent of 4,000), "jER (registered trademark)" 4010P (manufactured by Japan Epoxy Resin Co., Ltd., an average epoxy equivalent of 4,400), DER-669 (manufactured by Dow Chemical Japan Ltd., an average epoxy equivalent of 4,500), YD-020H (manufactured by Tohto Kasei Co., Ltd., an average epoxy equivalent of 5,250), "jER (registered trademark)" 1256 (manufactured by Mitsubishi Chemical Corporation, an average epoxy equivalent of 7,700), "jER (registered trademark)" 4250 (manufactured by Mitsubishi Chemical Corporation, an average epoxy equivalent of 8,500), "jER (registered trademark)" 4275 (manufactured by Mitsubishi Chemical Corporation, an average epoxy equivalent of 8,500), "jER (registered trademark)" 5203 (manufactured by Mitsubishi Chemical Corporation, an average epoxy equivalent of 9,000), and "jER (registered trademark)" 4210 (manufactured by Mitsubishi Chemical Corporation, an average epoxy equivalent of 10,000).

The component (E) is preferably contained in an amount of 5 to 55 parts by mass and more preferably 10 to 50 parts by mass relative to 100 parts by mass of all epoxy resins. A component (E) contained in an amount of less than 5 parts by mass may reduce the effect of improving thermal stability and may reduce the tack holding ratio of a prepreg. If containing the component (E) in an amount of more than 55 parts by mass, the resin has insufficient impregnation properties into carbon fibers in a prepreg production process, and this may deteriorate the physical properties of a carbon fiber-reinforced composite material.

The component (F) is not particularly limited and may be an amine curing agent, an acid anhydride curing agent, and a phenol curing agent, for example. Among them, dicyandiamide as an amine curing agent is preferred from the viewpoint of thermal stability.

In order to improve the toughness of a cured product as a prepreg or to improve the impact resistance of a carbon fiber-reinforced composite material, the thermosetting resin used in the carbon fiber forming raw material (Z) preferably contains at least one block copolymer (G) selected from the group consisting of S—B-M, B-M, and M-B-M (hereinafter also called block copolymer as an abbreviation). S—B-M, B-M, and M-B-M are the block copolymers described in Japanese National Publication of International Patent Application No. 2003-535181 or International Publication No. 2006/077153 pamphlet.

Here, the blocks represented by S, B, and M are directly linked to each other through a covalent bond or linked to each other through covalent bonds while interposing any chemical structure.

The block M is a homopolymer of polymethyl methacrylate or a copolymer containing at least 50% by weight of methyl methacrylate.

The block copolymer as the component (G) is preferably contained in an amount of 1 to 10 parts by mass, more preferably 2 to 7 parts by mass, and even more preferably 3 to 6 parts by mass relative to 100 parts by mass of the epoxy resin in a matrix resin from the viewpoint of mechanical characteristics and the adaptability to a composite production process.

To the block M in the block copolymer as the component (G), an additional monomer except methyl methacrylate is preferably introduced as a copolymerizable component in order to improve the compatibility with the epoxy resin and to control various characteristics of a cured product. Although such a copolymerizable monomer component is not particularly limited and can be appropriately selected in terms of the object above, typically, a highly polar monomer, especially a water-soluble monomer is preferably used in order to provide the compatibility with a highly polar epoxy resin.

Specifically, an acrylamide derivative is preferably used. In particular, the acrylic monomer is not limited to dimethyl acrylamide, and a reactive monomer is also applicable.

Here, the reactive monomer is a monomer having a functional group capable of reacting with an oxirane group of an epoxy molecule or a functional group of a curing agent. Specific examples of the functional group include, but are not limited to, reactive functional groups such as an oxirane group, an amino group, and a carboxy group. The reactive monomer can be converted into (meth)acrylic acid (methacrylic acid and acrylic acid are collectively called (meth) acrylic acid) or into any other monomer capable forming (meth)acrylic acid by hydrolysis. The reactive monomer improves the compatibility with an epoxy resin or the adhesion on an interface of an epoxy-block copolymer and thus is preferably used.

Examples of other monomers constituting the block M include glycidyl methacrylate and tert-butyl methacrylate, but the block M preferably contains at least 60% of syndiotactic polymethyl methacrylate (PMMA).

A polymer constituting the block B has a glass transition temperature Tg of 20° C. or less, preferably 0° C. or less, and more preferably −40° C. or less. The glass transition temperature Tg is preferably as low as possible in terms of the toughness of a cured product, but a polymer having a glass transition temperature Tg of lower than −100° C. may cause problems of processability, for example, may cause a rough cutting surface when a carbon fiber-reinforced composite material is formed.

The polymer constituting the block B is preferably an elastomer, and a monomer used to synthesize the elastomer is preferably selected from butadiene, isoprene, 2,3-dimethyl-1,3-butadiene, 1,3-pentadiene, and 2-phenyl-1,3-butadiene.

The block B is preferably selected from polydienes, specifically from polybutadiene, polyisoprene, random copolymers of them, and polydienes obtained by partial or complete hydrogenation of them from the viewpoint of the toughness of a cured product. Although the polybutadiene can be exemplified by 1,2-polybutadiene (Tg: about 0° C.), a polybutadiene having a lowest glass transition temperature Tg, for example, 1,4-polybutadiene (Tg: about −90° C.) is more preferably used. This is because the use of a block B having a lower glass transition temperature Tg is advantageous from the viewpoint of the impact resistance of a carbon fiber-reinforced composite material and the toughness of a cured product. The block B may be hydrogenated in a usual manner.

The monomer used for synthesizing the block B as an elastomer is also preferably an alkyl (meth)acrylate. Specific examples include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). Here, the numerical value given in the parentheses after the name of each acrylate is Tg of a corresponding block B obtained by using the acrylate. Among them, butyl acrylate is preferably used. The acrylate as the monomer for synthesizing the block B is incompatible with the acrylate of the block M containing at least 50% by weight of methyl methacrylate. Specifically, the block B preferably mainly contains 1,4-polybutadiene, polybutyl acrylate, or poly(2-ethylhexyl acrylate).

In the carbon fiber forming raw material (Z), for a triblock copolymer S—B-M used as the block copolymer as the component (G), the block S is preferably incompatible with the blocks B and M and preferably has a glass transition temperature Tg higher than the glass transition temperature Tg of the block B. The block S preferably has a Tg or melting point of 23° C. or more and more preferably 50° C. or more. In the present invention, the glass transition temperature Tg of the block S is determined in a similar manner to that for the Tg of the block B. Examples of the block S include blocks obtained from an aromatic vinyl compound such as styrene, α-methylstyrene, and vinyltoluene and blocks obtained from an alkyl acid having a C1-18 alkyl chain and/or an alkyl ester of methacrylic acid. The latter block obtained from an alkyl acid having a C1-18 alkyl chain and/or an alkyl ester of methacrylic acid is incompatible with the block M containing at least 50% by weight of methyl methacrylate.

In the carbon fiber forming raw material (Z), for a triblock copolymer M-B-M used as the block copolymer as the component (G), two blocks M in the triblock copolymer M-B-M may be the same as or different from each other. Two blocks M may contain the same monomer but have different molecular weights from each other.

In the carbon fiber forming raw material (Z), for a combination use of the triblock copolymer M-B-M and the diblock copolymer B-M as the block copolymer as the component (G), the block M in the triblock copolymer M-B-M may be the same as or different from the block M in the diblock copolymer B-M, and the block B in the M-B-M triblock may be the same as or different from the block B in the diblock copolymer B-M.

In the carbon fiber forming raw material (Z), for a combination use of the triblock copolymer S—B-M and the diblock copolymer B-M and/or the triblock copolymer M-B-M as the block copolymer as the component (G), the block M in the triblock copolymer S—B-M, each block M in the triblock copolymer M-B-M, and the block M in the diblock copolymer B-M may be the same as or different from each other, and the block B in the triblock copolymer S—B-M, the block B in the triblock copolymer M-B-M, and the block B in the diblock copolymer B-M may be the same as or different from each other.

In the carbon fiber forming raw material (Z), the block copolymer as the component (G) can be produced by anionic polymerization and can be produced, for example, by the methods described in European Patent EP No. 524,054 and European Patent EP No. 749,987.

Specific examples of the triblock copolymer M-B-M include methyl methacrylate-butyl acrylate-methyl methacrylate copolymers such as "Nanostrength (registered trademark)" M22 and "Nanostrength (registered trademark)" M22N having a polar functional group manufactured by Arkema Inc. Specific examples of the triblock copolymer S—B-M include of styrene-butadiene-methyl methacrylate copolymers such as "Nanostrength (registered trademark)" 123, "Nanostrength (registered trademark)" 250, "Nanostrength (registered trademark)" 012, "Nanostrength (registered trademark)" E20, and "Nanostrength (registered trademark)" E40 manufactured by Arkema Inc.

When containing the block copolymer as the component (G), the thermosetting resin used in the carbon fiber forming raw material (Z) preferably contains an amine epoxy resin in an amount of 10 to 60 parts by mass, a bisphenol epoxy resin in an amount of 40 to 90 parts by mass, dicyandiamide or a derivative thereof in an amount of 1 to 10 parts by mass, and at least one block copolymer (G) selected from the group consisting of S—B-M, B-M, and M-B-M in an amount of 1 to 10 parts by mass because a resin cured product obtains a high elastic modulus and also obtains high elongation and high toughness due to the formation of a fine phase separated structure of the component (G).

The thermosetting resin used in the carbon fiber forming raw material (Z) is preferably an epoxy matrix resin containing a bisphenol epoxy resin (H) having a softening point of 90° C. or more, an amine epoxy resin (I) having three or more functional groups, a bisphenol F epoxy resin (J) having a number average molecular weight of 450 or less, and a curing agent (K) and contains 20 to 50 parts by mass of the component (H), 30 to 50 parts by mass of the component (I), and 10 to 40 parts by mass of the component (J) relative to 100 parts by mass of the total amount of the components (H) to (J).

In the carbon fiber forming raw material (Z), the amine epoxy resin having three or more functional groups as the component (I) is an amine epoxy resin having at least three or more functional groups selected from a hydroxy group, an amido group, an imido group, a urethane group, a urea group, a sulfonyl group, and a sulfo group in addition to the epoxy group.

Here, even when the component (H), the component (I), and the component (J) are uniformly mixed with each other before curing, the components preferably undergo spinodal decomposition during curing to form a phase separated structure between a phase rich in the component (H) and a phase rich in the component (I). The phase separated structure more preferably has a structure period of 1 nm to 5 μm and even more preferably has a structure period of 1 nm to 1 μm. During a curing step of an epoxy resin composition containing the component (H), the component (I), the component (J), and the component (K), the component (J) works as a compatibilizer between the component (H) and the component (I).

When the phase separated structure formed of the phase rich in the component (H) and the phase rich in the component (I) has a structure period of less than 1 nm, the resin fails to provide a cavitation effect to result in insufficient toughness and is liable to result in insufficient elastic modulus. When the phase separated structure formed of the phase rich in the component (H) and the phase rich in the component (I) has a structure period of more than 5 μm, cracks develop in a sea phase alone but do not develop into an island phase due to the large structure period, and thus a resin may fail to provide a cavitation effect, resulting in insufficient toughness of a resin cured product. In other words, the cured product of an epoxy matrix resin including the phase rich in the component (H) and the phase rich in the component (I) and having a fine phase separated structure allows a resin cured product to satisfy both the elastic modulus and the toughness.

In the carbon fiber forming raw material (Z), the phase separated structure is a structure formed of two or more phases that include the phase rich in the component (H) and the phase rich in the component (I) and are separated from each other. Here, the phase rich in the component (H) and the phase rich in the component (I) are phases containing the component (H) and the component (I) as a main component, respectively. Here, the main component is a component contained at the highest ratio. The phase separated structure may be a phase separated structure that is formed of three or more phases including a phase containing any main component except the component (H) and the component (I). In contrast, the state in which components are uniformly mixed at a molecular level is called a compatible state. The phase separated structure of a resin cured product can be identified by the observation of a cross section of the resin cured product under a scanning electron microscope or a transmission electron microscope. As necessary, the cross section may be stained with osmium, for example. The staining can be performed in a usual manner.

In the carbon fiber forming raw material (Z), the structure period of phase separation is defined as below. The phase separated structure includes a two-phase continuous structure and a sea-island structure, and each structure will be described.

For a phase separated structure as the two-phase continuous structure, three straight lines having a predetermined length are randomly drawn on a micrograph; intersection points of the straight lines and phase interfaces are extracted; the distance between intersection points adjacent to each other is determined; and the number average of the distances is calculated as the structure period. The predetermined length is set on the basis of a micrograph as below. When the structure period is expected to be of the order of 0.01 μm (0.01 μm or more and less than 0.1 μm), a sample is photographed at a magnification of 20,000 times, and straight lines having a length of 20 mm (a length of 1 μm on the sample) as the predetermined length are drawn on the photograph. In a similar manner, when the phase separated structure period is expected to be of the order of 0.1 μm (0.1 μm or more and less than 1 μm), a sample is photographed at a magnification of 2,000 times, and straight lines having a length of 20 mm (a length of 10 μm on the sample) as the predetermined length are drawn on the photograph. When the phase separated structure period is expected to be of the order of 1 μm (1 μm or more and less than 10 μm), a sample is photographed at a magnification of 200 times, and straight lines having a length of 20 mm (a length of 100 μm on the sample) as the predetermined length are drawn on the photograph. If a phase separated structure period determined is out of the order expected, the structure period is determined once again at a magnification corresponding to the order.

For a phase separated structure as the sea-island structure, three particular regions are randomly selected on a micrograph. The sizes of island phases in the region are determined. The number average of the sizes is calculated as the structure period. The size of an island phase is the length of the shortest line from a phase interface to another phase interface through the island phase. Even when the island phase has an elliptical shape, an indefinite shape, or a circular or ellipsoidal shape including two or more layers, the shortest distance from a phase interface to another phase interface through the island phase is regarded as the island phase size. The particular region is set on the basis of a micrograph as below. When the phase separated structure period is expected to be of the order of 0.01 μm (0.01 μm or more and less than 0.1 μm), a sample is photographed at a magnification of 20,000 times, and a 4-mm square region on the photograph (a 0.2-μm square region on the sample) is regarded as the particular region. In a similar manner, when the phase separated structure period is expected to be of the order of 0.1 μm (0.1 μm or more and less than 1 μm), a sample is photographed at a magnification of 2,000 times, and a 4-mm square region on the photograph (a 2-μm square region on the sample) is regarded as the particular region. When the phase separated structure period is expected to be of the order of 1 μm (1 μm or more and less than 10 μm), sample is photographed at a magnification of 200 times, and a 4-mm square region on the photograph (a 20-μm square region on the sample) is regarded as the particular region. If a phase separated structure period determined is out of the order expected, the structure period is determined once again at a magnification corresponding to the order.

In order to increase the contact probability of carbon fibers with each other and to improve the electric conductivity of a carbon fiber-reinforced composite material, the prepreg as the carbon fiber forming raw material (Z) is also preferably mixed with a conductive filler. Examples of such a conductive filler include carbon blacks, carbon nanotubes, vapor-grown carbon fibers (VGCFs), fullerenes, and metal nanoparticles, and these fillers may be used singly or in combination. Among them, the carbon black, which is inexpensive and provides high effect, is preferably used. Examples of the carbon black include furnace black, acetylene black, thermal black, channel black, and Ketjenblack, and these carbon blacks may be used as a mixture of two or more of them.

In particular, the carbon fiber forming raw material (Z) for improving the electric conductivity is preferably a prepreg satisfying at least one requirement of (1) and (2).

(1) Thermoplastic resin particles or fibers (L) and electrically conductive particles or fibers (M) are further contained, and the weight ratio represented by [amount (parts by mass) of (L)]/[amount (parts by mass) of (M)] is 1 to 1,000.

(2) Electrically conductive particles or fibers (N) containing a thermoplastic resin nucleus or core coated with an electrically conductive substance are further contained.

Here, specific examples the electrically conductive particles or fibers as the component (M) and the electrically conductive particles or fibers containing a thermoplastic resin nucleus or core coated with an electrically conductive substance as the component (N) include carbon blacks, carbon nanotubes, vapor-grown carbon fibers (VGCFs), fullerenes, and metal nanoparticles, and these materials may be used singly or in combination. Among them, the carbon black, which is inexpensive and provides high effect, is preferably used. Examples of the carbon black include furnace black, acetylene black, thermal black, channel black, and Ketjenblack, and these carbon blacks may be used as a mixture of two or more of them.

An embodiment satisfying the requirement (1) includes the thermoplastic resin particles or fibers as the component (L) and thus can achieve excellent impact resistance. The thermoplastic resin particles or fibers as the component (L) of the present invention may include, as a raw material, various thermoplastic resins similar to those exemplified above as the thermoplastic resin that is used to be mixed with or dissolved in a thermosetting resin. Specifically, polyamide, which has excellent toughness to greatly improve the impact resistance, is most preferred. Among the polyamides, nylon 12, nylon 11, and nylon 6/12 copolymer are preferred because the nylons particularly have good adhesive strength to a thermosetting resin, thus provide a carbon fiber-reinforced composite material having high delamination strength at the time of drop-weight impact, and achieve high improvement effect of impact resistance.

For thermoplastic resin particles as the component (L), the shape of the thermoplastic resin particles may be spherical, nonspherical, porous, acicular, whisker-like, or flaky. The spherical shape is specifically preferred for the reasons below. In other words, the shape does not deteriorate the flow characteristics of a thermosetting resin, and thus the resin has excellent impregnation properties into a carbon fiber. In addition, at the time of drop-weight impact (or local impact) on a carbon fiber-reinforced composite material, the shape further reduces delamination generated by the local impact, and thus the carbon fiber-reinforced composite material has a smaller delamination area that is generated by the local impact and is to be a starting point of the destroy by stress concentration when a stress is applied to the carbon fiber-reinforced composite material after the impact. This can afford a carbon fiber-reinforced composite material exhibiting high impact resistance.

For thermoplastic resin fibers as the component (L), the shape of the thermoplastic resin fibers may be either a short fiber or a long fiber. For the short fiber, a method using short fibers in a similar manner to that for particles as disclosed in Japanese Patent Application Laid-open No. 2-69566 or a method using short fibers processed into a mat can be employed. For the long fiber, a method of arranging long fibers on the surface of a prepreg in parallel as disclosed in Japanese Patent Application Laid-open No. 4-292634 and a method of arranging long fibers in a random manner as disclosed in International Publication No. 94016003 can be employed. In addition, fibers may be processed into a woven fabric as disclosed in Japanese Patent Application Laid-open No. 2-32843, into a nonwoven fabric as disclosed in International Publication No. 94016003, or into a sheet-like base material such as a knit. Moreover, fibers may be processed into short fiber chips, chopped strands, or milled fibers, or short fibers may be processed into spun yarns, which may be arranged in parallel or in a random manner to prepare a woven fabric or a knit.

In the carbon fiber forming raw material (Z), electrically conductive particles used as the component (M) may be any particles that work as a good electrical conductor and are not limited to particles consisting of a conductor alone. The electrically conductive particles preferably have a volume resistivity value of 10 to $10^{-9}$ Ωcm, more preferably 1 to $10^{-9}$ Ωcm, and even more preferably $10^{-1}$ to $10^{-9}$ Ωcm. Particles having an excessively high volume resistivity value may impart insufficient electric conductivity to a carbon fiber-reinforced composite material. Usable examples of the electrically conductive particles include metal particles; electrically conductive polymer particles such as polyacetylene particles, polyaniline particles, polypyrrole particles, polythiophene particles, polyisothianaphtene particles, and polyethylenedioxythiophene particles; carbon particles; particles containing an inorganic material core coated with an electrically conductive substance; and particles containing an organic material core coated with an electrically conductive substance. Among them, the carbon particles, the particles containing an inorganic material, core coated with an electrically conductive substance, and the particles containing an organic material core coated with an electrically conductive substance are particularly preferably used because of having high electric conductivity and stability.

In particular, in a similar manner to that in the embodiment described later satisfying the requirement (2), a thermoplastic resin is preferably used as the organic material, and particles containing the thermoplastic resin core coated with an electrically conductive substance are preferably employed, because more excellent impact resistance can be achieved in an intended carbon fiber-reinforced composite material.

In the carbon fiber forming raw material (Z), electrically conductive fibers used as the component (M) may be any fibers that work as a good electrical conductor and are not limited to fibers consisting of a conductor alone. The electrically conductive fibers preferably have a volume resistivity value of 10 to $10^{-9}$ Ωcm, more preferably 1 to $10^{-9}$ Ωcm, and even more preferably $10^{-1}$ to $10^{-9}$ Ωcm. Fibers having an excessively high volume resistivity value may impart insufficient electric conductivity to a carbon fiber-reinforced composite material. Examples of the electrically conductive fibers include metal fibers, carbon fibers, fibers containing an inorganic material core coated with an electrically conductive substance, and fibers containing an organic material core coated with an electrically conductive substance. In particular, in a similar manner to that in the embodiment described later satisfying the requirement (2) of the present invention, when a thermoplastic resin is used as the organic material, and fibers containing the thermoplastic resin core coated with an electrically conductive substance are employed, more excellent impact resistance can be achieved in an intended carbon fiber-reinforced composite material.

Here, the volume resistivity value is determined as follows: a sample is set in a cylindrical cell having a four-probe electrode; the thickness and the resistance value of the sample are determined while the sample is pressurized at a pressure of 60 MPa; and the volume resistivity value is calculated from the determined values.

In the component (M) as the electrically conductive particles or fibers coated with an electrically conductive substance, the electrically conductive particles or fibers include an inorganic material or an organic material as the nucleus or the core and an electrically conductive layer containing an electrically conductive substance and may include an adhesion layer between the nucleus or the core and the electrically conductive layer as described later, as necessary.

In the component (M) as the electrically conductive particles or fibers coated with an electrically conductive substance, examples of the inorganic material used as the nucleus or the core include inorganic oxides, inorganic-organic composites, and carbon.

Examples of the inorganic oxide include simple inorganic oxides and composite inorganic oxides of two or more oxides, such as silica, alumina, zirconia, titania, silica-alumina, and silica-zirconia.

Examples of the inorganic-organic composite include polyorganosiloxanes obtained by hydrolysis of metal alkoxides and/or metal alkylalkoxides.

Preferably used carbon is crystalline carbon and amorphous carbon. Specific examples of the amorphous carbon include "Bellpearl" (registered trademark) C-600, C-800, and C-2000 (manufactured by Kanebo, Ltd.) and "NICABEADS" (registered trademark) ICB, PC, and MC (manufactured by Nippon Carbon Co., Ltd.).

In the component (M) as the electrically conductive particles or fibers coated with an electrically conductive substance, when an organic material is used as the nucleus or the core, examples of the organic material used as the nucleus or the core include thermosetting resins such as an unsaturated polyester resin, a vinyl ester resin, an epoxy resin, a benzoxazine resin, a phenol resin, a urea resin, a melamine resin, and a polyimide resin; and thermoplastic resins such as a polyamide resin, a phenol resin, an amino resin, an acrylic resin, an ethylene-vinyl acetate resin, a polyester resin, a urea resin, a melamine resin, an alkyd resin, a polyimide resin, a urethane resin, and a divinylbenzene resin. These materials exemplified above may be used in combination of two or more of them. Among them, the acrylic resin and the divinylbenzene resin having excellent heat resistance and the polyamide resin having excellent impact resistance are preferably used.

An embodiment satisfying the requirement (2) essentially includes, as the component (N), the electrically conductive particles or fibers containing a thermoplastic resin nucleus or core coated with an electrically conductive substance, and thus the embodiment allows a carbon fiber-reinforced composite material to exhibit high impact resistance and electric conductivity without adding the thermoplastic resin particles or fibers as the component (L). The thermoplastic resin used as the raw material of the nucleus or the core of the electrically conductive particles or fibers as the component (N) used in the present invention may be various thermoplastic resins similar to those exemplified above as the thermoplastic resin that is used to be mixed with or dissolved in a thermosetting resin. Specifically, a thermoplastic resin having a strain energy release rate ($G_{1c}$) of 1,500 to 50,000 J/$m^2$ is preferably used as the raw material of the nucleus or the core. The strain energy release rate is more preferably 3,000 to 40,000 J/$m^2$ and even more preferably 4,000 to 30,000 J/$m^2$. A thermoplastic resin having an excessively small strain energy release rate ($G_{1c}$) may produce a carbon fiber-reinforced composite material having an insufficient impact resistance, and a thermoplastic resin having an excessively large strain energy release rate ($G_{1c}$) may deteriorate the rigidity of a carbon fiber-reinforced composite material. Preferred examples of the thermoplastic resin include polyamide, polyamide imide, polyether sulfone, and polyether imide, and polyamide is specifically preferably used. Among the polyamides, nylon 12, nylon 11, and nylon 6/12 copolymer are preferably used. The evaluation of $G_{1c}$ is carried out by using a resin sheet formed of a thermoplastic resin as the raw material of the nucleus or the core of the component (N) in accordance with a compact tension method or a double tension method described in ASTM D 5045-96.

When electrically conductive particles containing a thermoplastic resin core coated with an electrically conductive substance are used as the component (N), the shape of the core of the thermoplastic resin particles may be spherical, nonspherical, porous, acicular, whisker-like, or flaky. The spherical shape is specifically preferred for the reasons below. In other words, the shape does not deteriorate the flow characteristics of a thermosetting resin, and thus the resin has excellent impregnation properties into a carbon fiber. In addition, at the time of drop-weight impact (or local impact) on a carbon fiber-reinforced composite material, the shape further reduces delamination generated by the local impact, and thus the carbon fiber-reinforced composite material has a smaller delamination area that is generated by the local impact and is to be a starting point of the destroy by stress concentration when a stress is applied to the carbon fiber-reinforced composite material after the impact. Moreover, the shape increases the contact probability with carbon fibers in a lamination layer, and this readily forms conductive paths. As a result, a carbon fiber-reinforced composite material exhibiting high impact resistance and electric conductivity can be obtained.

When electrically conductive fibers containing a thermoplastic resin core coated with an electrically conductive substance are used as the component (N), the shape of the core of the thermoplastic resin fibers may be either a short fiber or a long fiber.

For the short fiber, a method using short fibers in a similar manner to that for particles as disclosed in Japanese Patent Application Laid-open No. 2-69566 or a method using short fibers processed into a mat can be employed. For the long fiber, a method of arranging long fibers on the surface of a prepreg in parallel as disclosed in Japanese Patent Application Laid-open No. 4-292634 and a method of arranging long fibers in a random manner as disclosed in International Publication No. 94016003 can be employed. In addition, fibers may be processed into a woven fabric as disclosed in Japanese Patent Application Laid-open No. 2-32843, into a nonwoven fabric as disclosed in International Publication No. 94016003, or into a sheet-like base material such as a knit. Moreover, fibers may be processed into short fiber chips, chopped strands, or milled fibers, or short fibers may be processed into spun yarns, which may be arranged in parallel or in a random manner to prepare a woven fabric or a knit.

The method of coating the core of thermoplastic resin fibers with an electrically conductive substance includes a method of processing the core of thermoplastic resin fibers into the shape above and subsequently applying an electrically conductive substance and a method of coating the core of thermoplastic resin fibers with an electrically conductive substance and subsequently processing the coated core into the shape above. Each method is preferably employed for short fibers, long fibers, chopped strands, and milled fibers. A woven fabric, a knit, and a nonwoven fabric preferably employ the method of coating the core of thermoplastic resin fibers with an electrically conductive substance and subsequently processing the coated core into the shape above. In the case of a woven fabric, a knit, or a nonwoven fabric, the method of processing the core of thermoplastic resin fibers into the shape and subsequently applying an electrically conductive substance may cause uneven coating to deteriorate the electric conductivity of the component (N) and thus is unfavorable.

In the component (N) as the electrically conductive particles or fibers containing a thermoplastic resin nucleus or core coated with an electrically conductive substance, the electrically conductive substance applied to the nucleus or the core is exemplified by a metal or carbon. In the component (N), the electrically conductive substance forms an electrically conductive layer on the surface of the nucleus or the core of the thermoplastic resin. The electrically conductive layer may be a continuous film of a metal or carbon or an aggregate of fibrous or particulate electrically conductive substances such as electrically conductive fibers, carbon black, and metal microparticles. In addition, an adhesion layer may be provided between the thermoplastic resin as the nucleus or the core and the electrically conductive layer as described later.

In the component (M) as the electrically conductive particles or fibers coated with an electrically conductive substance and in the component (N) as the electrically conductive particles or fibers containing a thermoplastic resin nucleus or core coated with an electrically conductive substance, the electrically conductive substance constituting the electrically conductive layer may be any substance that works as a good electrical conductor and is not limited to a substance consisting of a conductor alone. The electrically conductive substance preferably has a volume resistivity value of 10 to $10^{-9}$ Ωcm, more preferably 1 to $10^{-9}$ Ωcm, and even more preferably $10^{-1}$ to $10^{-9}$ Ωcm. An electrically conductive substance having an excessively high volume resistivity value may impart insufficient electric conductivity to a carbon fiber-reinforced composite material. Examples of the electrically conductive substance include carbons and metals, and the electrically conductive layer may be a continuous film of carbon or a metal or an aggregate of fibrous or particulate electrically conductive substances.

Preferred examples of the carbon used as the electrically conductive substance include carbon blacks such as channel black, thermal black, furnace black, and Ketjenblack and hollow carbon fibers. Among them, the hollow carbon fibers are preferably used and preferably have an outer diameter of 0.1 to 1,000 nm and more preferably 1 to 100 nm. It is likely to be difficult to produce hollow carbon fibers having an excessively small or large outer diameter.

The hollow carbon fibers may have a surface on which a graphite layer is formed. At that time, the total number of graphite layers included is preferably 1 to 100, more preferably 1 to 10, even more preferably 1 to 4, and particularly preferably 1 to 2.

When a metal is used as the electrically conductive substance, any metal can be used. The metal preferably has a standard electrode potential of −2.0 to 2.0 V and more preferably −1.8 to 1.8 V. A metal having an excessively low standard electrode potential may be unstable and thus unfavorable in terms of safety, and a metal having an excessively high standard electrode potential may deteriorate processability and productivity. Here, the standard electrode potential is represented by the difference between the electrode potential when a metal is immersed in a solution containing ions of the metal and the potential of a normal hydrogen electrode (a platinum electrode immersed in 1N HCl solution that is in contact with hydrogen gas at 1 atmosphere). For example, the standard electrode potential of Ti is −1.74 V, that of Ni is −0.26 V, that of Cu is 0.34 V, that of Ag is 0.80 V, and that of Au is 1.52 V.

When the metal is used, a metal to be plated is preferred. Preferred examples of the metal include platinum, gold, silver, copper, tin, nickel, titanium, cobalt, zinc, iron, chromium, and aluminum because metal corrosion due to the potential difference between the metal and carbon fibers can be suppressed. Among them, platinum, gold, silver, copper, tin, nickel, or titanium is particularly preferably used because such a metal has a volume resistivity value of 10 to $10^{-9}$ Ωcm, which shows high electric conductivity, and is stable. These metals may be used singly or as an alloy mainly containing such a metal.

The method of metal plating with the metal is preferably wet plating and dry plating. The wet plating may be electroless plating, displacement plating, and electroplating, for example. Among them, the electroless plating is preferably employed because a nonconductor also can be plated. The dry plating may be vacuum deposition, plasma chemical vapor deposition (plasma CVD), photo-CVD, ion plating, and sputtering, for example, and the sputtering is preferably employed because excellent adhesion can be achieved even at a low temperature.

The metal plating may be a single metal coating or a plurality of coating layers of a plurality of metals. For metal plating, the outermost surface is preferably coated with a layer composed of gold, nickel, copper, or titanium. If the outermost surface is formed of the metal, a connection resistance value can be reduced, or the surface can be stabilized. For example, a preferred method for forming a gold layer includes forming a nickel layer through electroless nickel plating and then forming a gold layer through displacement gold plating.

The electrically conductive substance constituting the electrically conductive layer may be metal microparticles. In this case, a metal used as the metal microparticles is preferably platinum, gold, silver, copper, tin, nickel, titanium, cobalt, zinc, iron, chromium, aluminum, an alloy mainly containing such a metal, tin oxide, indium oxide, and indium tin oxide (ITO), for example. Among them, platinum, gold, silver, copper, tin, nickel, titanium, or an alloy mainly containing such a metal is particularly preferably used because such a metal has high electric conductivity and is stable. Here, the microparticles are particles having an average size smaller (typically, 0.1 time smaller) than the average size of the electrically conductive particles or fibers as the component (M) and that of the electrically conductive particles or fibers containing a thermoplastic resin nucleus or core coated with an electrically conductive substance as the component (N).

The method of coating a nucleus or a core with the metal microparticles is preferably mechanochemical bonding. The mechanochemical bonding is a method of applying mechanical energy to a plurality of different material particles to mechanochemically bond the particles at a molecular level and forming strong nano-bonds in the interface to generate composite microparticles. In the present invention, metal microparticles are bonded to a nucleus or core of an inorganic or organic material, and consequently the nucleus or core is coated with the metal microparticles.

When a core of an inorganic or organic material (including a thermoplastic resin) is coated with metal microparticles, the particle size of the metal microparticles is preferably 1/1000 to 1/10 of the average particle size of the core and more preferably 1/500 to 1/100. The production of metal microparticles having an excessively small particle size may be difficult, and conversely, metal microparticles having an excessively large particle size may cause uneven coating. When a core of an inorganic or organic material is coated with metal microparticles, the particle size of the metal microparticles is preferably 1/1000 to 1/10 of the average fiber size of the core and more preferably 1/500 to 1/100. The production of metal microparticles having an excessively small particle size may be difficult, and conversely, metal microparticles having an excessively large particle size may cause uneven coating.

In the component (M) as the electrically conductive particles or fibers coated with an electrically conductive substance and in the component (N) as the electrically conductive particles or fibers containing a thermoplastic resin nucleus or core coated with an electrically conductive substance, an adhesive layer is not necessarily present between the nucleus or core and the electrically conductive layer, but the adhesive layer may be present when the electrically conductive layer is readily separated from the nucleus or core. In this case, preferred examples of the main component of the adhesive layer include vinyl acetate resins, acrylic resins, vinyl acetate-acrylic resins, vinyl acetate-vinyl chloride resins, ethylene-vinyl acetate resins, ethylene-vinyl acetate resins, ethylene-acrylic resins, polyamide, polyvinyl acetal, polyvinyl alcohol, polyester, polyurethane, urea resins, melamine resins, phenol resins, resorcinol resins, epoxy resins, polyimide, natural rubbers, chloroprene rubbers, nitrile rubbers, urethane rubbers, SBR, regenerated rubbers, butyl rubbers, aqueous vinyl urethane, α-olefin, cyanoacrylate, modified acrylic resins, epoxy resins, epoxy-phenol, butyral-phenol, and nitrile-phenol. Among them, the vinyl acetate resin, the acrylic resin, the vinyl acetate-acrylic resin, the vinyl acetate-vinyl chloride resin, the ethylene-vinyl acetate resin, the ethylene-vinyl acetate resin, the ethylene-acrylic resin, and the epoxy resin are exemplified.

In the component (M) as the electrically conductive particles or fibers coated with an electrically conductive substance and in the component (N) as the electrically conductive particles or fibers containing a thermoplastic resin nucleus or core coated with an electrically conductive substance, the electrically conductive particles or fibers coated with an electrically conductive substance preferably have a volume ratio represented by [volume of nucleus or core]/[volume of electrically conductive layer] of 0.1 to 500, more preferably 1 to 300, and even more preferably 5 to 100. When having an volume ratio of less than 0.1, the electrically conductive particles or fibers yield a carbon fiber-reinforced composite material having an increased weight and moreover may not be uniformly dispersed during the preparation of a resin. When having an volume ratio of more than 500, the electrically conductive particles or fibers may yield a carbon fiber-reinforced composite material having insufficient electric conductivity.

The electrically conductive particles or fibers (the electrically conductive particles or fibers as the component (M) and the electrically conductive particles or fibers containing a thermoplastic resin nucleus or core coated with an electrically conductive substance as the component (N)) used in the carbon fiber forming raw material (Z) preferably has a specific gravity of at most 3.2. Electrically conductive particles or fibers having a specific gravity of more than 3.2 yield a carbon fiber-reinforced composite material having an increased weight and moreover may not be uniformly dispersed during the preparation of a resin. From the above viewpoint, the electrically conductive particles or fibers preferably have a specific gravity of 0.8 to 2.2. Electrically conductive particles or fibers having a specific gravity of less than 0.8 may not be uniformly dispersed during the preparation of a resin.

When particles are used as the component (M), the electrically conductive particles or fibers, and as the component (N), the electrically conductive particles or fibers containing a thermoplastic resin nucleus or core coated with an electrically conductive substance, the shape of the particles may be spherical, nonspherical, porous, acicular, whisker-like, or flaky. The spherical shape is specifically preferred for the reasons below. In other words, the shape does not deteriorate the flow characteristics of a thermosetting resin, and thus the resin has excellent impregnation properties into a carbon fiber. In addition, at the time of drop-weight impact (or local impact) on a carbon fiber-reinforced composite material, the shape further reduces delamination generated by the local impact, and thus the carbon fiber-reinforced composite material has a smaller delamination area that is generated by the local impact and is to be a starting point of the destroy by stress concentration when a stress is applied to the carbon fiber-reinforced composite material after the impact. Moreover, the shape increases the contact probability with carbon fibers in a lamination layer, and this readily forms conductive paths. As a result, a carbon fiber-reinforced composite material exhibiting high impact resistance and electric conductivity can be obtained.

When fibers are used as the component (M), the electrically conductive particles or fibers, and as the component (N), the electrically conductive particles or fibers containing a thermoplastic resin nucleus or core coated with an electrically conductive substance, the shape of the fiber may be either a short fiber or a long fiber.

For the short fiber, a method using short fibers in a similar manner to that for particles as disclosed in Japanese Patent Application Laid-open No. 2-69566 or a method using short fibers processed into a mat can be employed. For the long fiber, a method of arranging long fibers on the surface of a prepreg in parallel as disclosed in Japanese Patent Application Laid-open No. 4-292634 and a method of arranging long fibers in a random manner as disclosed in International Publication No. 94016003 can be employed. In addition, fibers may be processed into a woven fabric as disclosed in Japanese Patent Application Laid-open No. 2-32843, into a nonwoven fabric as disclosed in International Publication No. 94016003, or into a sheet-like base material such as a knit. Moreover, fibers may be processed into short fiber chips, chopped strands, or milled fibers, or short fibers may be processed into spun yarns, which may be arranged in parallel or in a random manner to prepare a woven fabric or a knit.

For the component (M) as the electrically conductive fibers coated with an electrically conductive substance and for the component (N) as the electrically conductive fibers containing a thermoplastic resin fiber core coated with an electrically conductive substance, the method of coating the material core with an electrically conductive substance includes a method of processing the core of electrically conductive fibers into the shape above and subsequently applying an electrically conductive substance and a method of coating the core of electrically conductive fibers with an electrically conductive substance and subsequently processing the coated core into the shape above. Each method is preferably employed for short fibers, long fibers, chopped strands, milled fibers, and the like. A woven fabric, a knit, and a nonwoven fabric preferably employ the method of coating the core of electrically conductive fibers with an electrically conductive substance and subsequently processing the coated core into the shape above. The method of processing the core of electrically conductive fibers into the shape above and subsequently applying an electrically conductive substance may cause uneven coating to deteriorate the electric conductivity of electrically conductive fibers used as the component (M) and the component (N) and thus is unfavorable.

In the carbon fiber forming raw material (Z), for an embodiment satisfying the requirement (1) (the thermoplastic resin particles or fibers as the component (L) and the electrically conductive particles or fibers as the component (M) are used in combination), the mass ratio represented by [amount (parts by mass) of thermoplastic resin particles or fibers as the component (L)]/[amount (parts by mass) of electrically conductive particles or fibers as the component (M)] is 1 to 1,000, preferably 10 to 500, and more preferably 10 to 100. This is because a carbon fiber forming raw material (Z) having a mass ratio of less than 1 yields a carbon fiber-reinforced composite material having insufficient impact resistance, and a carbon fiber forming raw material (Z) having a mass ratio of more than 1,000 yields a carbon fiber-reinforced composite material having insufficient electric conductivity.

In the carbon fiber forming raw material (Z), for an embodiment satisfying the requirement (1) (the thermoplastic resin particles or fibers as the component (L) and the electrically conductive particles or fibers as the component (M) are used in combination), the average size (average particle size or average fiber size) of the electrically conductive particles or fibers as the component (M) is preferably the same as or larger than the average size (average particle size or average fiber size) of the thermoplastic resin particles or fibers as the component (L), and the average size is preferably at most 150 μm. If the average size of the electrically conductive particles or fibers as the component (M) is smaller than the average size of the thermoplastic resin particles or fibers as the component (L), the electrically conductive particles or fibers as the component (M) are buried in the thermoplastic resin particles or fibers as the component (L) having insulating properties in a layer. The formation of conductive paths between carbon fibers in the layer and the electrically conductive particles or fibers as the component (M) is thus difficult, and this may result in insufficient electric conductivity improvement effect.

In the carbon fiber forming raw material (Z), the thermoplastic resin particles or fibers as the component (L), the electrically conductive particles or fibers as the component (M), and the electrically conductive particles or fibers containing a thermoplastic resin nucleus or core coated with an electrically conductive substance as the component (N) preferably have an average size of at most 150 μm. Particles or fibers having an average size of more than 150 μm may disturb the arrangement of reinforced fibers and may increase the length of an interlayer of a composite material to be obtained more than necessary when a particle layer is formed in the vicinity of the surface of a prepreg as described later. This may deteriorates physical properties of the composite material to be formed. The average size is preferably 1 to 150 μm, more preferably 3 to 60 μm, and particularly preferably 5 to 30 μm. When having an excessively small average size, the particles get among reinforced fibers and fail to be localized in an interlayer area of a prepreg laminate. Hence, the particles present may not sufficiently achieve the effect, and the impact resistance may be lowered.

Here, each determination method of an average size of particles and an average size of fibers will be described.

The average size (average particle size) of particles can be determined as follows: particles are micrographed at a magnification of 1,000 or more times under a microscope such as a scanning electron microscope; particles are selected at random; the diameter of a circumcircle of the particle is determined as the particle size; and the mean value of the particle sizes (n=50) is calculated as the average size. To determine the volume ratio of electrically conductive particles coated with an electrically conductive substance represented by [volume of core]/[volume of electrically conductive layer], first, the average particle size of cores of the electrically conductive particles is determined by the method above, or the average size (average particle size) of the electrically conductive particles is determined by the method above. Then, a cross section of the electrically conductive particles coated with an electrically conductive substance is micrographed at a magnification of 10,000 times under a scanning microscope, then the thicknesses of the electrically conductive layers (n=10) are determined, and the mean value is calculated. The measurement is carried out on the randomly selected electrically conductive particles (n=50). The sum of the average particle size of cores of electrically conductive particles and double the average thickness of electrically conductive layers is regarded as the average size (average particle size) of the electrically conductive particles. Alternatively, the value obtained by subtracting double the average thickness of electrically conductive layers from the average size (average particle size) of electrically conductive particles is regarded as the average size (average particle size) of the cores of the electrically conductive particles. Then, by using the average size (average particle size) of the cores of the electrically conductive particles and the average size (average particle size) of the electrically conductive particles, the volume ratio represented by [volume of core]/[volume of electrically conductive layer] can be calculated.

The average size (average fiber size) of fibers can be determined as follows: fiber cross sections are micrographed at a magnification of 1,000 times under a microscope such as a scanning electron microscope; fiber cross sections are selected at random; the diameter of a circumcircle of the fiber cross section is determined as a fiber size; and the mean value of the fiber sizes (n=50) is calculated as the average size. To determine the volume ratio of an electrically conductive fibers coated with an electrically conductive substance represented by [volume of core]/[volume of electrically conductive layer], first, the average fiber size of cores of the electrically conductive fibers is determined by the method above, or the average size (average fiber size) of electrically conductive fibers is determined by the method above. Then, a cross section of the electrically conductive fibers coated with an electrically conductive substance is micrographed at a magnification of 10,000 times under a scanning microscope, then the thicknesses of the electrically conductive layers (n=10) are determined, and the mean value is calculated. The measurement is carried out on the randomly selected electrically conductive fibers (n=50). The sum of the average size (average fiber size) of cores of electrically conductive fibers and double the average thickness of electrically conductive layers is regarded as the average size (average fiber size) of the electrically conductive fibers. Alternatively, the value obtained by subtracting double the average thickness of electrically conductive layers from the average size (average fiber size) of electrically conductive fibers is regarded as the average size (average fiber size) of the cores of the electrically conductive fibers. Then, by using the average size (average fiber size) of the cores of the electrically conductive fibers and the average size (average fiber size) of the electrically conductive fibers, the volume ratio represented by [volume of core]/[volume of electrically conductive layer] can be calculated.

In the prepreg as the carbon fiber forming raw material (Z), each of the component (L) as the thermoplastic resin particles or fibers, the component (M) as the electrically conductive particles or fibers, and the component (N) as the electrically conductive particles or fibers containing a thermoplastic resin nucleus or core coated with an electrically conductive substance is preferably localized in a surface portion of the prepreg. In other words, a layer rich in the particles or fibers of the component (L), the component (M), and the component (N), that is, a layer (hereinafter also called an interlayer forming layer) in which the localization of the particles or fibers of the component (L), the component (M), and the component (N) can be obviously identified when the cross section of the layer is observed is preferably formed in the surface portion of the prepreg. When the prepregs having such a structure are stacked and a matrix resin is cured to form a carbon fiber-reinforced composite material, an interlayer in which the particles or fibers of the component (L), the component (M), and the component (N) are localized is formed between carbon fiber layers. This can increase toughness of the carbon fiber interlayer, and the particles or fibers of the component (M) and the component (N) contained in the interlayer forming layer can form conductive paths in the carbon fiber interlayer. As a result, a carbon fiber-reinforced composite material to be obtained can exhibit high impact resistance and high electric conductivity.

The prepreg as the carbon fiber forming raw material (Z) means carbon fiber bundles arranged in a direction and impregnated with an uncured thermosetting resin and can include carbon fiber bundles in a shape such as a woven fabric, knit, braid, web, mat, and chopped shape. The prepreg can be prepared, for example, by a wet method of dissolving a thermosetting resin in a solvent such as methyl ethyl ketone and methanol to reduce the viscosity and impregnating carbon fiber bundles with the solution and a hot melting method (dry method) of heating a thermosetting resin to reduce the viscosity and impregnating carbon fiber bundles with the resin.

The wet method is a method of immersing carbon fibers in a solution of a matrix resin, then pulling up the carbon fibers, and evaporating the solvent with an oven or other units. The hot melting method is a method of directly impregnating reinforced fibers with a matrix resin having a viscosity lowered by heat or a method of once placing a coating film prepared from a thermosetting resin on a release paper or the like, next superimposing the film on each side or one side of carbon fibers, and applying heat and pressure to the film to impregnate the carbon fibers with the thermosetting resin. The hot melting method is preferred because substantially no solvent remains in the prepreg.

The method for forming a carbon fiber-reinforced composite material by using the carbon fiber forming raw material (Z) is exemplified by a method of stacking prepregs as the carbon fiber forming raw material (Z) and thermally curing a thermosetting resin while applying pressure to the laminate. Here, examples of the method of applying heat and pressure include press molding, autoclave molding, bagging molding, wrapping tape method, internal pressure molding, and vacuum molding.

The autoclave molding is a method of stacking prepregs on a tool plate having a particular shape, wrapping the laminate with a bagging film, and applying heat and pressure to the laminate while degassing the inside of the laminate. The autoclave molding can precisely control a fiber orientation, generates voids in small amounts, and thus can yield a high quality molded article having excellent mechanical characteristics.

The wrapping tape method is a method of winding a prepreg on a cored bar such as a mandrel to form a tubular carbon fiber-reinforced composite material. The wrapping tape method is a method suitable for producing a rod such as a golf shaft and a fishing rod. More specifically, a prepreg is wound on a mandrel, next a wrapping tape formed of a thermoplastic film is wound on the outside of the prepreg in order to fix the prepreg and to apply pressure, then the resin is thermally cured in an oven, and the cored bar is pulled out to yield a tubular product.

The internal pressure molding is a method of winding a prepreg on an internal pressure applying body such as a thermoplastic resin tube to form a preform, next setting the preform in a mold, then introducing a high pressure gas into the internal pressure applying body to apply pressure while heating the mold, and thus molding the preform. The method is preferably employed to form a product having a complicated shape, such as a golf shaft, a bat, and a racket for tennis, badminton, and the like.

The carbon fiber forming raw material (Z) may be a yarn prepreg that is a prepreg having a width of 1 to 50 mm. When having a width of less than 1 mm, the yarn prepreg complicates a molding operation and fails to yield a molded article having sufficient strength. When having a width of more than 50 mm, the yarn prepreg yields a poor-quality molded article having a large curvature. The yarn prepreg more preferable has a width of 2 to 25 mm.

The yarn prepreg as the carbon fiber forming raw material (Z) preferably has a width deviation of 0.3 mm or less in terms of standard deviation. When having a width standard deviation of more than 0.3 mm, the yarn prepreg not only has poor appearance but also deteriorates the quality and strength of a molded article to be obtained. The width precision is more preferably 0.1 mm or less.

The width and the standard deviation of the yarn prepreg as the carbon fiber forming raw material (Z) are a mean value and a standard deviation of widths determined, for example, under a reading microscope under conditions of a precision of 0.01 mm, an interval of 10 cm, and a sample number of 20. Alternatively, the width and the standard deviation may be a mean value and a standard deviation of widths determined with a one-dimensional length measuring machine by means of laser beams while a yarn prepreg is scanned at a precision of 0.01 mm and an interval of about 1 m. In this case, the number of samples is 100 or more.

The yarn prepreg as the carbon fiber forming raw material (Z) can be produced with the production apparatus illustrated in FIG. 1. FIG. 1 is a schematic view illustrating an example of an apparatus for producing a yarn prepreg.

In a production apparatus 100, continuous fiber bundles 2 of carbon fibers set on a creel 1 are pulled out and brought into contact with a lower part of a roller 3 with a groove. Next, the continuous fiber bundles are passed on a driving roller 8 and a free roller 8' and are introduced to and wound onto a winder 9. On winding, a guide for controlling width is preferably used, and a guide or a roller with a cooling mechanism is located at a position 11 and/or 11'. At an upper part circumscribed on the roller 3 with a groove, a melted resin feeder 5 having a blade at the leading end and including a resin reservoir 4 for storing a melted thermosetting resin is disposed. Above the melted resin feeder 5, a resin feeding unit 7 is disposed. The resin feeding unit 7 includes a heat roller 7A, a resin block 7B to feed a resin melted by heating with the heat roller 7A, and a parting plate 7C to press the melted resin onto the heat roller 7A. The resin feeding unit 7 feeds a melted resin to the resin reservoir 4 while the melted resin is measured with the parting plate 7C.

The roller 3 with a groove has a groove on the face in contact with the continuous fiber bundles 2. To the groove, a predetermined amount of a melted resin fed from the melted resin feeder 5 is continuously fed by means of the rotation of the roller 3 with a groove. The continuous fiber bundles 2 that are in contact with the groove and travel is impregnated with the melted resin, and consequently a yarn prepreg having a width of 1 to 50 mm of the present invention can be produced.

The prepreg as the carbon fiber forming raw material (Z) may be a slit tape prepreg that is prepared by impregnating carbon fiber bundles arranged in one direction with a resin composition and slitting the resulting bundles in the fiber direction. A slit tape can reduce defects of voids even in vacuum molding. Although the mechanism is unclear, the slit tape prepreg has higher width precision than that of a yarn prepreg and thus reduces overlapping of prepregs with each other or reduces gaps between prepregs as compared with yarn prepregs when the slit tape prepregs are stacked. This is supposed to reduce voids in a molded article.

In order to suppress the adhesion between prepregs and to improve the reelability from a bobbin, the slit tape is preferably attached with a cover film. The cover film may be slit after attached to a prepreg, or a prepreg may be silt and then attached with the cover film. The cover film can be made of polyethylene, polypropylene, polyester, and the like and preferably has a thickness of 10 to 80 microns. If the cover film has a width less than the width of a slit tape, the slit tapes are bonded to each other to deteriorate the reelability from a bobbin, and thus the cover film preferably has a width not less than the width of a slit tape.

The slit tape prepreg preferably has a width of 2 to 150 mm. When used to produce a member having a complicated shape by a fiber placement method or the like, the slit tape prepreg preferably has a smaller width of 2 to 5 mm.

A carbon fiber forming raw material (Y) that is a forming base material including sizing agent-coated carbon fibers coated with a sizing agent and has a woven fabric form or a braid form will next be described.

The forming base material as the carbon fiber forming raw material (Y) preferably has a woven fabric form or a braid form. In the carbon fiber forming raw material (Y), carbon fiber bundles coated with a sizing agent are used to prepare a forming base material having a woven fabric form or a braid form. The forming base materials having the shape are stacked in a mold. Into the mold, a thermosetting resin is injected and is cured to form a carbon fiber-reinforced composite material. Alternatively, the forming base material having a woven fabric form or a braid form is filmed with a thermosetting resin to prepare a formed material. The formed materials are stacked and subjected to bagging and autoclave molding to form a carbon fiber-reinforced composite material. Alternatively, the forming base material having a woven fabric form or a braid form is processed with a matrix resin that is a film-like thermoplastic resin or a thermoplastic resin drawn on a nonwoven fabric to prepare a formed material. The formed materials are stacked and pressed to form a carbon fiber-reinforced composite material.

Examples of the woven fabric made from the carbon fiber bundles as weaving threads include bidirectional fabrics including the carbon fiber bundles as both the warp and the weft, such as plain weave, twill weave, and sateen weave; unidirectional fabrics in which warp threads are held with thin weft threads; and multiaxial fabrics in which base materials as unidirectional fabrics are stacked. The braid including the carbon fiber bundles is a base material prepared by cylindrically braiding a plurality of carbon fiber bundles and is preferred because continuous carbon fiber bundles are used to form an integrated preform.

The plain weave has a large number of crossover points because a warp thread and a weft thread are interlaced while rising and falling alternately and thus has an advantageous effect of readily stabilizing the shape. Due to a large number of crossover points of the warp and the weft, even when various stresses such as impact force perpendicular to a face or compressive stress in a fiber axis direction are applied, two faces of the warp and the weft do not separate, and thus the plain weave can preferably exhibit high mechanical characteristics.

The unidirectional fabric and the multiaxial fabric can yield a carbon fiber-reinforced composite material having high mechanical characteristics and high deposition rate of carbon fibers and thus are preferred. Examples of the unidirectional fabric include woven fabrics (with a crimp structure) in which carbon fiber bundles as the warp are arranged in one direction in parallel with each other, and glass fibers or chemical fibers as the weft orthogonal to the carbon fiber bundles are interlaced with the warp to form a woven texture; and a woven fabric with what is called a non-crimp structure that includes warp threads of carbon fiber bundles, auxiliary warp threads of glass fibers or chemical fibers arranged in parallel with the warp threads, and weft threads of glass fibers or chemical fibers arranged orthogonal to the warp threads and the auxiliary warp threads and that is formed by interlacing the auxiliary warp threads and the weft threads so as to hold the carbon fiber bundles substantially without bending. In the crimp structure of the unidirectional fabric, the bend forms a flow path for a matrix resin, and this can improve the impregnation performance of the resin, but the bend may reduce the mechanical strength of the carbon fibers. The woven fabric with the non-crimp structure can advantageously maintain a high compressive strength and also improve the impregnation performance of a resin because the auxiliary threads form a flow path for the matrix resin.

In the carbon fiber forming raw material (Y), the sizing agent-coated carbon fibers as the forming base material formed into a woven fabric form or a braid form is combined with a thermosetting resin or a thermoplastic resin as a matrix resin to prepare a formed material.

In the carbon fiber forming raw material (Y), examples of the thermosetting resin used in the formed material include unsaturated polyester resins, vinyl ester resins, epoxy resins, phenol resins, melamine resins, urea resins, cyanate ester resins, and bismaleimide resins. Among them, the epoxy resin is preferably used because of the advantages of an excellent balance of mechanical characteristics and a small cure shrinkage. In order to improve the toughness and the like, the thermosetting resin may contain a thermoplastic resin described later or an oligomer thereof.

The thermoplastic resin used in the carbon fiber forming raw material (Y) is preferably at least one thermoplastic resin selected from crystalline resins including polyester resins such as polyethylene terephthalate (PET), polybutylene terephthalate (PBT), polytrimethylene terephthalate (PTT), polyethylene naphthalate (PEN), and liquid crystalline polyester; polyolefin resins such as polyethylene (PE), polypropylene (PP), polybutylene, acid-modified polyethylene (m-PE), acid-modified polypropylene (m-PP), and acid-modified polybutylene; polyarylene sulfide resins such as polyoxymethylene (POM), polyamide (PA), and polyphenylene sulfide (PPS); polyketone (PK), polyether ketone (PEK), polyether ether ketone (PEEK), polyether ketone ketone (PEKK), and polyether nitrile (PEN); fluorine resins such as polytetrafluoroethylene; and a liquid crystal polymer (LCP); amorphous resins including styrenic resins such as polystyrene (PS), acrylonitrile-styrene (AS), and acrylonitrile-butadiene-styrene (ABS), and polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone, and polyarylate (PAR); various thermoplastic elastomers including a phenolic resin, a phenoxy resin, a polystyrene elastomer, a polyolefin elastomer, a polyurethane elastomer, a polyester elastomer, a polyamide elastomer, a polybutadiene elastomer, a polyisoprene elastomer, a fluorine resin, and an acrylonitrile elastomer; and copolymers of them and modified products of them.

When the thermosetting resin is used as the matrix resin, the formed material can be produced by, for example, a wet method of dissolving the matrix resin in a solvent such as methyl ethyl ketone and methanol to reduce the viscosity and impregnating a forming base material and a hot melting method (dry method) of heating the matrix resin to reduce the viscosity and impregnating a forming base material with the resin.

The wet method is a method of immersing a forming base material having a woven fabric form or a braid form formed from carbon fiber bundles in a solution of a matrix resin, then pulling up the forming base material, and evaporating the solvent with an oven or other units. The hot melting method is a method of directly impregnating a forming base material with a matrix resin having a viscosity lowered by heat or a method of once placing a coating film prepared from a matrix resin on a release paper or the like, next superimposing the film on each side or one side of a forming base material, and applying heat and pressure to the film to impregnate the forming base material with the matrix resin. The hot melting method is preferred because substantially no solvent remains in the formed material.

A carbon fiber-reinforced composite material can be produced by a method of stacking the obtained formed materials and thermally curing the matrix resin while applying pressure to the laminate. Here, examples of the method of applying heat and pressure include press molding, autoclave molding, packing molding, wrapping tape method, internal pressure molding, and vacuum molding. The carbon fiber-reinforced composite material can be produced without passing through the formed material and can also be produced by a method of directly impregnating the forming base material with a matrix resin and then thermally curing the resin, for example, a molding method such as a hand lay-up method, a resin injection molding method, and a resin transfer molding method. In these methods, two liquids of a main agent and a curing agent for the matrix resin are preferably mixed immediately before use to prepare a resin.

In the carbon fiber forming raw material (Y), another preferred forming base material is prepared by processing carbon fiber bundles into a woven fabric or a braid and unevenly distributing a spacer resin different from the matrix resin on the surface of the forming base material with the shape. The spacer resin adheres in an amount ranging from 1 to 20 parts by mass and preferably ranging from 1 to 10 parts by mass relative to 100 parts by mass of the base material having a woven fabric form or a braid form. The spacer resin may adhere to the inside of the base material or may be unevenly distributed on and adhere to the surface.

In the present specification, "uneven distribution" means a state in which 70% by volume or more, preferably 80% by volume or more, and more preferably 90% by volume or more of a spacer resin used is present on a surface. A spacer resin adhering to a base material within the range can impart tacking properties (adhesive properties) between the base materials when the forming base materials are stacked to prepare a preform. In addition, such a spacer resin imparts appropriate firmness to a base material. Such a spacer resin also exhibits a shape stabilization effect on the base material, for example, an effect of suppressing weave displacement when the base material is a woven fabric or the like. As a result, a forming base material excellent in handling properties can be obtained.

In the carbon fiber-reinforced composite material obtained by stacking forming base materials including a spacer resin, the spacer resin works as a crack stopper and relaxes residual stress during molding, for example. This can suppress the damage to an interlayer of the forming base material especially when an impact is applied to the forming base material, and can exhibit an effect (effect of imparting high toughness) of capable of achieving excellent mechanical characteristics (especially, CAI, tensile strength, and compressive strength).

When a spacer resin is unevenly distributed on and adheres to the surface of a base material and the base materials are stacked, the spacer resin works as a spacer and provides an effect (spacer effect) of forming space between fabrics. The space forms a flow path for a matrix resin especially when the matrix resin is used and subjected to injection molding. This allows the base materials to be easily and quickly impregnated and improves the productivity of a composite material. In addition, the effect of imparting high toughness is concentrated in an interlayer of base materials of a composite material. This may exhibit an unexpected effect of further exhibiting the effect (interlayer reinforcement effect).

Preferably, the spacer resin is substantially, unevenly distributed on and adheres to the surface of a base material. In this case, for a single layer base material, the spacer resin may be unevenly distributed on and adheres to one side of the base material or may be unevenly distributed on and adheres to both sides of the base material. The former is preferred when the spacer resin adheres at a lower cost, and the latter is preferred when the front side and the back side of the base material are not intended to be used in different ways. For a multi-layered base material, the spacer resin may adheres to the surface layer alone, but the spacer resin is preferably adheres to the surface of each layer because higher effect can be exhibited. The spacer resin in a molten state is applied to a forming base material. Alternatively, the spacer resin is frozen and pulverized to prepare particles having an average particle size of about 1 to 500 μm, and the particles are naturally dropped to and uniformly dispersed on the surface of a base material while being weighed. After the dispersion, the spacer resin is pressurized while heated with a far-infrared heater or other units, and consequently a forming base material having a surface on which the spacer resin is unevenly distributed can be produced.

When the base material is an unidirectional fabric or a bidirectional fabric, the base material has a mass per unit area ranging from 50 to 500 g/m$^2$, preferably 100 to 350 g/m$^2$, and more preferably 150 to 250 g/m$^2$ from the viewpoint of impregnation of the base material with a matrix resin or mechanical characteristics. The base material preferably has a thickness ranging from 0.1 to 0.8 mm, more preferably 0.15 to 0.7 mm, and even more preferably 0.2 to 0.6 mm.

When the base material is a multiaxial fabric, the base material has a mass per unit area ranging from 150 to 1,500 g/m$^2$, preferably 300 to 1,000 g/m$^2$, and more preferably 400 to 800 g/m$^2$. The reason why the multiaxial fabric has a mass per unit area larger than that of the unidirectional fabric and the like is that a multiaxial fabric particularly having, for example, stitching threads in the thickness direction includes stable resin flow paths in the thickness direction and thus is more readily impregnated, and the meaning of multilayers is reduced when the multiaxial fabric has a small mass per unit area.

In order to minimize the falling of the spacer resin and to exhibiting the characteristics of carbon fibers themselves to the maximum extent when the spacer resin is applied to a base material, the base material preferably has a cover factor of 90% or more. The cover factor is more preferably 97% or more and even more preferably 99% or more. The cover factor is a percentage of an opening area where carbon fibers (in some cases, auxiliary threads, stitching threads, or knot threads) are absent (do not cover) in a unit area of 100 mm×100 mm of a base material when the planar base material is viewed from the perpendicular direction and is calculated in accordance with the equation: cover factor (%)=total area of opening (mm$^2$)/10,000. For the opening area, an image optically imported with a CCD camera, a scanner, or other units is subjected to image processing to calculate the total area.

The spacer resin preferably has a melting point or flow-starting temperature ranging from 50 to 150° C. from the viewpoint of the processing temperature for exhibiting tackiness when forming base materials are stacked. The melting point or flow-starting temperature is more preferably in a range from 70 to 140° C. and even more preferably from 90 to 120° C. Here, the melting point is the melting temperature of a resin determined with a differential scanning calorimeter (DSC). A resin showing the melting point with DSC is evaluated by the melting point as the standard. A resin showing no melting point is evaluated by a flow-starting temperature determined with a viscoelastic tester (Flow Tester CFT500D manufactured by Shimadzu, a rate of temperature rise of 1.5° C./min).

The spacer resin may be any resin that can improve handling properties of a forming base material and can improve mechanical characteristics of a carbon fiber-reinforced composite material produced from the forming base material, and may be appropriately selected from thermosetting resins and/or thermoplastic resins.

Examples of the thermosetting resin used as the spacer resin include epoxy resins, phenol resins, polybenzimidazole resins, benzoxazine resins, cyanate ester resins, unsaturated polyester resins, vinyl ester resins, urea resins, melamine resins, bismaleimide resins, polyimide resins, and polyamide imide resins, copolymers of them, modified products of them, resin mixtures of two or more of them, and resins further containing an elastomer, a rubber component, a curing agent, a curing accelerator, a catalyst, and other additives.

Examples of the thermoplastic resin used as the spacer resin include polyester resins, polyolefin resins, styrenic resins, polyoxymethylene resins, polyamide resins, polyurethane resins, polyurea resins, polydicyclopentadiene resins, polycarbonate resins, polymethylene methacrylate resins, polyvinyl chloride resins, polyphenylene sulfide resins, polyphenylene ether resins, polyether imide resins, polysulfone resins, polyarylate resins, polyether sulfone resins, polyketone resins, polyether ketone resins, polyether ether ketone resins, polyether ketone ketone resins, polyarylate resins, polyether nitrile resins, polyimide resins, polyamide imide resins, phenol resins, phenoxy resin, fluorine resins such as a polytetrafluoroethylene resin, elastomers (preferably, a butadiene-acrylonitrile elastomer, a carboxylic acid- or amine-modified product of the elastomer, a fluoroelastomer, and a polysiloxane elastomer), rubbers (for example, a butadiene rubber, a styrene-butadiene rubber, a styrene-butadiene-styrene rubber, a styrene-isoprene-styrene rubber, and a natural rubber), RIM resins (for example, a resin containing a catalyst and the like for forming polyamide 6, polyamide 12, polyurethane, polyurea, or polydicyclopentadiene), cyclic oligomers (an oligomer containing a catalyst and the like for forming a polycarbonate resin, a polybutylene terephthalate resin, or the like), copolymers of them, modified products of them, and resin mixtures of two or more of them.

A thermosetting resin used as the main component of the spacer resin is preferably at least one resin selected from an epoxy resin, an unsaturated polyester resin, and a phenol resin, and among them, the epoxy resin is particularly preferred. The epoxy resin has high adhesiveness and thus yields a base material having excellent handling properties. In addition, the epoxy resin can exhibit high mechanical characteristics when used as the matrix resin. An epoxy resin used as the main component of the spacer resin may contain or may not contain a curing agent, a curing catalyst, and other additives, but preferably contains no additives from the viewpoint of the life of the spacer resin. Even in the former case, an epoxy resin containing a curing agent or a curing catalyst with high latent properties would not cause a serious problem.

A thermoplastic resin used as the main component of the spacer resin is preferably at least one resin selected from a polyamide resin, a polysulfone resin, a polyether sulfone resin, a polyether imide resin, a polyphenylene ether resin, a polyimide resin, a polyamide imide resin, and a phenoxy resin. Among them, the polyamide resin, the polyether imide resin, the polyphenylene ether resin, the polyether sulfone resin, and the phenoxy resin are particularly preferred.

The thermoplastic resin is the main component of the spacer resin and is preferably contained in an amount ranging from 70 to 100% by mass. The amount is more preferably in a range from 75 to 97% by mass and even more preferably from 80 to 95% by mass. A thermoplastic resin contained in amount of less than 70% by mass is difficult to yield a composite material excellent in mechanical characteristics, which is an object of the present invention, and thus such an amount is unfavorable. Here, a spacer resin containing the thermoplastic resin as the main component may be poor in the adhesiveness to a fabric or in adhesion processability and thus preferably contains a small amount of a tackifier, a plasticizer, or the like.

The method for forming a carbon fiber-reinforced composite material from a forming base material having a surface on which the spacer resin is unevenly distributed is exemplified by various molding methods such as injection molding (for example, RTM, RFI, RIM, and vacuum molding), press molding, and molding methods in combination with them. A more preferred method is exemplified by injection molding with high productivity. Specifically preferred are RTM (for example, a molding method of injecting a pressurized resin into a cavity formed of a male die and a female die, preferably, injecting a resin into a decompressed cavity) and vacuum molding (for example, a molding method of decompressing a cavity formed of one of a male die and a female die and a bag material such as a film (for example, a nylon film or a silicon rubber) and injecting a resin due to a differential pressure from atmospheric pressure, preferably, disposing a resin dispersion medium (medium) on a preform in the cavity to accelerate resin impregnation and separating the medium from a composite material after molding) from the viewpoint of molding cost.

The resin used in the RTM molding may be any resin capable of reacting with the spacer resin, and an epoxy resin is most preferably used because the epoxy resin is relatively inexpensive, has high flexibility in a composition design, and can react with various functional groups.

The epoxy resin is a compound containing a plurality of epoxy groups in the molecule. Examples of the compound include bisphenol A diglycidyl ether, bisphenol F diglycidyl ether, tetrabromobisphenol A diglycidyl ether, bisphenol AD diglycidyl ether, 2,2',6,6'-tetramethyl-4,4'-biphenol diglycidyl ether, N,N,O-triglycidyl-m-aminophenol, N,N,O-triglycidyl-p-aminophenol, N,N,O-triglycidyl-4-amino-3-methylphenol, N,N-diglycidylaniline, N,N-diglycidyl-o-toluidine, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, 1,3-bis(diglycidylaminomethyl)cyclohexane, ethylene glycol diglycidyl ether, propylene glycol diglycidyl ether, hexamethylene glycol diglycidyl ether, neopentyl glycol diglycidyl ether, sorbitol polyglycidyl ether, glycerol polyglycidyl ether, diglycerol polyglycidyl ether, diglycidyl phthalate, diglycidyl terephthalate, vinylcyclohexene diepoxide, 3,4-epoxycyclohexylmethyl 3,4-epoxycyclohexane carboxylate, bis-3,4-epoxycyclohexylmethyl adipate, diglycidyl ether of 1,6-dihydroxynaphthalene, diglycidyl ether of 9,9-bis(4-hydroxyphenyl)fluorene, triglycidyl ether of tris(p-hydroxyphenyl)methane, tetraglycidyl ether of tetrakis(p-hydroxyphenyl)ethane, phenol novolac glycidyl ether, cresol novolac glycidyl ether, glycidyl ether of a condensate of phenol and dicyclopentadiene, glycidyl ether of a phenol aralkyl resin, triglycidyl isocyanurate, N-glycidylphthalimide, 5-ethyl-1,3-diglycidyl-5-methylhydantoin, 1,3-diglycidyl-5,5-dimethylhydantoin, and an oxazolidone epoxy resin obtained by addition of bisphenol A diglycidyl ether and tolylene isocyanate.

The epoxy resin is used in combination with a curing agent. Examples of the curing agent include curing agents undergoing stoichiometric reaction, such as aliphatic polyamine, aromatic polyamine, dicyandiamide, polycarboxylic acid, polycarboxylic acid hydrazide, an acid anhydride, polymercaptan, and polyphenol; and curing agents undergoing catalytic reaction, such as imidazole, a Lewis acid complex, and an onium salt.

When used, the curing agent undergoing stoichiometric reaction is required to contain a curing accelerator for catalyzing the reaction, such imidazole, a Lewis acid complex, an onium salt, and a phosphine. The curing agent for a liquid thermosetting resin used for RTM molding is preferably an aliphatic polyamine, an aromatic polyamine, an acid anhydride, and imidazole. In order to produce a structural material particularly having excellent heat resistance, an aromatic amine is most preferably used as the curing agent.

Examples of the application of the carbon fiber-reinforced composite material obtained by molding the carbon fiber forming raw material (Z) and the carbon fiber forming raw material (Y) include casings and internal members including trays and chassis of electric and electronic equipment such as personal computers, displays, office automation equipment, cell phones, personal digital assistants, facsimile machines, compact discs, portable MDs, portable radio cassette recorders, PDAs (personal digital assistants such as an electronic notebook), video cameras, digital still cameras, optical instruments, audio sets, air-conditioners, lighting apparatuses, amusement articles, toys, and other home electric appliances; mechanism elements; construction materials such as panels; parts, members, and outer panels relating to automobiles and motorcycles, such as motor parts, alternator terminals, alternator connectors, IC regulators, potentiometer bases for light dimmer, suspension parts, various valves such as an exhaust gas valve, fuel related parts, various pipes for exhaust or intake, air intake nozzle snorkels, intake manifolds, various arms, various frames, various hinges, various shaft bearings, fuel pumps, gasoline tanks, CNG tanks, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad abrasion sensors, thermostat bases for air conditioning, flow control valves of heating warm air, brush holders for radiator motor, water pump impellers, turbine vanes, wiper motor related parts, distributors, starter switches, starter relays, wire harnesses for transmission, window washer nozzles, air conditioner panel switch boards, coils for a fuel-related magnetic valve, connectors for fuses, battery trays, AT brackets, head lamp supports, pedal housings, steering wheels, door beams, protectors, chassis, frames, armrests, horn terminals, step motor rotors, lampholders, lamp reflectors, lamp housings, brake pistons, noise shields, radiator supports, spare tire covers, sheet shells, solenoid bobbins, engine oil filters, ignition cases, under covers, scuff plates, pillar trims, propeller shafts, wheels, fenders, fascias, bumpers, bumper beams, bonnets, aero parts, platforms, cowl louvers, roofs, instrument panels, spoilers, and various modules; parts, members, and outer panels relating to aircraft, such as landing gear pods, winglets, spoilers, edges, rudders, elevators, fairings, and ribs; and windmill blades. The carbon fiber-reinforced composite material is particularly preferably used for aircraft members, a windmill blade, an automotive outer panel, and a casing, a tray, and a chassis of electronic equipment.

EXAMPLES

The present invention will next be specifically described with reference to examples, but the present invention is not limited to these examples.

<Strand Tensile Strength and Elastic Modulus of Carbon Fiber Bundles>

The strand tensile strength and the strand elastic modulus of carbon fiber bundles were determined by the test method of resin-impregnated strand described in JIS-R-7608 (2004) in accordance with the procedure below. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the curing conditions were at normal pressure at a temperature of 125° C. for a period of 30 minutes. Ten strands of carbon fiber bundles were tested, and mean values were calculated as the strand tensile strength and the strand elastic modulus.

<Surface Oxygen Concentration (O/C) of Carbon Fibers>

The surface oxygen concentration (O/C) of carbon fibers was determined by X-ray photoelectron spectroscopy in accordance with the procedure below. First, a solvent was used to remove dust adhering to the surface of carbon fibers, then the carbon fibers were cut into about 20-mm pieces, and the pieces were spread on a copper sample holder. Next, the sample holder was set in a sample chamber, and the inside of the sample chamber was maintained at $1\times10^{-8}$ Torr. $AlK\alpha_{1,2}$ was used as an X-ray source, and the measurement was carried out at a photoelectron takeoff angle of 90°. As the correction value of the peak associated with electrification during measurement, the kinetic energy value (K.E.) of the main peak of $C_{1s}$ was set to 1,202 eV. The $C_{1s}$ peak area was determined by drawing a straight base line in a range from 1,191 to 1,205 eV as K.E. The $O_{1s}$ peak area was determined by drawing a straight base line in a range from 947 to 959 eV as K.E. The surface oxygen concentration was determined as an atom number ratio from the ratio of the $O_{1s}$ peak area and the $C_{1s}$ peak area using a sensitivity correction value inherent in the apparatus used. The X-ray photoelectron spectrometer used was ESCA-1600 manufactured by Ulvac-Phi, Inc., and the sensitivity correction value inherent in the apparatus was 2.33.

<Method of Determining Amount of Sizing Agent Coated>

About 2 g of sizing agent-coated carbon fiber bundles was weighed (W1) (to the fourth decimal place) and then was placed in an electric furnace (a volume of 120 $cm^3$) set at a temperature of 450° C. for 15 minutes in a nitrogen stream of 50 mL/min, and consequently the sizing agent was completely thermally decomposed. Next, the carbon fiber bundles were transferred to a container in a dry nitrogen stream of 20 liter/min, then cooled for 15 minutes, and weighed (W2) (to the fourth decimal place). The amount of the sizing agent coated was calculated in accordance with the equation: W1−W2. The amount of the sizing agent coated was converted into a value (round off the number to the second decimal place) relative to 100 parts by mass of the carbon fiber bundles in terms of parts by mass of the sizing agent coated. The measurement was carried out twice, and the mean value was regarded as the parts by mass of the sizing agent.

<Raw Materials Used to Produce Prepreg: Carbon Fiber Forming Raw Material (Z)>

Epoxy Resin and Curing Agent

N,N,N',N'-Tetraglycidyl-4,4'-diaminodiphenylmethane: "Araldite (registered trademark)" MY720 (manufactured by Huntsman Advanced Materials)

Bisphenol A epoxy resin: "jER (registered trademark)" 825, manufactured by Mitsubishi Chemical Corporation Bisphenol A epoxy resin: "jER (registered trademark)" 828, manufactured by Mitsubishi Chemical Corporation Bisphenol A epoxy resin: "jER (registered trademark)" 834, manufactured by Mitsubishi Chemical Corporation Bisphenol A epoxy resin: "jER (registered trademark)" 1007, manufactured by Mitsubishi Chemical Corporation Bisphenol A epoxy resin: "jER (registered trademark)" 1004, manufactured by Mitsubishi Chemical Corporation Bisphenol F epoxy resin: "jER (registered trademark)" 4004P, manufactured by Mitsubishi Chemical Corporation Bisphenol F epoxy resin: "EPOTOHTO (registered trademark)" YDF2001, manufactured by Tohto Kasei Co., Ltd.

Dicyclopentadiene epoxy resin: "EPICLON (registered trademark)" HP7200L, manufactured by Dainippon Ink and Chemicals, Inc.

Triglycidyl-p-amino-o-methylphenol: "SUMI-EPDXY (registered trademark)" ELM100, manufactured by Sumitomo Chemical Co., Ltd.

Triglycidyl-m-aminophenol: "SUMI-EPDXY (registered trademark)" ELM120, manufactured by Sumitomo Chemical Co., Ltd.

Polyvinyl formal: "Vinylec (registered trademark)" PVF-K, manufactured by) JNC 3,3'-Diaminodiphenylsulfone (3,3'-DDS): manufactured by Mitsui Fine Chemical Inc.

Dicyandiamide: DICY7, manufactured by Mitsubishi Chemical Corporation

Other Components

Polyether sulfone: PES5003P, manufactured by Sumitomo Chemical Co., Ltd.

M-B-M Copolymer: "Nanostrength (registered trademark)" M22N, a copolymer of butyl acrylate as B, methyl methacrylate as M, and a polar functional group-containing monomer, manufactured by Arkema Inc.

DCMU99: 3-(3,4-dichlorophenyl)-1,1-dimethylurea, manufactured by Hodogaya Chemical Co., Ltd.

Epoxy-Modified Polyamide Particles Obtained by the Production Method Below

Into a mixed solvent of 300 parts by mass of chloroform and 100 parts by mass of methanol, 96 parts by mass of polyamide (trade name "Grilamid (registered trademark)" TR55, manufactured by EMS-CHEMIE), 3 parts by mass of an epoxy resin (trade name "jER (registered trademark)" 828, manufactured by Mitsubishi Chemical Corporation), and 1 part by mass of a curing agent (trade name "Tohmide (registered trademark)" #296, manufactured by Fuji Kasei Kogyo Co., Ltd.) were added to give a homogeneous solution. Next, the obtained homogeneous solution was well stirred and sprayed with a spray gun to the liquid surface of 3,000 parts by mass of n-hexane to precipitate the solute. The precipitated solid was filtered off, then sufficiently washed with n-hexane, and subjected to vacuum drying at a temperature of 100° C. for 24 hours, thus yielding epoxy-modified polyamide spherical particles having an average particle size of 16 μm.

(Reference Example 1) Production Method of Prepreg A

An epoxy resin composition having a compounding ratio listed in Tables 1 to 4 was applied with a reverse roll coater onto a release paper to prepare a resin film.

Sizing agent-coated carbon fiber bundles were arranged in one direction. The resin films were superimposed on both sides of the bundles. Heat and pressure were applied to impregnate the bundles with the resin to produce a carbon fiber forming raw material (Z) as a unidirectional prepreg having a carbon fiber mass per unit area of 190 g/$m^2$ and a carbon fiber content of 65% by mass.

The unidirectional prepreg was cut and stacked into a predetermined structure. The stacked prepreg was thermally cured in an autoclave (molded at a rate of temperature rise of 1.5° C./min, a pressure of 0.59 MPa, and a temperature of 180° C. for 2 hours) to produce a laminated sheet.

(Reference Example 2) Production Method of Prepreg B

In the epoxy resin composition listed in Table 5, components except epoxy-modified polyamide particles were mixed to prepare a base resin composition, and the base resin composition was applied with a reverse roll coater onto a release paper to prepare a resin film (first resin film) having a mass per unit area of 31 g/$m^2$.

Sizing agent-coated carbon fiber bundles were arranged in one direction. The resin films were superimposed on both sides of the bundles. Heat and pressure were applied to impregnate the bundles with the resin to give a first prepreg having a carbon fiber mass per unit area of 190 g/$m^2$ Next, a thermosetting resin composition to which epoxy-modified polyamide particles were added so that the epoxy resin composition in the prepreg would have the formulation listed in Table 5 was applied with a reverse roll coater onto a release paper to prepare a resin film (second resin film) having a resin mass per unit area of 21 g/$m^2$. The second resin films were bonded onto both sides of the first prepreg to produce a carbon fiber forming raw material (Z) as a unidirectional prepreg having a carbon fiber mass per unit area of 190 g/$m^2$ and a carbon fiber content of 65% by mass.

The unidirectional prepreg was cut and stacked into a predetermined structure. The stacked prepreg was thermally cured in an autoclave (molded at a rate of temperature rise of 1.5° C./min, a pressure of 0.59 MPa, and a temperature of 180° C. for 2 hours) to produce a laminated sheet.

(Reference Example 3) Production Method of Prepreg C

An epoxy resin composition having the compounding ratio listed in Table 6 was applied with a reverse roll coater onto a release paper to prepare a resin film.

Sizing agent-coated carbon fiber bundles were arranged in one direction. The resin films were superimposed on both sides of the bundles. Heat and pressure were applied to impregnate the bundles with the resin to produce a carbon fiber forming raw material (Z) as a unidirectional prepreg having a carbon fiber mass per unit area of 125 g/$m^2$ and a carbon fiber content of 76% by mass.

The unidirectional prepreg was cut and stacked into a predetermined structure. The stacked prepreg was thermally cured in an autoclave (molded at a rate of temperature rise of 1.5° C./min, a pressure of 0.59 MPa, and a temperature of 135° C. for 2 hours) to produce a laminated sheet.

(Reference Example 4) Production Method of Prepreg D

An epoxy resin composition having the compounding ratio listed in Table 7 was applied with a reverse roll coater onto a release paper to prepare a resin film.

Sizing agent-coated carbon fiber bundles were arranged in one direction. The resin films were superimposed on both sides of the bundles. Heat and pressure were applied to impregnate the bundles with the resin to produce a carbon fiber forming raw material (Z) as a unidirectional prepreg having a carbon fiber mass per unit area of 125 g/$m^2$ and a carbon fiber content of 76% by mass.

The unidirectional prepreg was cut and stacked into a predetermined structure. The stacked prepreg was thermally cured in an autoclave (molded at a rate of temperature rise of 1.5° C./min, a pressure of 0.59 MPa, and a temperature of 135° C. for 2 hours) to produce a laminated sheet.

(Reference Example 5) Production Method of Prepreg E

An epoxy resin composition having the compounding ratio listed in Table 8 was applied with a reverse roll coater onto a release paper to prepare a resin film.

Sizing agent-coated carbon fiber bundles were arranged in one direction. The resin films were superimposed on both sides of the bundles. Heat and pressure were applied to impregnate the bundles with the resin to produce a carbon fiber, forming raw material (Z) as a unidirectional prepreg having a carbon fiber mass per unit area of 125 g/$m^2$ and a carbon fiber content of 76% by mass.

The unidirectional prepreg was cut and stacked into a predetermined structure. The stacked prepreg was thermally cured in an autoclave (molded at a rate of temperature rise of 1.5° C./min, a pressure of 0.59 MPa, and a temperature of 135° C. for 2 hours) to produce a laminated sheet.

A method of determining mechanical characteristics of the carbon fiber-reinforced composite material-laminated sheet obtained by molding the carbon fiber forming raw material (Z) will be described below.

<Measurement of 90° Flexural Strength>

As described above, prepregs were stacked in one direction, and heat and pressure were applied to the stacked prepreg to be cured, thus yielding a laminated sheet having a thickness of 1 mm.

The laminated sheet was disposed in a longitudinal direction of 90°, and a 90°-direction test piece having a width of 15±0.2 mm and a length of 60 mm±0.2 mm was prepared. The test piece was subjected to three-point bending test at a distance between supports of 40 mm in accordance with JIS-K-7017 (1999). A bend tester was used for the measurement at a crosshead speed of 1 mm/min. Five samples were subjected to the measurement, and the mean value was calculated. The measurement was carried out at room temperature under dry condition (25° C.±2° C. and a relative humidity of 50%).

<Measurement of Interlaminar Shear Strength>

As described above, prepregs were stacked in one direction, and heat and pressure were applied to the stacked prepreg to be cured, thus yielding a laminated sheet having a thickness of 2 mm.

The interlaminar shear strength was determined by three-point bending test in accordance with JIS-K-7078 (1991).

From the laminated sheet, a 0°-direction test piece having a length of 14±0.4 mm and a width of 10±0.2 mm was prepared. The measurement was carried out at a ratio of span (1) and test piece thickness (d) l/d=5±0.2 and a crosshead speed of a bend tester of 1 mm/min. Five samples were subjected to the measurement, and the mean value was calculated. The measurement was carried out at room temperature under dry condition (25° C.±2° C., a relative humidity of 50%).

<Measurement of Compressive Strength after Impact (CAI)>

As described above, twenty-four prepregs were stacked into a (+45°/0°/−45°/90°)3S structure, and heat and pressure were applied to the stacked prepreg to be cured, thus yielding a laminated sheet. The laminate was cut into a sample having a length of 150 mm and a width of 100 mm. To the center of the sample, a drop-weight impact of 6.67 J/mm was applied, and the compressive strength after impact was determined in accordance with JIS K 7089 (1996). The measurement was carried out at room temperature under dry condition (25° C.±2° C., a relative humidity of 50%).

(Reference Example 6) Production of Woven Fabric Using Sizing Agent-Coated Carbon Fibers (Carbon Fiber Forming Raw Material (Y))

Sizing agent-coated carbon fiber bundles (a density of 1.8 g/cm$^3$, 24,000 pieces) were used as the warp, glass fibers ECE225 1/0 1Z (manufactured by Nitto Boseki Co., Ltd.) were used as the weft, and a plain weave fabric in which the sizing agent-coated carbon fiber bundles were arranged substantially in one direction was produced. The warp density was 7.2 yarns/25 mm, and the weft density was 7.5 yarns/25 mm. The woven fabric had a carbon fiber mass per unit area of 190 g/m$^2$.

(Reference Example 7) Production of Liquid Thermosetting Resin

A main agent and a curing agent were separately prepared in accordance with the formulations below and were mixed immediately before use to give a liquid thermosetting resin composition.

(Main Agent Component)

"jER (registered trademark)" 630, manufactured by Mitsubishi Chemical Corporation: 10 parts by mass "jER (registered trademark)" 825, manufactured by Mitsubishi Chemical Corporation: 35 parts by mass "Araldite (registered trademark)" MY721 (manufactured by Huntsman Advanced Materials): 40 parts by mass GAN (an epoxy resin manufactured by Nippon Kayaku Co., Ltd.): 15 parts by mass (Curing Agent Component)

"Epicure (registered trademark)" W (an aromatic polyamine manufactured by Mitsubishi Chemical Corporation): 27 parts by mass 3,3'-DAS (an aromatic polyamine manufactured by Mitsui Chemicals, Inc.): 7 parts by mass 4,4'-DDS (an aromatic polyamine manufactured by Wakayama Seika): 4 parts by mass TBC (t-butylcatechol manufactured by Ube Industries, Ltd.): 1 part by mass (Reference Example 8) Production of Spacer Resin for Preform Resins and other components were mixed in accordance with the formulation below to give a slurry. The slurry was kneaded at 200° C. with a twin-screw extruder S-1KRC Kneader (manufactured by Kurimoto, Ltd.) and was cut to give pellets of a spacer resin for a preform of the present invention.

"SUMIKAEXCEL (registered trademark) (R)" PES5003P (powder obtained by freezing and pulverizing polyether sulfone manufactured by Sumitomo Chemical Co., Ltd.; an amorphous thermoplastic resin having a glass transition temperature of 230° C.): 60 parts by mass "EPICOAT (registered trademark)" 806 (an epoxy resin manufactured by Japan Epoxy Resin Co., Ltd.): 20 parts by mass NC-3000 (an epoxy resin manufactured by Nippon Kayaku Co., Ltd.): 10 parts by mass "EPICOAT (registered trademark)" 630 (an epoxy resin manufactured by Japan Epoxy Resin Co., Ltd.): 10 parts by mass The obtained spacer resin for a preform had a shear viscosity of 350 Pa·s and a glass transition temperature of 75° C.

Next, the pellets were frozen and pulverized in liquid nitrogen with a hammer mill (PULVERIZER, manufactured by Hosokawa Micron), and then were classified through a sieve having an opening size of 210 μm to give a particulate binder composition for a preform. The average particle size of the obtained particles was determined as about 100 μm.

(Reference Example 9) Production of Carbon Fiber Base Material

The particulate spacer resin obtained in Reference Example 8 was dispersed on one side of a woven fabric formed of the sizing agent-coated carbon fibers at a dispersion amount of 30 g/m$^2$, and then the woven fabric was heated with a far-infrared heater so that the surface temperature reached 160° C., thus yielding a carbon fiber base material bonded with the binder composition for a preform. The particle adhesion surface of the carbon fiber base material was rubbed with fingers, but the particles did not fall.

(Reference Example 10) Production of Preform as Carbon Fiber Forming Raw Material (Y)

The carbon fiber base material obtained in Reference Example 9 was cut out, and the cut out pieces were stacked into a structure [+45°/0°/−45°/90°] on the basis of the direction having a carbon fiber orientation angle of 0°. The stacking was repeated three times to give a laminate. The laminate was bagged, and the base materials were bonded to each other with a press heated at 80° C. at 0.1 MPa for 1 hour, thus yielding a preform.

(Reference Example 11) Production of Carbon Fiber-Reinforced Composite Material by Molding of Carbon Fiber Forming Raw Material (Y)

On a stainless steel sheet coated with a releasing agent ("DAIFREE (registered trademark)", manufactured by Daikin Industries, ltd.), the obtained preform was disposed, and on the preform, a peel ply (Peel Ply B-4444, manufactured by Richmond) and a resin diffusion medium (TSX-400P, manufactured by Japan Netron) were superimposed. The whole was bagged with a nylon film (Vac-Pak HS8171 6/66 SHEETING, AIR CRAFT PRODUCTS INC.). The inside of a mold was heated at 70° C. in a hot air oven. The inside of the preform was depressurized with a vacuum pump so as to have a vacuum pressure of −0.1 MPa or less and maintained for 60 minutes. The liquid thermosetting resin of Reference Example 7 maintained at 70° C. was then injected through the resin diffusion medium.

After completion of the injection, the temperature was raised to 130° C. at a rate of 1.5° C. per minute, and then the resin was cured at 130° C. for 2 hours. The carbon fiber-reinforced composite material sheet was then removed from the mold, taken out, and cured by heat in a hot air oven while the temperature was raised from 30° C. to 180° C. at a rate of 1.5° C. per minute and maintained at 180° C. for 2 hours.

The mechanical characteristics of the carbon fiber-reinforced composite material-laminated sheet obtained by molding the carbon fiber forming raw material (Y) were evaluated by the methods below.

<Volume Fraction Vf of Reinforced Fibers>

Sheet thicknesses of arbitrary three points on a carbon fiber-reinforced composite material sheet were measured down to 0.01 mm with a micrometer, and the mean value was calculated. The volume fraction was determined by the method below. The three points are 30-mm inward from the edge of a carbon fiber-reinforced composite material sheet and are sufficiently apart from each other.

$$Vf\,(\%)=[FAW\times PLY/(\rho\times t)]/10$$

FAW: areal weight of carbon fibers constituting carbon fiber-reinforced base material (g/m$^2$)

PLY: the number of layers of carbon fiber-reinforced base material laminated

ρ: density of carbon fibers (g/cm$^3$)

T: sheet thickness of carbon fiber-reinforced composite material after curing (cm)

<Measurement of Compressive Strength after Impact of Carbon Fiber-Reinforced Composite Material>

From a carbon fiber-reinforced composite material sheet, a rectangular test piece having a length of 152.4 mm and a width of 101.6 mm was cut out where the longitudinal direction was the direction having an orientation angle of 0° of the carbon fibers. To the center of the test piece, a drop-weight impact of 6.67 J per millimeter of test piece thickness was applied in accordance with JIS K 7089 (1996), and the compressive strength after impact was determined in accordance with JIS K 7089 (1996). The n-number was 5 on a level.

The materials and the components given below were used in each example and each comparative example described later.

Component (A1): A-1 to A-7

A-1: "jER (registered trademark)" 152 (manufactured by Mitsubishi Chemical Corporation)

Glycidyl ether of phenol novolac

Epoxy equivalent: 175 g/mol, the number of epoxy groups: 3

A-2: "EPICLON (registered trademark)" N660 (manufactured by DIC Corporation)

Glycidyl ether of cresol novolac

Epoxy equivalent: 206 g/mol, the number of epoxy groups: 3

A-3: "Araldite (registered trademark)" MY721 (manufactured by Huntsman Advanced Materials)

N,N,N',N'-Tetraglycidyl-4,4'-diaminodiphenylmethane

Epoxy equivalent: 113 g/mol, the number of epoxy groups: 4

A-4: "jER (registered trademark)" 828 (manufactured by Mitsubishi Chemical Corporation)

Diglycidyl ether of bisphenol A

Epoxy equivalent: 189 g/mol, the number of epoxy groups: 2

A-5: "jER (registered trademark)" 1001 (manufactured by Mitsubishi Chemical Corporation)

Diglycidyl ether of bisphenol A

Epoxy equivalent: 475 g/mol, the number of epoxy groups: 2

A-6: "Denacol (registered trademark)" EX-810 (manufactured by Nagase ChemteX Corporation)

Diglycidyl ether of ethylene glycol

Epoxy equivalent: 113 g/mol, the number of epoxy groups: 2

A-7: TETRAD-X (manufactured by Mitsubishi Gas Chemical Company)

Tetraglycidyl metaxylenediamine

Epoxy equivalent: 100 g/mol, the number of epoxy groups: 4

Corresponding to Both Component (A1) and Component (A2): A-8

A-8: "Denacol (registered trademark)" EX-611 (manufactured by Nagase ChemteX Corporation)

Sorbitol polyglycidyl ether

Epoxy equivalent: 167 g/mol, the number of epoxy groups: 4

The number of hydroxy groups: 2

Component (A2): A-9, A-10

A-9: "Denacol (registered trademark)" EX-731 (manufactured by Nagase ChemteX Corporation)

N-Glycidylphthalimide

Epoxy equivalent: 216 g/mol, the number of epoxy groups: 1

The number of imido groups: 1

A-10: "Adeka Resin (registered trademark)" EPU-6 (manufactured by ADEKA)

Urethane-modified epoxy

Epoxy equivalent: 250 g/mol, the number of epoxy groups: 1 or more

Urethane groups: 1 or more

Component (B1): B-1 to B-13, B-25 to B-27

B-1: "DBU (registered trademark)" (manufactured by San-Apro Ltd.)

1,8-Diazabicyclo[5,4,0]-7-undecene, molecular weight: 152, corresponding to Formula (III)

B-4: 1,8-bis(dimethylamino)naphthalene (manufactured by Aldrich)

Another name: proton sponge, molecular weight: 214.31, corresponding to Formula (IV)

B-5: 2,4,6-tris(dimethylaminomethyl)phenol (manufactured by Tokyo Chemical Industry Co., Ltd.)

Another name: DMP-30, molecular weight: 265.39, corresponding to Formula (V)

B-6: DBN (manufactured by San-Apro Ltd.), molecular weight: 124, corresponding to Formula (III)

1,5-Diazabicyclo[4,3,0]-5-nonene

B-7: imidazole compound 1-benzyl-imidazole (manufactured by Tokyo Chemical Industry Co., Ltd.), molecular weight: 158.2, corresponding to Formula (III)

B-8: U-CAT SA1 (manufactured by San-Apro Ltd.)

DBU-phenol salt, molecular weight: 246.11, corresponding to Formula (III)

B-9: U-CAT SA102 (manufactured by San-Apro Ltd.)

DBU-octanoate: molecular weight: 296.45, corresponding to Formula (III)

B-10: U-CAT SA506 (manufactured by San-Apro Ltd.)

DBU-p-toluenesulfonate, molecular weight: 324.44, corresponding to Formula (III)

B-11: N-ethylmorpholine (manufactured by Tokyo Chemical Industry Co., Ltd.), molecular weight: 115.17, corresponding to Formula (VII)

B-12: 2,6-lutidine (manufactured by Tokyo Chemical Industry Co., Ltd.), molecular weight: 107.15, corresponding to Formula (VI)

B-13: 4-pyridinemethanol (manufactured by Tokyo Chemical Industry Co., Ltd.), molecular weight: 109.13, corresponding to Formula (VI)

B-25: triisopropanolamine (manufactured by Tokyo Chemical Industry Co., Ltd.), molecular weight: 191.27, corresponding to Formula (VIII)

B-26: triethanolamine (manufactured by Tokyo Chemical Industry Co., Ltd.), molecular weight: 149.19, corresponding to Formula (VIII)

B-27: N,N-diisopropylethylamine (manufactured by Tokyo Chemical Industry Co., Ltd.), molecular weight: 129.24, corresponding to Formula (VIII)

Component (B2): B-14 to B-20

B-14: benzyltrimethylammonium bromide ($R_1$ has a carbon number of 7, each of $R_2$ to $R_4$ has a carbon number of 1, the anion site is a bromide anion, manufactured by Tokyo Chemical Industry Co., Ltd., corresponding to Formula (I))

B-15: tetrabutylammonium bromide (each of $R_1$ to $R_4$ has a carbon number of 4, the anion site is a bromide anion, manufactured by Tokyo Chemical Industry Co., Ltd., corresponding to Formula (I))

B-16: trimethyloctadecylammonium bromide ($R_1$ has a carbon number of 18, each of $R_2$ to $R_4$ has a carbon number of 1, the anion site is a bromide anion, manufactured by Tokyo Chemical Industry Co., Ltd., corresponding to Formula (I))

B-17: (2-methoxyethoxymethyl)triethylammonium chloride ($R_1$ has a carbon number of 4, each of $R_2$ to $R_4$ has a carbon number of 2, the anion site is a chloride anion, manufactured by Tokyo Chemical Industry Co., Ltd., corresponding to Formula (I))

B-18: (2-acetoxyethyl)trimethylammonium chloride ($R_1$ has a carbon number of 4, each of $R_2$ to $R_4$ has a carbon number of 1, the anion site is a chloride anion, manufactured by Tokyo Chemical Industry Co., Ltd., corresponding to Formula (I))

B-19: (2-hydroxyethyl)trimethylammonium bromide ($R_1$ has a carbon number of 2, each of $R_2$ to $R_4$ has a carbon number of 1, the anion site is a bromide anion, manufactured by Tokyo Chemical Industry Co., Ltd., corresponding to Formula (I))

B-20:1-hexadecylpyridinium chloride ($R_5$ has a carbon number of 16, each of $R_6$ and $R_7$ is a hydrogen atom, the anion site is a chloride anion, manufactured by Tokyo Chemical Industry Co., Ltd., corresponding to Formula (II))

Component (B3): B-21 to B-24

B-21: tetrabutylphosphonium bromide (each of $R_{34}$ to $R_{37}$ has a carbon number of 4, the anion site is a bromide anion, manufactured by Tokyo Chemical Industry Co., Ltd.), molecular weight: 339, corresponding to Formula (XI)

B-22: tetraphenylphosphonium bromide (each of $R_{34}$ to $R_{37}$ has a carbon number of 6, the anion site is a bromide anion, manufactured by Tokyo Chemical Industry Co., Ltd.), molecular weight: 419, corresponding to Formula (XI)

B-23: tributylphosphine (each of $R_{38}$ to $R_{40}$ has a carbon number of 4, manufactured by Tokyo Chemical Industry Co., Ltd.), molecular weight: 202, corresponding to Formula (XII)

B-24: triphenylphosphine (each of $R_{38}$ to $R_{40}$ has a carbon number of 6, manufactured by Tokyo Chemical Industry Co., Ltd.), molecular weight: 262, corresponding to Formula (XII)

Component (C) (Other Components): C-1 to C-2

C-1: "Denacol (registered trademark)" EX-141 (manufactured by Nagase ChemteX Corporation, phenyl glycidyl ether, epoxy equivalent: 151 g/mol, the number of epoxy groups: 1

C-2: hexamethylenediamine (manufactured by Tokyo Chemical Industry Co., Ltd.), molecular weight: 116

Example 1

Example includes Process I to Process III.

Process I: Process for Producing Carbon Fibers as Raw Material

A copolymer containing 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 6.2 GPa, and a strand tensile elastic modulus of 300 GPa. Next, the carbon fibers were subjected to electrolytic surface treatment using an aqueous ammonium hydrogen carbonate solution having a concentration of 0.1 mol/l as an electrolytic solution at a quantity of electricity of 100 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.20. The obtained carbon fibers were regarded as carbon fibers A.

Process II: Process for Bonding Sizing Agent to Carbon Fibers

The component (A-1) and the component (B-1) were mixed at a mass ratio of 100:1, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 90 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained from the carbon fiber forming raw material (Z) of the present invention were evaluated. The result indicated a high 90° flexural strength and a high compressive strength after impact (CAI). This reveals good adhesion between the carbon fibers and the matrix resin. Table 1 lists the results.

Examples 2 to 5

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fiber bundles were obtained in the same manner as in Example 1 except that the mass ratio of (A-1) and (B-1) was changed within a range of 100:3 to 100:20 as listed in Table 1. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a high 90° flexural strength and a high compressive strength after impact (CAI). This reveals good adhesion between the carbon fibers and the matrix resin.

Comparative Example 1

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used in Process II in Example 1. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 1 lists the results.

Comparative Example 2

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the mass ratio of (A-1) and (B-1) was changed to 100:30 in Process II in Example 1. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 1 lists the results.

TABLE 1

| | | | | Example | | | | | Comparative Example | |
|---|---|---|---|---|---|---|---|---|---|---|
| | | | | 1 | 2 | 3 | 4 | 5 | 1 | 2 |
| Carbon fibers | | | | A | A | A | A | A | A | A |
| Sizing agent | Component (A), parts by mass | A-1 | jER152 | 100 | 100 | 100 | 100 | 100 | 100 | 100 |
| | | A-2 | N660 | | | | | | | |
| | | A-3 | MY721 | | | | | | | |
| | Component (B), parts by mass | B-1 | DBU | 1 | 3 | 6 | 15 | 20 | | 30 |
| | | B-2 | Tributylamine | | | | | | | |
| | | B-3 | N,N-dimethyl-benzylamine | | | | | | | |
| Matrix resin | Epoxy resin | MY720 | | 50 | 50 | 50 | 50 | 50 | 50 | 50 |
| | | jER825 | | 50 | 50 | 50 | 50 | 50 | 50 | 50 |
| | Curing agent | 3,3'-DDS | | 40 | 40 | 40 | 40 | 40 | 40 | 40 |
| | Others | PES5003P | | 10 | 10 | 10 | 10 | 10 | 10 | 10 |
| | | Epoxy-modified polyamide particles | | — | — | — | — | — | — | — |
| Mechanical characteristics of laminated sheet | | 90° Flexural strength (MPa) | | 155 | 160 | 159 | 158 | 155 | 113 | 110 |
| | | Compressive strength after impact (CAI) (MPa) | | 204 | 218 | 211 | 197 | 190 | 141 | 148 |

Example 6 to Example 15

Process I: Process for Producing Carbon Fibers as Raw Material

Carbon fibers were produced in the same manner as in Example 1.

Process II: Process for Bonding Sizing Agent to Carbon Fibers (A-1) to (A-10) as the component (A) and (B-10) as the component (B) were mixed at a mass ratio of 100:3 as listed in Table 2, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained from the carbon fiber forming raw material (Z) of the present invention were evaluated. The result indicated a high 90° flexural strength and a high compressive strength after impact (CAI). This reveals good adhesion between the carbon fibers and the matrix resin. Table 2 lists the results.

Comparative Example 3 to Comparative Example 7

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the sizing agent components were changed as listed in Table 2. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 2 lists the results.

TABLE 2

| | | | | Example | | | | | | | | | | Comparative Example | | | | |
|---|---|---|---|---|---|---|---|---|---|---|---|---|---|---|---|---|---|---|
| | | | | 6 | 7 | 8 | 9 | 10 | 11 | 12 | 13 | 14 | 15 | 3 | 4 | 5 | 6 | 7 |
| Carbon fibers | | | | A | A | A | A | A | A | A | A | A | A | A | A | A | A | A |
| Sizing agent | Component (A), parts by mass | A-1 | jER152 | 100 | | | | | | | | | | | | | | 100 |
| | | A-2 | N660 | | 100 | | | | | | | | | | | | | |
| | | A-3 | MY721 | | | 100 | | | | | | | | | | | | |
| | | A-4 | jER828 | | | | 100 | | | | | | | 100 | | | | |
| | | A-5 | jER1001 | | | | | 100 | | | | | | | | | | |
| | | A-6 | EX-810 | | | | | | 100 | | | | | | | | | |
| | | A-7 | TETRAD-X | | | | | | | 100 | | | | | 100 | | | |
| | | A-8 | EX-611 | | | | | | | | 100 | | | | | | | |
| | | A-9 | EX-731 | | | | | | | | | 100 | | | | | | |
| | | A-10 | EPU-6 | | | | | | | | | | 100 | | | | | |
| | Component (B,) parts by mass | B-8 | DBU phenol salt | | | | | | | | | | | | | | | |
| | | B-9 | DBU octanoate | | | | | | | | | | | | | | | |
| | | B-10 | DBU p-toluene-sulfonate | 3 | 3 | 3 | 3 | 3 | 3 | 3 | 3 | 3 | 3 | | | 3 | | |
| | Component (C), parts by mass | C-1 | EX-141 | | | | | | | | | | | | | 100 | 100 | |
| | | C-2 | Hexa-methylene-diamine | | | | | | | | | | | | | | | 3 |
| Matrix resin | Epoxy resin | MY720 | | 50 | 50 | 50 | 50 | 50 | 50 | 50 | 50 | 50 | 50 | 50 | 50 | 50 | 50 | 50 |
| | | jER825 | | 50 | 50 | 50 | 50 | 50 | 50 | 50 | 50 | 50 | 50 | 50 | 50 | 50 | 50 | 50 |
| | Curing agent | 3,3'-DDS | | 40 | 40 | 40 | 40 | 40 | 40 | 40 | 40 | 40 | 40 | 40 | 40 | 40 | 40 | 40 |
| | Others | PES5003P | | 10 | 10 | 10 | 10 | 10 | 10 | 10 | 10 | 10 | 10 | 10 | 10 | 10 | 10 | 10 |
| | | Epoxy-modified polyamide particles | | — | — | — | — | — | — | — | — | — | — | — | — | — | — | — |

TABLE 2-continued

| | | Example | | | | | | | | Comparative Example | | | | | | |
|---|---|---|---|---|---|---|---|---|---|---|---|---|---|---|---|---|
| | | 6 | 7 | 8 | 9 | 10 | 11 | 12 | 13 | 14 | 15 | 3 | 4 | 5 | 6 | 7 |
| Mechanical characteristics of laminated sheet | 90° Flexural strength (MPa) | 159 | 150 | 155 | 140 | 135 | 132 | 151 | 145 | 130 | 131 | 108 | 115 | 111 | 109 | 110 |
| | Compressive strength after impact (CAI) (MPa) | 211 | 204 | 197 | 182 | 176 | 169 | 197 | 190 | 176 | 170 | 148 | 155 | 141 | 134 | 148 |

(Example 16), (Example 19) to (Example 41)

Process I: Process for Producing Carbon Fibers as Raw Material

Carbon fibers were produced in the same manner as in Example 1.

Process II: Process for Bonding Sizing Agent to Carbon Fibers (A-2) as the component (A) and (B-1), (B-4) to (B-9) and (B-11) to (B-27) as the component (B) were mixed at a mass ratio of 100:3 as listed in Table 3-1 and Table 3-2, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained from the carbon fiber forming raw material (Z) of the present invention were evaluated. The result indicated a high 90° flexural strength and a high compressive strength after impact (CAI). This reveals good adhesion between the carbon fibers and the matrix resin. Table 3-1 and Table 3-2 list the results.

Comparative Example 8

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-2) alone was used as listed in Table 3-2. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 3-2 lists the results.

TABLE 3-1

| | | | | Example | | | | | | | | | | |
|---|---|---|---|---|---|---|---|---|---|---|---|---|---|---|
| | | | | 16 | 19 | 20 | 21 | 22 | 23 | 24 | 25 | 26 | 27 | 28 |
| Carbon fibers | | | | A | A | A | A | A | A | A | A | A | A | A |
| Sizing agent | Component (A), parts by mass | A-1 | jER152 | | | | | | | | | | | |
| | | A-2 | N660 | 100 | 100 | 100 | 100 | 100 | 100 | 100 | 100 | 100 | 100 | 100 |
| | | A-3 | MY721 | | | | | | | | | | | |
| | Component (B), parts by mass | B-1 | DBU | 3 | | | | | | | | | | |
| | | B-2 | Tributylamine | | | | | | | | | | | |
| | | B-3 | N,N-dimethylbenzyl-amine | | | | | | | | | | | |
| | | B-4 | Proton sponge | | 3 | | | | | | | | | |
| | | B-5 | DMP-30 | | | 3 | | | | | | | | |
| | | B-6 | DBN | | | | 3 | | | | | | | |
| | | B-7 | 1-Benzyl-imidazole | | | | | 3 | | | | | | |
| | | B-8 | DBU phenol salt | | | | | | 3 | | | | | |
| | | B-9 | DBU octanoate | | | | | | | 3 | | | | |
| | | B-10 | DBU p-toluenesulfonate | | | | | | | | | | | |
| | | B-11 | N-Ethylmorpholine | | | | | | | | 3 | | | |
| | | B-12 | 2,6-Lutidine | | | | | | | | | 3 | | |

TABLE 3-1-continued

| | | | | Example 16 | 19 | 20 | 21 | 22 | 23 | 24 | 25 | 26 | 27 | 28 |
|---|---|---|---|---|---|---|---|---|---|---|---|---|---|---|
| | | B-13 | 4-Pyridinemethanol | | | | | | | | | | 3 | |
| | | B-14 | Benzyltrimethyl-ammonium bromide | | | | | | | | | | | 3 |
| Matrix resin | Epoxy resin | MY720 | | 50 | 50 | 50 | 50 | 50 | 50 | 50 | 50 | 50 | 50 | 50 |
| | | jER825 | | 50 | 50 | 50 | 50 | 50 | 50 | 50 | 50 | 50 | 50 | 50 |
| | Curing agent | 3,3'-DDS | | 40 | 40 | 40 | 40 | 40 | 40 | 40 | 40 | 40 | 40 | 40 |
| | Others | PES5003P | | 10 | 10 | 10 | 10 | 10 | 10 | 10 | 10 | 10 | 10 | 10 |
| | | Epoxy-modified polyamide particles | | — | — | — | — | — | — | — | — | — | — | — |
| Mechanical characteristics of laminated sheet | | 90° Flexural strength (MPa) | | 155 | 148 | 151 | 152 | 131 | 150 | 149 | 138 | 137 | 131 | 145 |
| | | Compressive strength after impact (CAI) (MPa) | | 207 | 200 | 203 | 204 | 167 | 204 | 207 | 180 | 182 | 186 | 203 |

TABLE 3-2

| | | | | Example 29 | 30 | 31 | 32 | 33 | 34 | 35 | 36 |
|---|---|---|---|---|---|---|---|---|---|---|---|
| Carbon fibers | | | | A | A | A | A | A | A | A | A |
| Sizing agent | Component (A), parts by mass | A-1 | jER152 | | | | | | | | |
| | | A-2 | N660 | 100 | 100 | 100 | 100 | 100 | 100 | 100 | 100 |
| | | A-3 | MY721 | | | | | | | | |
| | Component (B), parts by mass | B-15 | Tetrabutylammonium bromide | 3 | | | | | | | |
| | | B-16 | Trimethyloctadecylammonium bromide | | 3 | | | | | | |
| | | B-17 | (2-Methoxyethoxymethyl)triethylammonium chloride | | | 3 | | | | | |
| | | B-18 | (2-Acetoxyethyl)trimethylammonium chloride | | | | 3 | | | | |
| | | B-19 | (2-Hydroxyethyl)trimethylammonium bromide | | | | | 3 | | | |
| | | B-20 | 1-Hexadecylpyridinium chloride | | | | | | 3 | | |
| | | B-21 | Tetrabutylphosphonium bromide | | | | | | | 3 | |
| | | B-22 | Tetraphenylphosphonium bromide | | | | | | | | 3 |
| | | B-23 | Tributylphosphine | | | | | | | | |
| | | B-24 | Triphenylphosphine | | | | | | | | |
| | | B-25 | Triisopropanolamine | | | | | | | | |
| | | B-26 | Triethanolamine | | | | | | | | |
| | | B-27 | N,N-Diisopropylethylamine | | | | | | | | |
| Matrix resin | Epoxy resin | MY720 | | 50 | 50 | 50 | 50 | 50 | 50 | 50 | 50 |
| | | jER825 | | 50 | 50 | 50 | 50 | 50 | 50 | 50 | 50 |
| | Curing agent | 3,3'-DDS | | 40 | 40 | 40 | 40 | 40 | 40 | 40 | 40 |
| | Others | PES5003P | | 10 | 10 | 10 | 10 | 10 | 10 | 10 | 10 |
| | | Epoxy-modified polyamide particles | | — | — | — | — | — | — | — | — |
| Mechanical characteristics of laminated sheet | | 90° Flexural strength (MPa) | | 150 | 133 | 148 | 139 | 138 | 145 | 148 | 132 |
| | | Compressive strength after impact (CAI) (MPa) | | 204 | 187 | 204 | 193 | 190 | 197 | 207 | 186 |

| | | | | Example 37 | 38 | 39 | 40 | 41 | Comparative Example 8 |
|---|---|---|---|---|---|---|---|---|---|
| Carbon fibers | | | | A | A | A | A | A | A |
| Sizing agent | Component (A), parts by mass | A-1 | jER152 | | | | | | |
| | | A-2 | N660 | 100 | 100 | 100 | 100 | 100 | 100 |
| | | A-3 | MY721 | | | | | | |
| | Component (B), parts by mass | B-15 | Tetrabutylammonium bromide | | | | | | |
| | | B-16 | Trimethyloctadecylammonium bromide | | | | | | |
| | | B-17 | (2-Methoxyethoxymethyl)triethylammonium chloride | | | | | | |
| | | B-18 | (2-Acetoxyethyl)trimethylammonium chloride | | | | | | |

TABLE 3-2-continued

| | | | | | | | | | |
|---|---|---|---|---|---|---|---|---|---|
| | | B-19 | (2-Hydroxyethyl)trimethylammonium bromide | | | | | | |
| | | B-20 | 1-Hexadecylpyridinium chloride | | | | | | |
| | | B-21 | Tetrabutylphosphonium bromide | | | | | | |
| | | B-22 | Tetraphenylphosphonium bromide | | | | | | |
| | | B-23 | Tributylphosphine | 3 | | | | | |
| | | B-24 | Triphenylphosphine | | 3 | | | | |
| | | B-25 | Triisopropanolamine | | | 3 | | | |
| | | B-26 | Triethanolamine | | | | 3 | | |
| | | B-27 | N,N-Diisopropylethylamine | | | | | 3 | |
| Matrix resin | Epoxy resin | MY720 | | 50 | 50 | 50 | 50 | 50 | 50 |
| | | jER825 | | 50 | 50 | 50 | 50 | 50 | 50 |
| | Curing agent | 3,3'-DDS | | 40 | 40 | 40 | 40 | 40 | 40 |
| | Others | PES5003P | | 10 | 10 | 10 | 10 | 10 | 10 |
| | | Epoxy-modified polyamide particles | | — | — | — | — | — | — |
| Mechanical characteristics of laminated sheet | | 90° Flexural strength (MPa) | | 130 | 132 | 159 | 147 | 145 | 108 |
| | | Compressive strength after impact (CAI) (MPa) | | 183 | 176 | 218 | 183 | 186 | 134 |

Example 42 to Example 44

Process I: Process for Producing Carbon Fibers as Raw Material

Carbon fibers were produced in the same manner as in Example 1.

Process II: Process for Bonding Sizing Agent to Carbon Fibers (A-1) as the component (A) and (B-1), (B-17), and (B-22) as the component (B) were mixed at a mass ratio of 100:3 as listed in Table 4, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained from the carbon fiber forming raw material (Z) of the present invention were evaluated. The result indicated a high 90° flexural strength and a high compressive strength after impact (CAI). This reveals good adhesion between the carbon fibers and the matrix resin. Table 4 lists the results.

Example 45 to Example 47

Process I: Process for Producing Carbon Fibers as Raw Material

Carbon fibers were produced in the same manner as in Example 1 except that an aqueous sulfuric acid solution having a concentration of 0.05 mol/l was used as the electrolytic solution, and the electrolytic surface treatment was carried out at a quantity of electricity of 20 coulomb per gram of carbon fibers. At this time, the surface oxygen concentration O/C was 0.20. The obtained carbon fibers were regarded as carbon fibers B.

Process II: Process for Bonding Sizing Agent to Carbon Fibers (A-1) as the component (A) and (B-1), (B-17), and (B-22) as the component (B) were mixed at a mass ratio of 100:3 as listed in Table 4, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a high 90° flexural strength and a high compressive strength after impact (CAI). This reveals good adhesion between the carbon fibers and the matrix resin. Table 4 lists the results.

Example 48 to Example 50

Process I: Process for Producing Carbon Fibers as Raw Material

The carbon fibers B obtained in Example 45 were immersed in an aqueous tetraethylammonium hydroxide solution (pH=14) and were pulled up while being vibrated by ultrasonic waves. At this time, the surface oxygen concentration O/C was 0.17. The obtained carbon fibers were regarded as carbon fibers C.

Process II: Process for Bonding Sizing Agent to Carbon Fibers (A-1) as the component (A) and (B-1), (B-17), and (B-22) as the component (B) were mixed at a mass ratio of 100:3 as listed in Table 4, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a high 90° flexural strength and a high compressive strength after impact (CAI). This reveals good adhesion between the carbon fibers and the matrix resin. Table 4 lists the results.

As described above, it is revealed that mechanical characteristics when the carbon fibers A are used are excellent as compared with those when the carbon fibers B are used. It is also revealed that by using the carbon fibers C obtained by immersing the carbon fibers B in an aqueous tetraethylammonium hydroxide solution (pH=14) and pulling up the carbon fibers while the carbon fibers are vibrated by ultrasonic waves, mechanical characteristics equivalent to those of the carbon fibers A can be achieved.

Comparative Example 9

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 45 except that (A-1) alone was used as listed in Table 4. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 4 lists the results.

Comparative Example 10

Process I: Process for Producing Carbon Fibers as Raw Material

Carbon fibers were produced in the same manner as in Example 48.

Process II: Process for Bonding Sizing Agent to Carbon Fibers

Sizing agent-coated carbon fibers were obtained in the same manner as in Example 48 except that (A-1) alone was used as listed in Table 4. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 1. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 4 lists the results.

TABLE 4

| | | | | Example | | | | | | | | | Comparative Example | |
|---|---|---|---|---|---|---|---|---|---|---|---|---|---|---|
| | | | | 42 | 43 | 44 | 45 | 46 | 47 | 48 | 49 | 50 | 9 | 10 |
| Carbon fibers | | | | A | A | A | B | B | B | C | C | C | B | C |
| Sizing agent | Component (A), parts by mass | A-1 | jER152 | 100 | 100 | 100 | 100 | 100 | 100 | 100 | 100 | 100 | 100 | 100 |
| | | A-2 | N660 | | | | | | | | | | | |
| | | A-3 | MY721 | | | | | | | | | | | |
| | Component (B), parts by mass | B-1 | DBU | 3 | | | 3 | | | 3 | | | | |
| | | B-17 | (2-Methoxyethoxymethyl)triethylammonium chloride | | 3 | | | 3 | | | 3 | | | |
| | | B-22 | Tetraphenylphosphonium bromide | | | 3 | | | 3 | | | 3 | | |
| Matrix resin | Epoxy resin | MY720 | | 50 | 50 | 50 | 50 | 50 | 50 | 50 | 50 | 50 | 50 | 50 |
| | | jER825 | | 50 | 50 | 50 | 50 | 50 | 50 | 50 | 50 | 50 | 50 | 50 |

TABLE 4-continued

| | | Example 42 | 43 | 44 | 45 | 46 | 47 | 48 | 49 | 50 | Comparative Example 9 | 10 |
|---|---|---|---|---|---|---|---|---|---|---|---|---|
| Curing agent | 3,3'-DDS | 40 | 40 | 40 | 40 | 40 | 40 | 40 | 40 | 40 | 40 | 40 |
| Others | PES5003P | 10 | 10 | 10 | 10 | 10 | 10 | 10 | 10 | 10 | 10 | 10 |
| | Epoxy-modified polyamide particles | — | — | — | — | — | — | — | — | — | — | — |
| Mechanical characteristics of laminated sheet | 90° Flexural strength (MPa) | 160 | 151 | 135 | 145 | 136 | 130 | 155 | 150 | 136 | 107 | 111 |
| | Compressive strength after impact (CAI) (MPa) | 218 | 201 | 182 | 201 | 181 | 166 | 215 | 199 | 181 | 123 | 131 |

Example 51 to Example 53

Process I: Process for Producing Carbon Fibers as Raw Material

Carbon fibers were produced in the same manner as in Example 1.

Process II: Process for Bonding Sizing Agent to Carbon Fibers (A-1) as the component (A) and (B-1), (B-17), and (B-22) as the component (B) were mixed at a mass ratio of 100:3 as listed in Table 5, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 2. The mechanical characteristics of the carbon fiber-reinforced composite material-laminated sheet obtained from the carbon fiber forming raw material (Z) of the present invention were evaluated. The result indicated a high 90° flexural strength and a high compressive strength after impact (CAI). This reveals good adhesion between the carbon fibers and the matrix resin. Table 5 lists the results.

Comparative Example 11

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used as listed in Table 5. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 2. The mechanical characteristics of the carbon fiber-reinforced composite material-laminated sheet obtained were evaluated. The result indicated a low 90° flexural strength and a low compressive strength after impact (CAI). This reveals poor adhesion between the carbon fibers and the matrix resin. Table 5 lists the results.

As described above, Examples 51 to 53 and Comparative Example 11 showed high compressive strength after impact (CAI) on each level because the epoxy-modified polyamide particles were used. Among them, Examples 51 to 53 had higher compressive strength after impact than that of Comparative Example 11, and this reveals good adhesion between the carbon fibers and the matrix resin. The 90° flexural strengths were almost the same as those of Examples 42 to 44.

TABLE 5

| | | | | Example 51 | 52 | 53 | Comparative Example 11 |
|---|---|---|---|---|---|---|---|
| Carbon fibers | | | | A | A | A | A |
| Sizing agent | Component (A), parts by mass | A-1 | jER152 | 100 | 100 | 100 | 100 |
| | | A-2 | N660 | | | | |
| | | A-3 | MY721 | | | | |
| | Component (B), parts by mass | B-1 | DBU | 3 | | | |
| | | B-17 | (2-Methoxyethoxymethyl)triethylammonium chloride | | 3 | | |
| | | B-22 | Tetraphenylphosphonium bromide | | | 3 | |

TABLE 5-continued

| | | | Example 51 | Example 52 | Example 53 | Comparative Example 11 |
|---|---|---|---|---|---|---|
| Matrix resin | Epoxy resin | MY720 | 50 | 50 | 50 | 50 |
| | | jER825 | 50 | 50 | 50 | 50 |
| | Curing agent | 3,3'-DDS | 40 | 40 | 40 | 40 |
| | Others | PES5003P | 10 | 10 | 10 | 10 |
| | | Epoxy-modified polyamide particles | 20 | 20 | 20 | 20 |
| Mechanical characteristics of laminated sheet | | 90° Flexural strength (MPa) | 161 | 148 | 133 | 115 |
| | | Compressive strength after impact (CAI) (MPa) | 359 | 340 | 322 | 301 |

Example 54 to Example 56

Process I: Process for Producing Carbon Fibers as Raw Material

Carbon fibers were produced in the same manner as in Example 1.

Process II: Process for Bonding Sizing Agent to Carbon Fibers (A-1) as the component (A) and (B-1), (B-17), and (B-22) as the component (B) were mixed at a mass ratio of 100:3 as listed in Table 6, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 3. The mechanical characteristics of the carbon fiber-reinforced composite material-laminated sheet obtained from the carbon fiber forming raw material (Z) of the present invention were evaluated. The result indicated a high 90° flexural strength. This reveals good adhesion between the carbon fibers and the matrix resin. Table 6 lists the results.

Comparative Example 12

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used as listed in Table 6. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 3.

The mechanical characteristics of the carbon fiber-reinforced composite material-laminated sheet obtained were evaluated. The result indicated a low 90° flexural strength. This reveals poor adhesion between the carbon fibers and the matrix resin. Table 6 lists the results.

TABLE 6

| | | | | Example 54 | Example 55 | Example 56 | Comparative Example 12 |
|---|---|---|---|---|---|---|---|
| Carbon fibers | | | | A | A | A | A |
| Sizing agent | Component (A), parts by mass | A-1 | jER152 | 100 | 100 | 100 | 100 |
| | | A-2 | N660 | | | | |
| | | A-3 | MY721 | | | | |
| | Component (B), parts by mass | B-1 | DBU | 3 | | | |
| | | B-17 | (2-Methoxyethoxymethyl)triethylammonium chloride | | 3 | | |
| | | B-22 | Tetraphenylphosphonium bromide | | | 3 | |
| Matrix resin | Epoxy resin | jER828 | | 40 | 40 | 40 | 40 |
| | | jER834 | | | | | |
| | | HP7200L | | 30 | 30 | 30 | 30 |
| | | jER1004 | | | | | |

TABLE 6-continued

| | | Example 54 | Example 55 | Example 56 | Comparative Example 12 |
|---|---|---|---|---|---|
| | jRE1007 | 30 | 30 | 30 | 30 |
| | jER4004P | | | | |
| | ELM100 | | | | |
| | ELM120 | | | | |
| | YDF2001 | | | | |
| Curing agent | DICY7 | 4 | 4 | 4 | 4 |
| Others | M-B-M copolymer | | | | |
| | DCMU99 | 4 | 4 | 4 | 4 |
| | Vinylec K | | | | |
| Mechanical characteristics of laminated sheet | 90° Flexural strength (MPa) | 155 | 152 | 150 | 125 |

Example 57 to Example 59

Process I: Process for Producing Carbon Fibers as Raw Material

Carbon fibers were produced in the same manner as in Example 1.

Process II: Process for Bonding Sizing Agent to Carbon

Fibers (A-1) as the component (A) and (B-1), (B-17), and (B-22) as the component (B) were mixed at a mass ratio of 100:3 as listed in Table 7, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 4. The mechanical characteristics of the carbon fiber-reinforced composite material-laminated sheet obtained from the carbon fiber forming raw material (Z) of the present invention were evaluated. The result indicated a high 90° flexural strength. This reveals good adhesion between the carbon fibers and the matrix resin. Table 7 lists the results.

Comparative Example 13

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used as listed in Table 7. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 4. The mechanical characteristics of the carbon fiber-reinforced composite material-laminated sheet obtained were evaluated. The result indicated a low 90° flexural strength. This reveals poor adhesion between the carbon fibers and the matrix resin. Table 7 lists the results.

TABLE 7

| | | | | Example 57 | Example 58 | Example 59 | Comparative Example 13 |
|---|---|---|---|---|---|---|---|
| Carbon fibers | | | | A | A | A | A |
| Sizing agent | Component (A), parts by mass | A-1 | jER152 | 100 | 100 | 100 | 100 |
| | | A-2 | N660 | | | | |
| | | A-3 | MY721 | | | | |
| | Component (B), parts by mass | B-1 | DBU | 3 | | | |
| | | B-17 | (2-Methoxyethoxymethyl)triethylammonium chloride | | 3 | | |
| | | B-22 | Tetraphenylphosphonium bromide | | | 3 | |
| Matrix resin | Epoxy resin | jER828 | | 20 | 20 | 20 | 20 |
| | | jER834 | | | | | |
| | | HP7200L | | | | | |

TABLE 7-continued

| | | Example 57 | Example 58 | Example 59 | Comparative Example 13 |
|---|---|---|---|---|---|
| | jER1004 | 30 | 30 | 30 | 30 |
| | jRE1007 | | | | |
| | jER4004P | 10 | 10 | 10 | 10 |
| | ELM100 | 30 | 30 | 30 | 30 |
| | ELM120 | | | | |
| | YDF2001 | 10 | 10 | 10 | 10 |
| Curing agent | DICY7 | 5 | 5 | 5 | 5 |
| Others | M-B-M copolymer | 4 | 4 | 4 | 4 |
| | DCMU99 | 3 | 3 | 3 | 3 |
| | Vinylec K | | | | |
| Mechanical characteristics of laminated sheet | 90° Flexural strength (MPa) | 141 | 140 | 135 | 105 |

Example 60 to Example 62

Process I: Process for Producing Carbon Fibers as Raw Material

Carbon fibers were produced in the same manner as in Example 1.

Process II: Process for Bonding Sizing Agent to Carbon Fibers (A-1) as the component (A) and (B-1), (B-17), and (B-22) as the component (B) were mixed at a mass ratio of 100:3 as listed in Table 8, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 5. The mechanical characteristics of the carbon fiber-reinforced composite material-laminated sheet obtained from the carbon fiber forming raw material (Z) of the present invention were evaluated. The result indicated a high 90° flexural strength. This reveals good adhesion between the carbon fibers and the matrix resin. Table 8 lists the results.

Comparative Example 14

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used as listed in Table 8. The amount of the sizing agent coated was adjusted so as to be 1 part by mass relative to 100 parts by mass of surface-treated carbon fibers.

Process III: Production, Molding, and Evaluation of Prepreg

Production, molding, and evaluation of a prepreg were carried out in the same manner as in Reference Example 5. The mechanical characteristics of the carbon fiber-reinforced composite material-laminated sheet obtained were evaluated. The result indicated a low 90° flexural strength. This reveals poor adhesion between the carbon fibers and the matrix resin. Table 8 lists the results.

TABLE 8

| | | | | Example 60 | Example 61 | Example 62 | Comparative Example 14 |
|---|---|---|---|---|---|---|---|
| Carbon fibers | | | | A | A | A | A |
| Sizing agent | Component (A), parts by mass | A-1 | jER152 | 100 | 100 | 100 | 100 |
| | | A-2 | N660 | | | | |
| | | A-3 | MY721 | | | | |
| | Component (B), parts by mass | B-1 | DBU | 3 | | | |
| | | B-17 | (2-Methoxyethoxymethyl)triethylammonium chloride | | 3 | | |
| | | B-22 | Tetraphenylphosphonium bromide | | | 3 | |

TABLE 8-continued

| | | | Example | | | Comparative Example |
|---|---|---|---|---|---|---|
| | | | 60 | 61 | 62 | 14 |
| Matrix resin | Epoxy resin | jER828 | | | | |
| | | jER834 | 20 | 20 | 20 | 20 |
| | | HP7200L | | | | |
| | | jER1004 | | | | |
| | | jRE1007 | 40 | 40 | 40 | 40 |
| | | jER4004P | | | | |
| | | ELM100 | | | | |
| | | ELM120 | 40 | 40 | 40 | 40 |
| | | YDF2001 | | | | |
| | Curing agent | DICY7 | 5 | 5 | 5 | 5 |
| | Others | M-B-M copolymer | | | | |
| | | DCMU99 | 3 | 3 | 3 | 3 |
| | | Vinylec K | 3 | 3 | 3 | 3 |
| Mechanical characteristics of laminated sheet | | 90° Flexural strength (MPa) | 150 | 151 | 145 | 115 |

Example 63

Example includes Process I to Process III.

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1.

Process III: Production and Evaluation of Carbon Fiber-Reinforced Composite Material A carbon fiber forming raw material (Y) was prepared, and a carbon fiber-reinforced composite material was produced from the carbon fiber forming raw material (Y), in the same manner as in Reference Examples 6 to 11. The obtained carbon fiber-reinforced composite material had a Vf of 58%. The compressive strength after impact (CAI) was evaluated, and the result indicated a high value of 285 MPa. This reveals good adhesion between the carbon fibers and the matrix resin. Table 9 lists the results.

Examples 64 to 67

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the mass ratio of (A-1) and (B-1) was changed within a range of 100:3 to 100:20 as listed in Table 9. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 270 to 296 MPa. This reveals good adhesion between the carbon fibers and the matrix resin. Table 9 lists the results.

Comparative Example 15

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-1) alone was used in Process II in Example 1. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 232 MPa. This reveals poor adhesion between the carbon fibers and the matrix resin. Table 9 lists the results.

Comparative Example 16

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the mass ratio of (A-1) and (B-1) was changed to 100:30 in Process II in Example 1. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 237 MPa. This reveals poor adhesion between the carbon fibers and the matrix resin. Table 9 lists the results.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 255 to 293 MPa. This reveals good adhesion between the carbon fibers and the matrix resin. Table 10 lists the results.

Comparative Example 17 to Comparative Example 21

Process I: Process for Producing Carbon Fibers as Raw Material

Carbon fibers were produced in the same manner as in Example 1.

TABLE 9

| | | | | Example | | | | | Comparative Example | |
|---|---|---|---|---|---|---|---|---|---|---|
| | | | | 63 | 64 | 65 | 66 | 67 | 15 | 16 |
| Carbon fibers | | | | A | A | A | A | A | A | A |
| Sizing agent | Component (A), parts by mass | A-1 | jER152 | 100 | 100 | 100 | 100 | 100 | 100 | 100 |
| | | A-2 | N660 | | | | | | | |
| | | A-3 | MY721 | | | | | | | |
| | Component (B), parts by mass | B-1 | DBU | 1 | 3 | 6 | 15 | 20 | | 30 |
| | | B-2 | Tributylamine | | | | | | | |
| | | B-3 | N,N-Dimethylbenzylamine | | | | | | | |
| Mechanical characteristics of laminated sheet | | Compressive strength after impact (CAI) (MPa) | | 285 | 296 | 290 | 280 | 270 | 232 | 237 |

Example 68 to Example 77

Process I: Process for Producing Carbon Fibers as Raw Material

Carbon fibers were produced in the same manner as in Example 1.

Process II: Process for Bonding Sizing Agent to Carbon Fibers (A-1) to (A-10) as the component (A) and (B-10) as the component (B) were mixed at a mass ratio of 100:3 as listed in Table 10, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process II: Process for Bonding Sizing Agent to Carbon Fibers

Sizing agent-coated carbon fibers were obtained in the same manner as in Example 1 except that the sizing agent components were changed as listed in Table 10. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 225 to 235 MPa. This reveals poor adhesion between the carbon fibers and the matrix resin. Table 10 lists the results.

TABLE 10

| | | | | Example | | | | | | | | | | Comparative Example | | | | |
|---|---|---|---|---|---|---|---|---|---|---|---|---|---|---|---|---|---|---|
| | | | | 68 | 69 | 70 | 71 | 72 | 73 | 74 | 75 | 76 | 77 | 17 | 18 | 19 | 20 | 21 |
| Carbon fibers | | | | A | A | A | A | A | A | A | A | A | A | A | A | A | A | A |
| Sizing agent | Component (A), parts by mass | A-1 | jER152 | 100 | | | | | | | | | | | | | | 100 |
| | | A-2 | N660 | | 100 | | | | | | | | | | | | | |
| | | A-3 | MY721 | | | 100 | | | | | | | | | | | | |
| | | A-4 | jER828 | | | | 100 | | | | | | | 100 | | | | |
| | | A-5 | jER1001 | | | | | 100 | | | | | | | | | | |
| | | A-6 | EX-810 | | | | | | 100 | | | | | | | | | |
| | | A-7 | TETRAD-X | | | | | | | 100 | | | | | 100 | | | |
| | | A-8 | EX-611 | | | | | | | | 100 | | | | | | | |
| | | A-9 | EX-731 | | | | | | | | | 100 | | | | | | |
| | | A-10 | EPU-6 | | | | | | | | | | 100 | | | | | |
| | Component (B), parts by mass | B-8 | DBU phenol salt | | | | | | | | | | | | | | | |
| | | B-9 | DBU octanoate | | | | | | | | | | | | | | | |
| | | B-10 | DBU p-toluene-sulfonate | 3 | 3 | 3 | 3 | 3 | 3 | 3 | 3 | 3 | 3 | | | 3 | | |
| | Component (C), parts by mass | C-1 | EX-141 | | | | | | | | | | | | | 100 | 100 | |
| | | C-2 | Hexamethylenediamine | | | | | | | | | | | | | | | 3 |
| Mechanical characteristics of laminated sheet | Compressive strength after impact (CAI) (MPa) | | | 293 | 285 | 288 | 262 | 255 | 256 | 277 | 270 | 256 | 260 | 225 | 231 | 228 | 225 | 235 |

(Example 78), (Example 81) to (Example 103)

Process I: Process for Producing Carbon Fibers as Raw Material

Carbon fibers were produced in the same manner as in Example 1.

Process II: Process for Bonding Sizing Agent to Carbon Fibers (A-2) as the component (A) and (B-1), (B-4) to (B-9) and (B-11) to (B-27) as the component (B) were mixed at a mass ratio of 100:3 as listed in Table 11-1 and Table 11-2, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 251 to 298 MPa. This reveals good adhesion between the carbon fibers and the matrix resin. Table 11-1 and Table 11-2 show the results.

Comparative Example 22

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that (A-2) alone was used as listed in Table 11-2. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 230 MPa. This reveals poor adhesion between the carbon fibers and the matrix resin. Table 11-2 lists the results.

TABLE 11-1

| | | | | Example 78 | 81 | 82 | 83 | 84 | 85 | 86 | 87 | 88 | 89 | 90 |
|---|---|---|---|---|---|---|---|---|---|---|---|---|---|---|
| Carbon fibers | | | | A | A | A | A | A | A | A | A | A | A | A |
| Sizing agent | Component (A), parts by mass | A-1 | jER152 | | | | | | | | | | | |
| | | A-2 | N660 | 100 | 100 | 100 | 100 | 100 | 100 | 100 | 100 | 100 | 100 | 100 |
| | | A-3 | MY721 | | | | | | | | | | | |
| | Component (B), parts by mass | B-1 | DBU | 3 | | | | | | | | | | |
| | | B-2 | Tributylamine | | | | | | | | | | | |
| | | B-3 | N,N-Dimethylbenzylamine | | | | | | | | | | | |
| | | B-4 | Proton sponge | | 3 | | | | | | | | | |
| | | B-5 | DMP-30 | | | 3 | | | | | | | | |
| | | B-6 | DBN | | | | 3 | | | | | | | |
| | | B-7 | 1-Benzyl-imidazole | | | | | 3 | | | | | | |
| | | B-8 | DBU phenol salt | | | | | | 3 | | | | | |
| | | B-9 | DBU octanoate | | | | | | | 3 | | | | |
| | | B-10 | DBU p-toluenesulfonate | | | | | | | | | | | |
| | | B-11 | N-Ethylmorpholine | | | | | | | | 3 | | | |
| | | B-12 | 2,6-Lutidine | | | | | | | | | 3 | | |
| | | B-13 | 4-Pyridinemethanol | | | | | | | | | | 3 | |
| | | B-14 | Benzyltrimethyl-ammonium bromide | | | | | | | | | | | 3 |
| Mechanical characteristics of laminated sheet | | Compressive strength after impact (CAI) (MPa) | | 288 | 285 | 281 | 284 | 251 | 290 | 289 | 263 | 266 | 270 | 288 |

TABLE 11-2

| | | | | Example 91 | 92 | 93 | 94 | 95 | 96 | 97 | 98 |
|---|---|---|---|---|---|---|---|---|---|---|---|
| Carbon fibers | | | | A | A | A | A | A | A | A | A |
| Sizing agent | Component (A), parts by mass | A-1 | jER152 | | | | | | | | |
| | | A-2 | N660 | 100 | 100 | 100 | 100 | 100 | 100 | 100 | 100 |
| | | A-3 | MY721 | | | | | | | | |
| | Component (B), parts by mass | B-15 | Tetrabutylammonium bromide | 3 | | | | | | | |
| | | B-16 | Trimethyloctadecylammonium bromide | | 3 | | | | | | |
| | | B-17 | (2-Methoxyethoxymethyl)triethylammonium chloride | | | 3 | | | | | |
| | | B-18 | (2-Acetoxyethyl)trimethylammonium chloride | | | | 3 | | | | |
| | | B-19 | (2-Hydroxyethyl)trimethylammonium bromide | | | | | 3 | | | |
| | | B-20 | 1-Hexadecylpyridinium chloride | | | | | | 3 | | |
| | | B-21 | Tetrabutylphosphonium bromide | | | | | | | 3 | |
| | | B-22 | Tetraphenylphosphonium bromide | | | | | | | | 3 |
| | | B-23 | Tributylphosphine | | | | | | | | |
| | | B-24 | Triphenylphosphine | | | | | | | | |
| | | B-25 | Triisopropanolamine | | | | | | | | |
| | | B-26 | Triethanolamine | | | | | | | | |
| | | B-27 | N,N-Diisopropylethylamine | | | | | | | | |
| Mechanical characteristics of laminated sheet | | Compressive strength after impact (CAI) (MPa) | | 285 | 264 | 282 | 274 | 270 | 280 | 289 | 266 |

| | | | | Example 99 | 100 | 101 | 102 | 103 | Comparative Example 22 |
|---|---|---|---|---|---|---|---|---|---|
| Carbon fibers | | | | A | A | A | A | A | A |
| Sizing agent | Component (A), parts by mass | A-1 | jER152 | | | | | | |
| | | A-2 | N660 | 100 | 100 | 100 | 100 | 100 | 100 |
| | | A-3 | MY721 | | | | | | |

TABLE 11-2-continued

| | | | | | | | | |
|---|---|---|---|---|---|---|---|---|
| Component (B), parts by mass | B-15 | Tetrabutylammonium bromide | | | | | | |
| | B-16 | Trimethyloctadecylammonium bromide | | | | | | |
| | B-17 | (2-Methoxyethoxymethyl)triethylammonium chloride | | | | | | |
| | B-18 | (2-Acetoxyethyl)trimethylammonium chloride | | | | | | |
| | B-19 | (2-Hydroxyethyl)trimethylammonium bromide | | | | | | |
| | B-20 | 1-Hexadecylpyridinium chloride | | | | | | |
| | B-21 | Tetrabutylphosphonium bromide | | | | | | |
| | B-22 | Tetraphenylphosphonium bromide | | | | | | |
| | B-23 | Tributylphosphine | 3 | | | | | |
| | B-24 | Triphenylphosphine | | 3 | | | | |
| | B-25 | Triisopropanolamine | | | 3 | | | |
| | B-26 | Triethanolamine | | | | 3 | | |
| | B-27 | N,N-Diisopropylethylamine | | | | | 3 | |
| Mechanical characteristics of laminated sheet | Compressive strength after impact (CAI) (MPa) | | 255 | 256 | 298 | 265 | 266 | 230 |

Example 104 to Example 106

Process I: Process for Producing Carbon Fibers as Raw Material

Carbon fibers were produced in the same manner as in Example 1.

Process II: Process for Bonding Sizing Agent to Carbon Fibers (A-1) as the component (A) (B-1), (B-17), and (B-22) as the component (B) were mixed at a mass ratio of 100:3 as listed in Table 12, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 267 to 299 MPa. This reveals good adhesion between the carbon fibers and the matrix resin. Table 12 lists the results.

Example 107 to Example 109

Process I: Process for Producing Carbon Fibers as Raw Material

Carbon fibers were produced in the same manner as in Example 45.

Process II: Process for Bonding Sizing Agent to Carbon Fibers (A-1) as the component (A) and (B-1), (B-17), and (B-22) as the component (B) were mixed at a mass ratio of 100:3 as listed in Table 12, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 255 to 279 MPa. This reveals good adhesion between the carbon fibers and the matrix resin. Table 12 lists the results.

Example 110 to Example 112

Process I: Process for Producing Carbon Fibers as Raw Material

Carbon fibers were produced in the same manner as in Example 48.

Process II: Process for Bonding Sizing Agent to Carbon Fibers (A-1) as the component (A) and (B-1), (B-17), and (B-22) as the component (B) were mixed at a mass ratio of 100:3 as listed in Table 11, and acetone was further mixed to give an about 1% by mass acetone solution of the sizing agent that was homogeneously dissolved. The acetone solution of the sizing agent was used, and the sizing agent was applied to the surface-treated carbon fibers by immersing. The coated carbon fibers were then treated with anneal at a temperature of 210° C. for 180 seconds to yield sizing agent-coated carbon fibers. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a high value of 266 to 295 MPa. This reveals good adhesion between the carbon fibers and the matrix resin. Table 12 lists the results.

As described above, in the carbon fiber-reinforced composite material formed from the carbon fiber forming raw material (Y), it is revealed that the mechanical characteristics when the carbon fibers A are used (Examples 104 to 106) are excellent as compared with those when the carbon fibers B are used (Examples 107 to 109). It is also revealed that by using the carbon fibers C obtained by immersing the carbon fibers B in an aqueous tetraethylammonium hydroxide solution (pH=14) and pulling up the carbon fibers while the carbon fibers are vibrated by ultrasonic waves (Examples 110 to 112), mechanical characteristics equivalent to those of the carbon fibers A can be achieved.

Comparative Example 23

Process I: Process for Producing Carbon Fibers as Raw Material

Carbon fibers were produced in the same manner as in Example 107.

Process II: Process for Bonding Sizing Agent to Carbon Fibers

Sizing agent-coated carbon fibers were obtained in the same manner as in Example 107 except that (A-1) alone was used as listed in Table 11. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 222 MPa. This reveals poor adhesion between the carbon fibers and the matrix resin. Table 12 lists the results.

Comparative Example 24

Process I: Process for Producing Carbon Fibers as Raw Material

Carbon fibers were produced in the same manner as in Example 110.

Process II: Process for Bonding Sizing Agent to Carbon Fibers

Sizing agent-coated carbon fibers were obtained in the same manner as in Example 110 except that (A-1) alone was used as listed in Table 11. The amount of the sizing agent coated was adjusted so as to be 1 part by mass relative to 100 parts by mass of surface-treated carbon fibers.

Process III: Production and Evaluation of Carbon Fiber-Reinforced Composite Material A carbon fiber-reinforced composite material was produced in the same manner as in Reference Examples 6 to 11. The obtained carbon fiber-reinforced composite material had a Vf of 58%. The compressive strength after impact (CAI) was evaluated, and the result indicated a low value of 233 MPa. This reveals poor adhesion between the carbon fibers and the matrix resin. Table 12 lists the results.

TABLE 12

| | | | | Example | | | | | | | | | Comparative Example | |
|---|---|---|---|---|---|---|---|---|---|---|---|---|---|---|
| | | | | 104 | 105 | 106 | 107 | 108 | 109 | 110 | 111 | 112 | 23 | 24 |
| Carbon fibers | | | | A | A | A | B | B | B | C | C | C | B | C |
| Sizing agent | Component (A), parts by mass | A-1 | jER152 | 100 | 100 | 100 | 100 | 100 | 100 | 100 | 100 | 100 | 100 | 100 |
| | | A-2 | N660 | | | | | | | | | | | |
| | | A-3 | MY721 | | | | | | | | | | | |
| | Component (B), parts by mass | B-1 | DBU | 3 | | | 3 | | | 3 | | | | |
| | | B-17 | (2-Methoxyethoxymethyl)-triethylammonium chloride | | 3 | | | 3 | | | 3 | | | |
| | | B-22 | Tetraphenylphosphonium bromide | | | 3 | | | 3 | | | 3 | | |
| Mechanical characteristics of laminated sheet | | Compressive strength after impact (CAI) (MPa) | | 299 | 280 | 267 | 279 | 266 | 255 | 295 | 275 | 266 | 222 | 233 |

INDUSTRIAL APPLICABILITY

As described above, the carbon fiber forming raw material, the formed material, and the carbon fiber-reinforced composite material of the present invention are lightweight and excellent in strength and elastic modulus, and thus are suitably used in various fields such as aircraft members, spacecraft members, automobile members, ship members, constructional materials, and sporting goods.

The invention claimed is:

1. A carbon fiber forming raw material including sizing agent-coated carbon fiber bundles coated with a sizing agent, the carbon fiber forming raw material having a woven fabric form or a braid form, the carbon fiber forming raw material comprising:

carbon fiber bundles made of carbon fiber; and the sizing agent which is coated on the carbon fiber bundles so that a film of the sizing agent is formed on the carbon fiber bundles;

wherein the carbon fibers have a surface oxygen concentration O/C of 0.05 to 0.5 determined by X-ray photoelectron spectroscopy;

wherein the thickness of the sizing agent applied to the carbon fiber and dried is in a range of 2 to 20 nm;

wherein the sizing agent comprises:

a component (A) including an epoxy compound (A1) having an epoxy equivalent of less than 360 g/mol and having two or more epoxy groups which is a phenol novolac epoxy resin, a cresol novolac epoxy resin, a bisphenol A epoxy resin, or a tetraglycidyldiaminodiphenylmethane and/or an epoxy compound (A2) which is at least one selected from the group consisting of sorbitol polyglycidyl ethers, glycerol polyglycidyl ethers, glycidylbenzamide, amide-modified epoxy resins, glycidylphthalimide, urethane-modified epoxy resins, bisphenol S epoxy resins, glycidyl p-toluenesulfonate, and glycidyl 3-nitrobenzenesulfonate; and a reaction accelerator component (B1) being contained in an amount of 1 to 20 parts by mass relative to 100 parts by mass of the component (A), said reaction accelerator component (B1) selected from the group consisting of: N,N-dimethylbenzylamine; 1,8-bis(dimethylbenzylamine); 1,8-bis(dimethylamino)naphthalene; 1,5 diazabicyclo [4, 3, 0]-5-nonene, 1-benzyl-imidazole; 1,8-diazabicyclo[5,4,0]-7-undecene phenol salt; 1,8-diazabicyclo[5,4,0]-7-undecene octanoate; 1,8-diazabicyclo[5,4,0]-7-undecene p-toluenesulfonate; N-ethylmorpholine; 2,6-lutidine; 4-pyridinemethanol; triisopropanolamine; and triethanolamine; and wherein the amount of sizing agent coated on the carbon fibers is in a range of from 0.1 to 10 parts by mass of sizing agent relative to 100 parts by mass of carbon fibers.

2. The carbon fiber forming raw material according to claim 1, wherein the component (A) is an epoxy compound having three or more epoxy groups.

3. The carbon fiber forming raw material according to claim 1, wherein the carbon fibers are obtained by liquid phase electrolytic oxidation in an alkaline electrolytic solution or liquid phase electrolytic oxidation in an acid electrolytic solution and then washing the resulting fibers with an alkaline aqueous solution.

4. A formed material obtained by combining the forming base material according to claim 1 with a thermosetting resin or a thermoplastic resin.

5. A carbon fiber-reinforced composite material obtained by forming the carbon fiber forming raw material according to claim 1.

6. A carbon fiber-reinforced composite material obtained by forming the formed material as claimed in claim 4.

7. A sizing agent coated carbon fiber material formed by subjecting the carbon fiber forming raw material according to claim 1 to a thermal treatment at 160 to 260° C. for 30 to 600 seconds.

8. A prepreg including sizing agent-coated carbon fiber bundles coated with a sizing agent and a thermosetting matrix resin, A) the carbon fiber forming raw material comprising:

carbon fiber bundles made of carbon fiber; and the sizing agent which is coated on the carbon fiber bundles so that a film of the sizing agent is formed on the carbon fiber bundles;

wherein the carbon fibers have a surface oxygen concentration O/C of 0.05 to 0.5 determined by X-ray photoelectron spectroscopy;

wherein the thickness of the sizing agent applied to the carbon fiber and dried is in a range of 2 to 20 nm;

wherein the sizing agent comprises:

a component (A) including an epoxy compound (A1) having an epoxy equivalent of less than 360 g/mol and having two or more epoxy groups which is a phenol novolac epoxy resin, a cresol novolac epoxy resin, a bisphenol A epoxy resin, or a tetraglycidyldiaminodiphenylmethane and/or an epoxy compound (A2) which is at least one selected from the group consisting of sorbitol polyglycidyl ethers, glycerol polyglycidyl ethers, glycidylbenzamide, amide-modified epoxy resins, glycidylphthalimide, urethane-modified epoxy resins, bisphenol S epoxy resins, glycidyl p-toluenesulfonate, and glycidyl 3-nitrobenzenesulfonate; and a reaction accelerator component (B1) being contained in an amount of 1 to 20 parts by mass relative to 100 parts by mass of the component (A), said reaction accelerator component (B1) selected from the group consisting of: N,N-dimethylbenzylamine; 1,8-bis(dimethylbenzylamine); 1,8-bis(dimethylamino)naphthalene; 1,5 diazabicyclo [4, 3, 0]-5-nonene, 1-benzyl-imidazole; 1,8-diazabicyclo[5,4,0]-7-undecene phenol salt; 1,8-diazabicyclo[5,4,0]-7-undecene octanoate; 1,8-diazabicyclo[5,4,0]-7-undecene p-toluenesulfonate; N-ethylmorpholine; 2,6-lutidine; 4-pyridinemethanol; triisopropanolamine; and triethanolamine; and wherein the amount of sizing agent coated on the carbon fibers is in a range of from 0.1 to 10 parts by mass of sizing agent relative to 100 parts by mass of carbon fibers, B) the thermosetting matrix resin comprising polyester resin, vinyl ester resin, epoxy resin, or polyimide, polyester or acid modified polyolefin.

9. The prepreg according to claim 8, wherein the thermosetting resin is an epoxy resin.

10. The prepreg according to claim 8, wherein the thermosetting resin contains a multifunctional glycidylamine epoxy resin and an aromatic diamine curing agent.

11. The prepreg according to claim 8, wherein the thermosetting resin contains a dicyclopentadiene epoxy resin (D), an epoxy resin (E) having an average epoxy equivalent of 1,000 or more and 10,000 or less, and a curing agent (F).

12. The prepreg according to claim 8, wherein the thermosetting resin contains 10 to 60 parts by mass of an amine epoxy resin, 40 to 90 parts by mass of a bisphenol epoxy resin, 1 to 10 parts by mass of dicyandiamide or a derivative thereof, and 1 to 10 parts by mass of at least one block copolymer (G) selected from the group consisting of S—B-M, B-M, and M-B-M.

13. The prepreg according to claim 8, wherein the thermosetting resin is an epoxy matrix resin containing a bisphenol epoxy resin (H) having a softening point of 90° C. or more, an amine epoxy resin (I) having three or more functional groups, a bisphenol F epoxy resin (J) having a number average molecular weight of 450 or less, and a curing agent (K) and contains 20 to 50 parts by mass of the component (H), 30 to 50 parts by mass of the component (I), and 10 to 40 parts by mass of the component (J) relative to 100 parts by mass of the total amount of the components (H) to (J).

14. The prepreg according to claim 8, wherein the prepreg satisfies at least one requirement of:

(1) thermoplastic resin particles or fibers (L) and electrically conductive particles or fibers (M) are further contained, and the mass ratio represented by [amount (parts by mass) of (L)]/[amount (parts by mass) of (M)] is 1 to 1,000; and (2) electrically conductive particles or fibers (N) in which a thermoplastic resin nucleus or core is coated with an electrically conductive substance are further contained.

15. The prepreg according to claim 8, wherein the prepreg has a width of 1 to 50 mm.

* * * * *